(12) United States Patent
Dalonzo

(10) Patent No.: US 12,531,821 B2
(45) Date of Patent: Jan. 20, 2026

(54) USER INTERFACES FOR MESSAGING CONTENT

(71) Applicant: Apple Inc., Cupertino, CA (US)

(72) Inventor: Christian X. Dalonzo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 18/328,734

(22) Filed: Jun. 3, 2023

(65) Prior Publication Data

US 2024/0031313 A1 Jan. 25, 2024

Related U.S. Application Data

(60) Provisional application No. 63/365,877, filed on Jun. 5, 2022.

(51) Int. Cl.
*G06F 3/0485* (2022.01)
*H04L 51/04* (2022.01)
*H04L 51/216* (2022.01)

(52) U.S. Cl.
CPC ............ *H04L 51/04* (2013.01); *G06F 3/0485* (2013.01); *H04L 51/216* (2022.05)

(58) Field of Classification Search
CPC ...... G06F 3/0485; H04L 51/216; H04L 51/04
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,912,904 B2* | 3/2011 | Buchheit | H04L 51/216 715/752 |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |

(Continued)

FOREIGN PATENT DOCUMENTS

WO 2013/169849 A2 11/2013
WO 2014/105276 A1 7/2014

OTHER PUBLICATIONS

International Search Report received for PCT Patent Application No. PCT/US2023/024384, mailed on Nov. 17, 2023, 8 pages.

*Primary Examiner* — Tadesse Hailu
(74) *Attorney, Agent, or Firm* — Kubota & Basol LLP

(57) ABSTRACT

In some embodiments, an electronic device displays a plurality of content items or user interface objects corresponding to messages of a messaging conversation. In some embodiments, the electronic device displays a messaging user interface including a first user interface object and a second user interface object in a first layout. In some embodiments, an electronic device displays messaging activity to a messaging conversation.

42 Claims, 53 Drawing Sheets

(56) References Cited

U.S. PATENT DOCUMENTS

| | | |
|---|---|---|
| 9,933,937 B2 | 4/2018 | Lemay et al. |
| 2002/0015024 A1 | 2/2002 | Westerman et al. |
| 2005/0114781 A1 | 5/2005 | Brownholtz et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2014/0173457 A1 | 6/2014 | Wang et al. |
| 2014/0184471 A1* | 7/2014 | Martynov ........... G06F 21/6209 |
| | | 345/1.2 |
| 2014/0203999 A1* | 7/2014 | Shim ..................... G06F 9/451 |
| | | 345/2.2 |
| 2015/0169208 A1 | 6/2015 | Cho et al. |
| 2018/0181265 A1* | 6/2018 | Kim ....................... G06F 3/0482 |
| 2018/0307389 A1* | 10/2018 | Kim ....................... G06F 3/0482 |
| 2019/0014069 A1 | 1/2019 | Schwarz et al. |
| 2020/0162414 A1* | 5/2020 | Klucznik ............... H04L 51/046 |
| 2020/0265181 A1* | 8/2020 | Kim ....................... G06F 40/14 |

\* cited by examiner

USER INTERFACES FOR MESSAGING CONTENT

CROSS-REFERENCE TO RELATED APPLICATIONS

This application claims the benefit of U.S. Provisional Application No. 63/365,877, filed Jun. 5, 2022, the content of which is incorporated herein by reference in its entirety for all purposes.

FIELD OF THE DISCLOSURE

This relates generally to user interfaces associated with messaging content accessible by an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users may wish to use such devices to send messages and/or manage messages. Enhancing the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that display a plurality of content items (or user interface objects) corresponding to messages of a messaging conversation. Some embodiments described in this disclosure are directed to displaying messaging activity to a messaging conversation. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
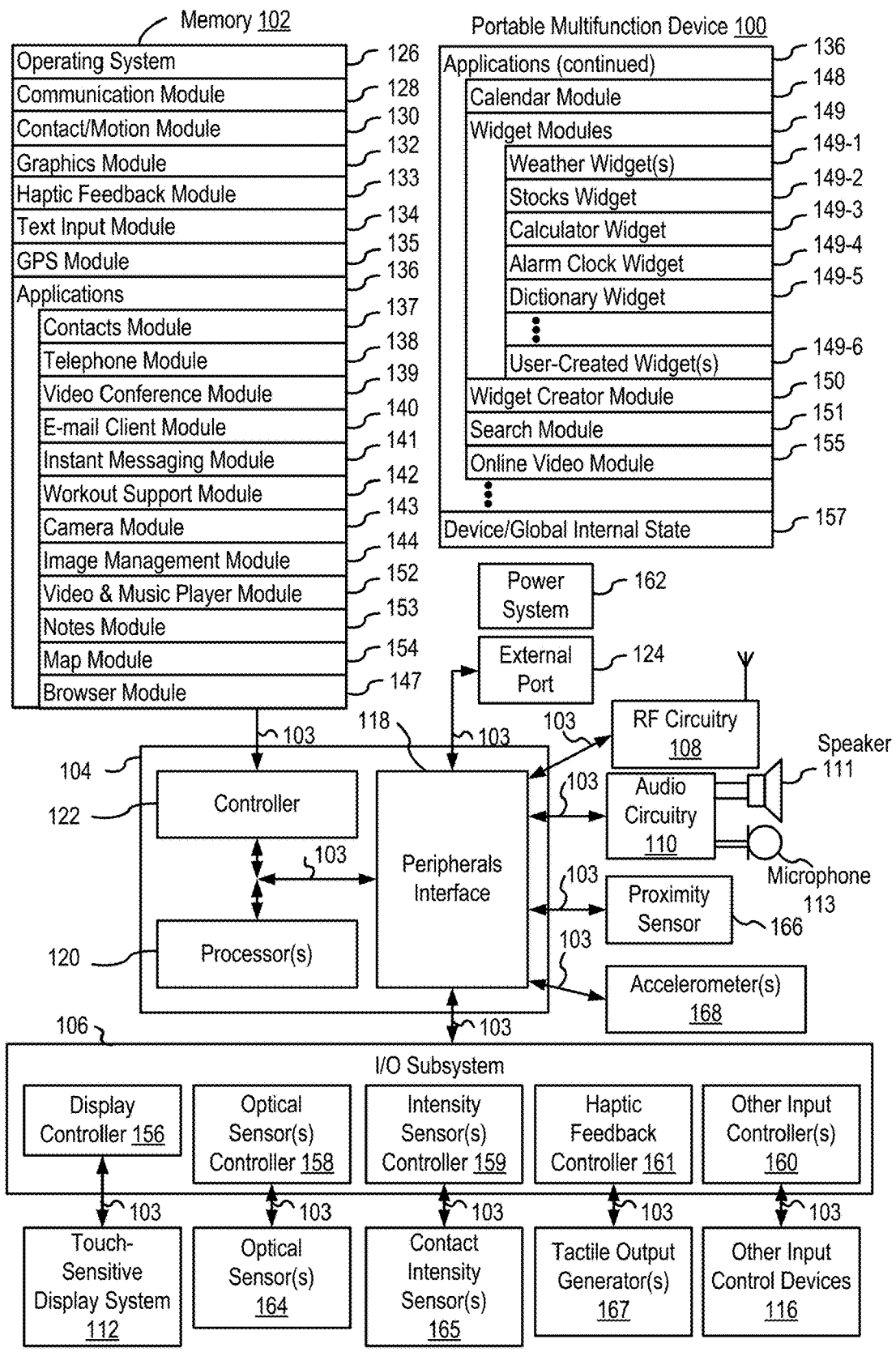
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to manage messages in messaging conversations. There is also a need for electronic devices to respond to messages. Such techniques can reduce the cognitive burden on a user who uses when locating messages and responding to messages, and such technique can provide enhanced interaction with the electronic device. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
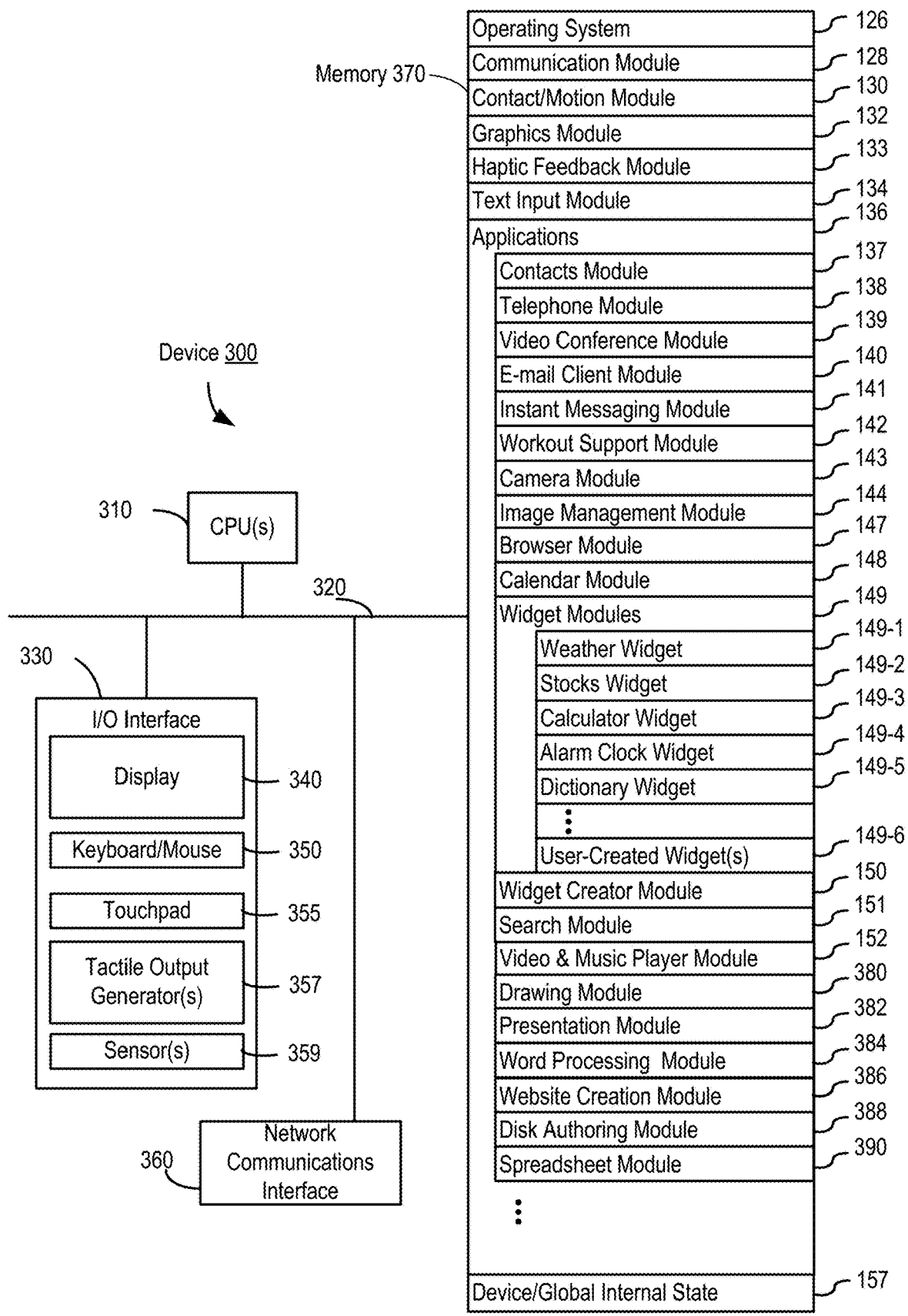
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
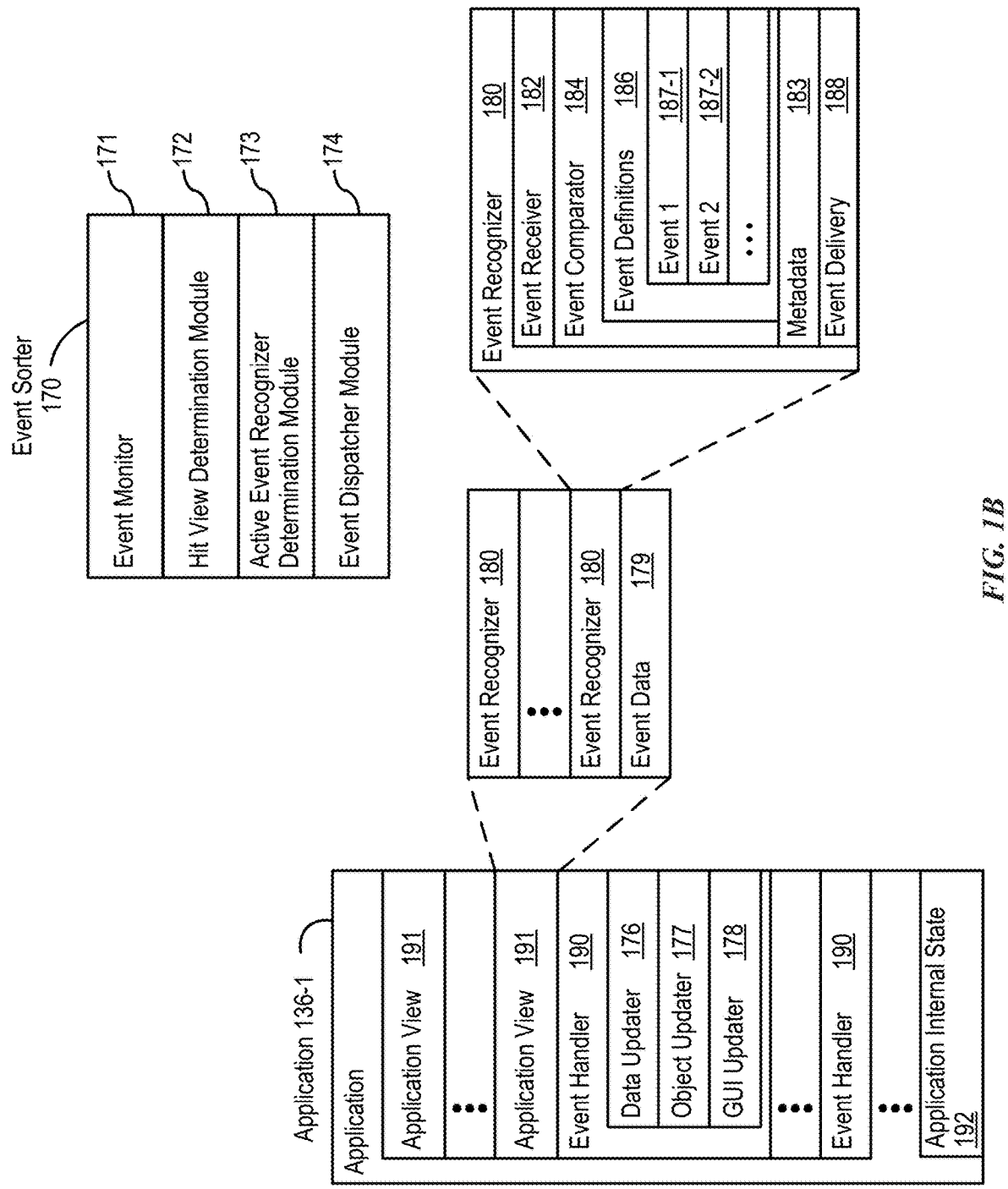
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
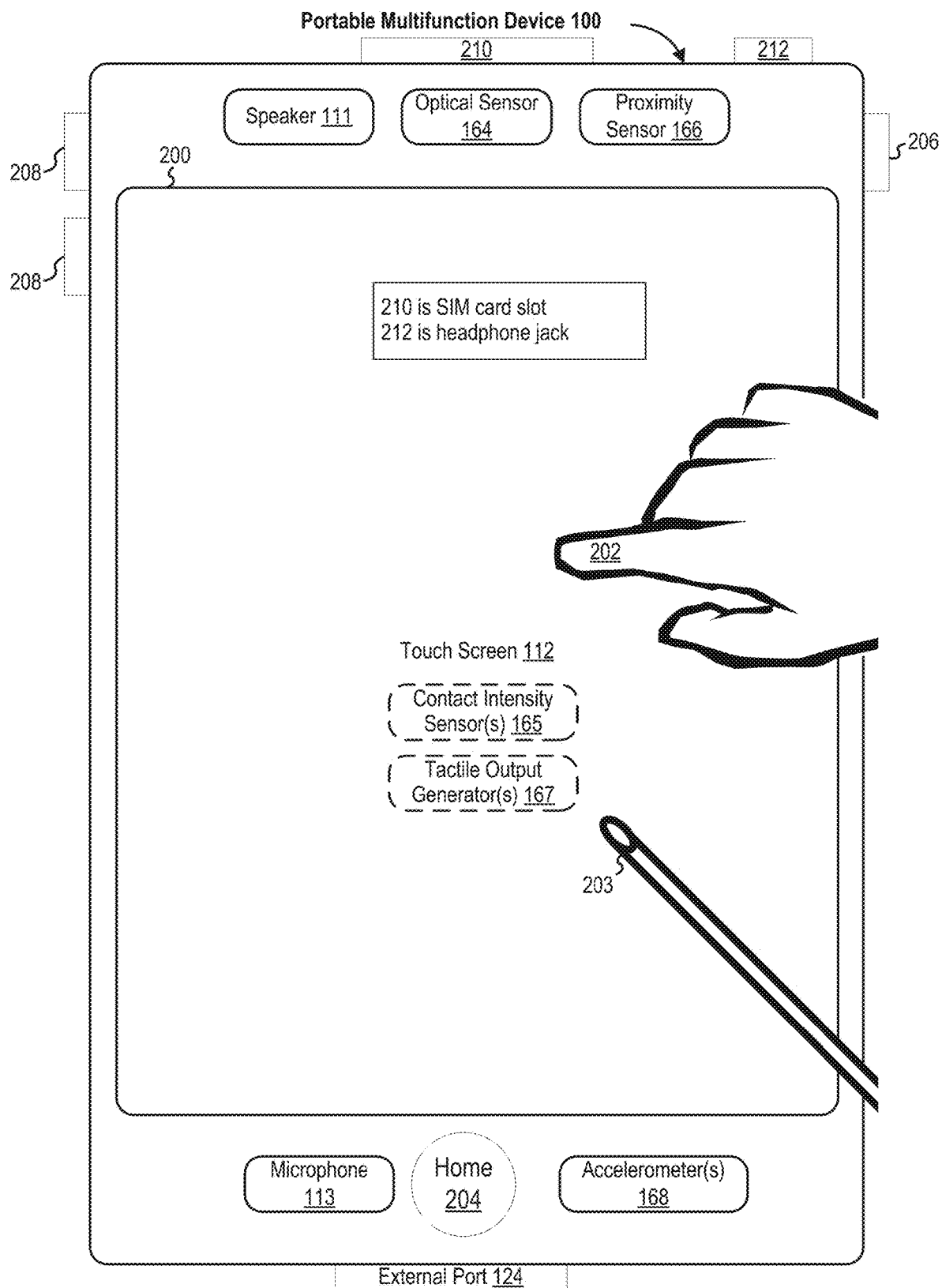
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
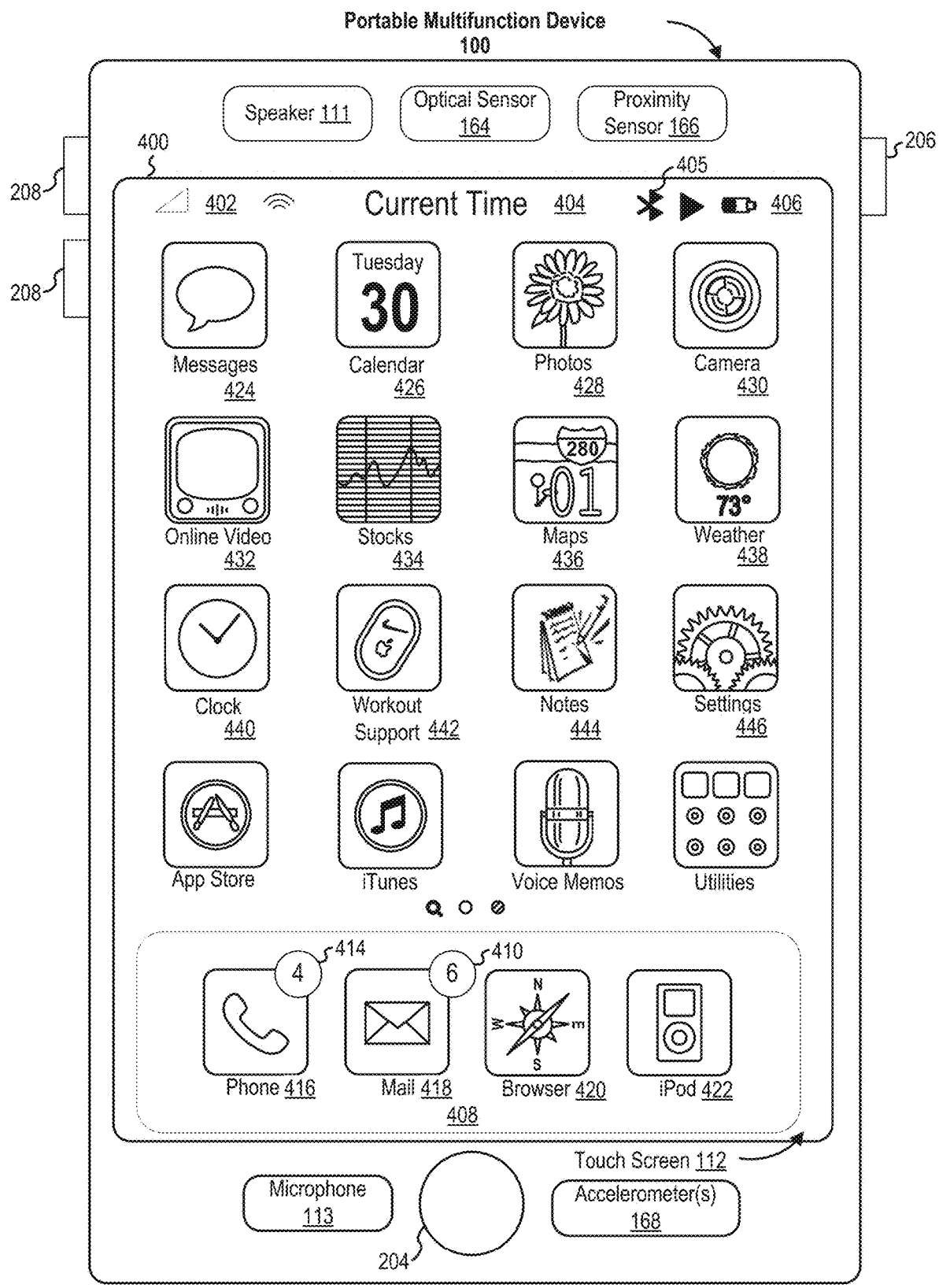
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
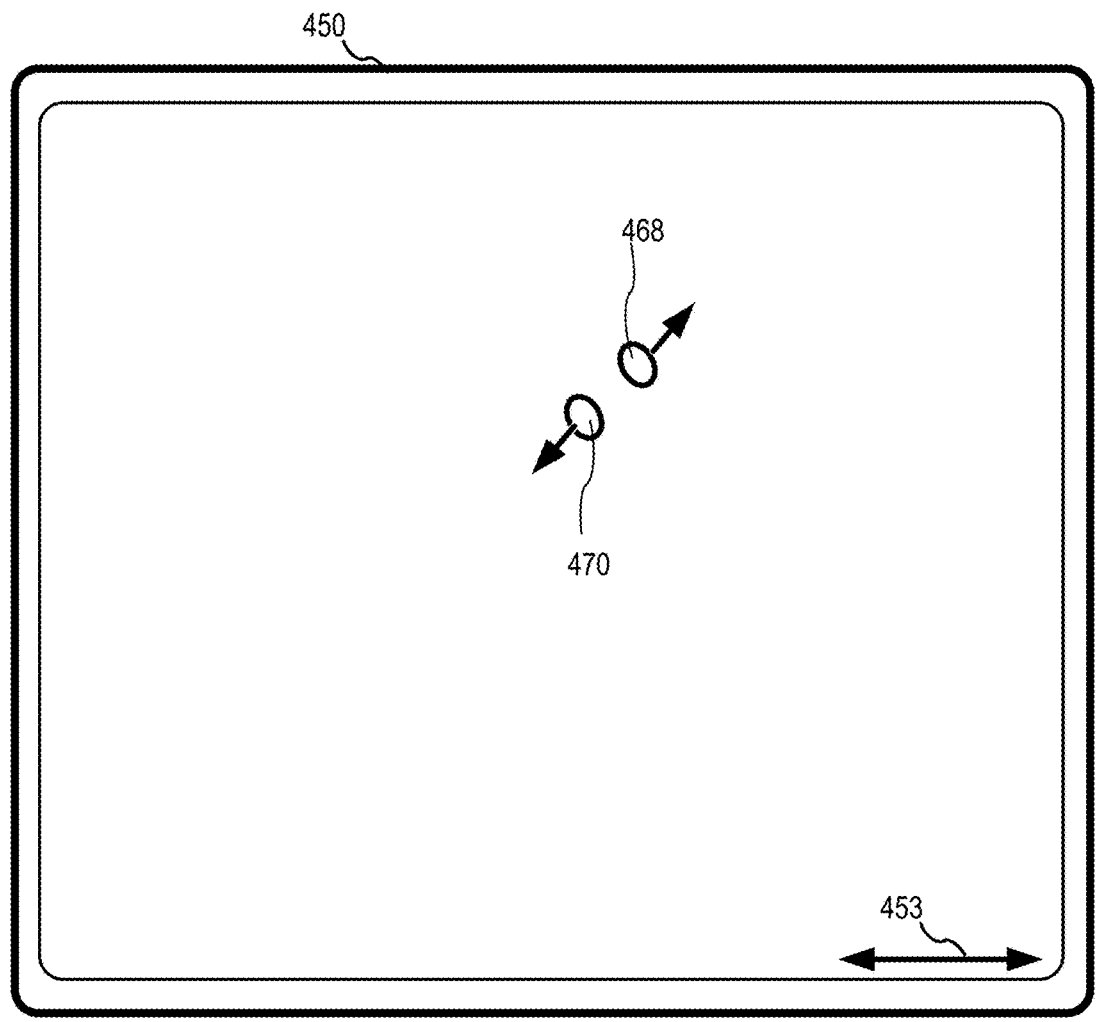
FIG. 4B illustrates an exemplary user interface for a multifunction device with a touch-sensitive surface that is separate from the display in accordance with some embodiments.
Figure 4B:
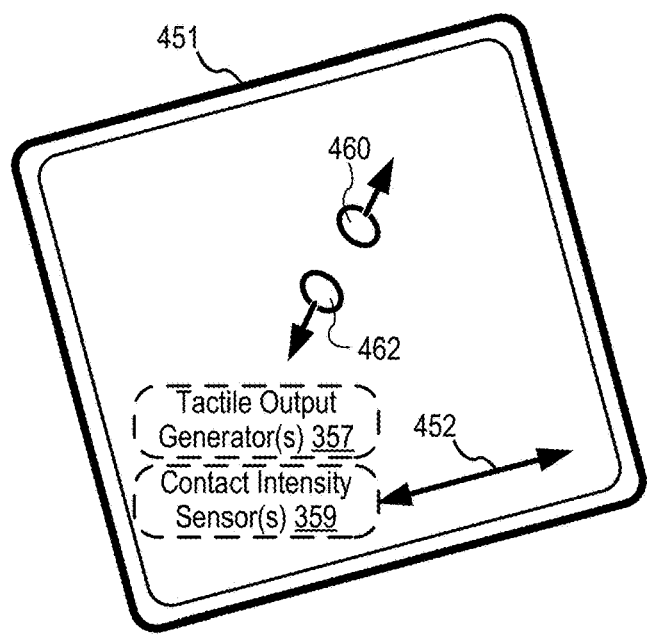

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
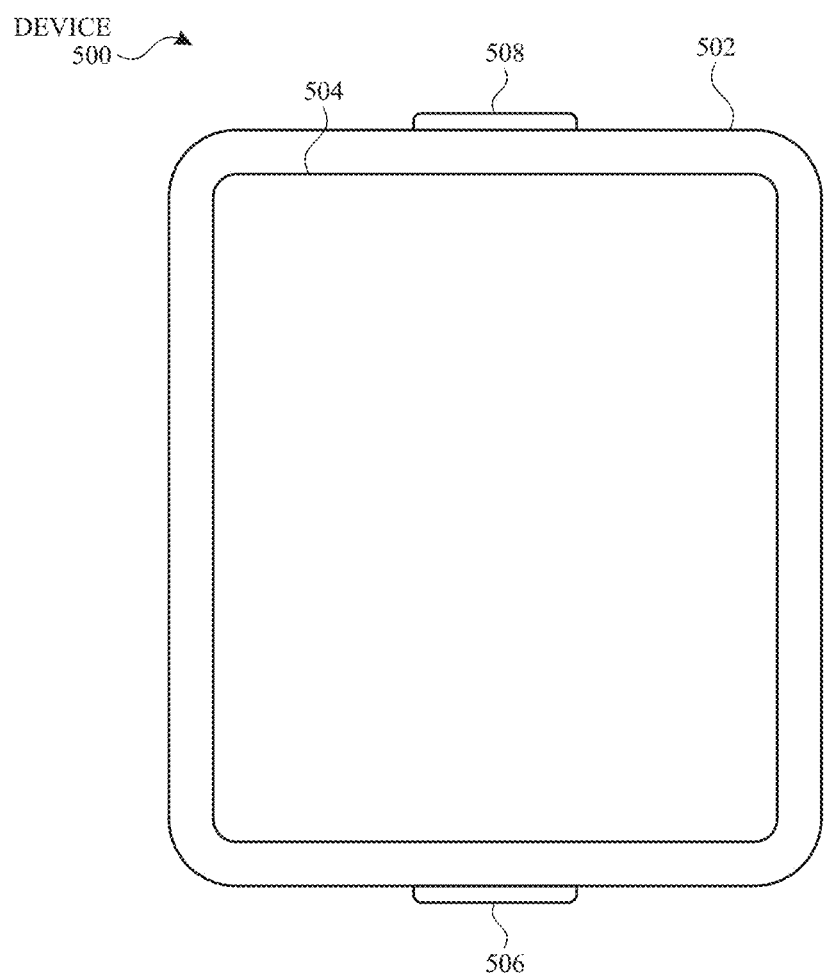
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
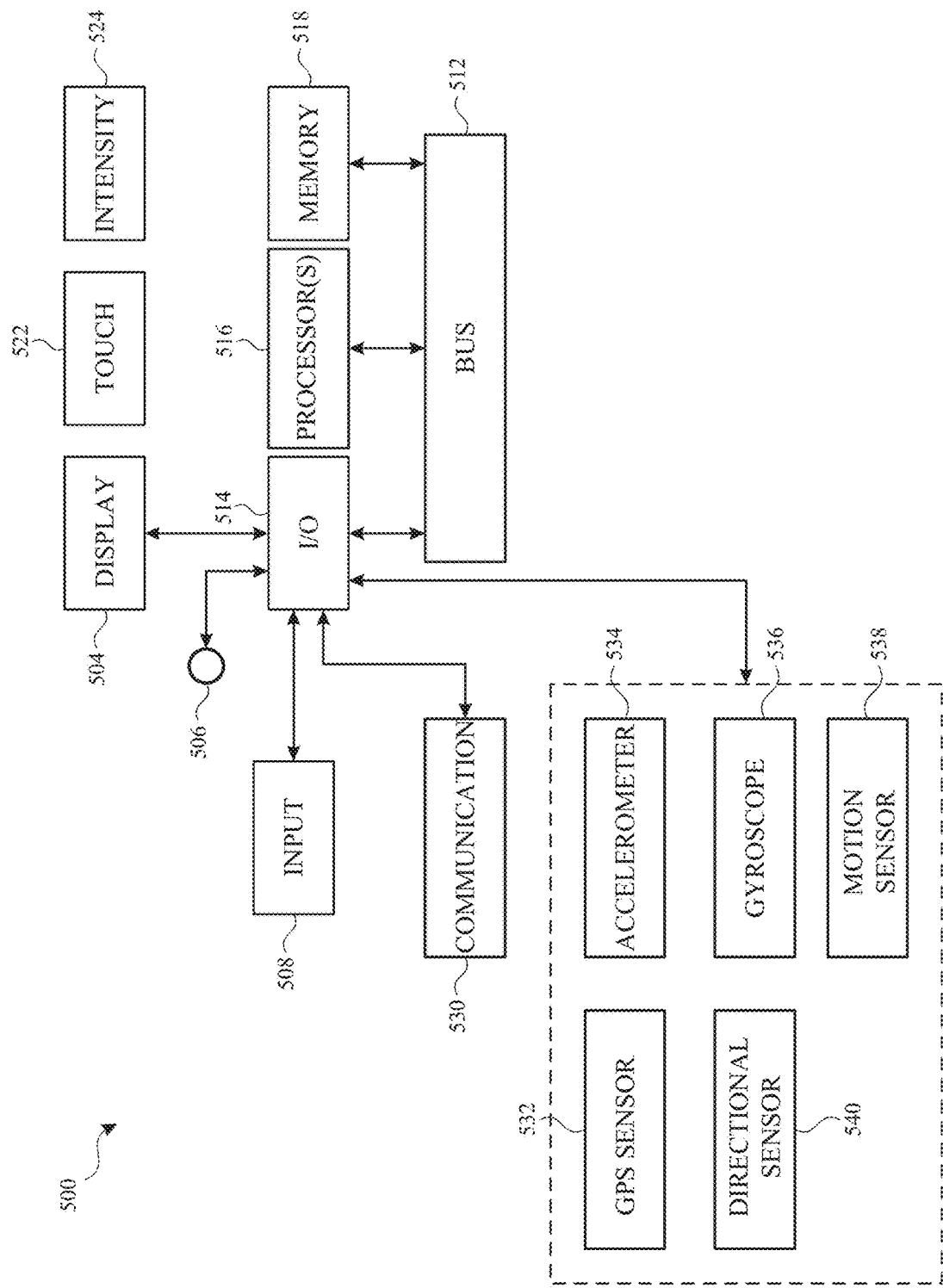
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7A:
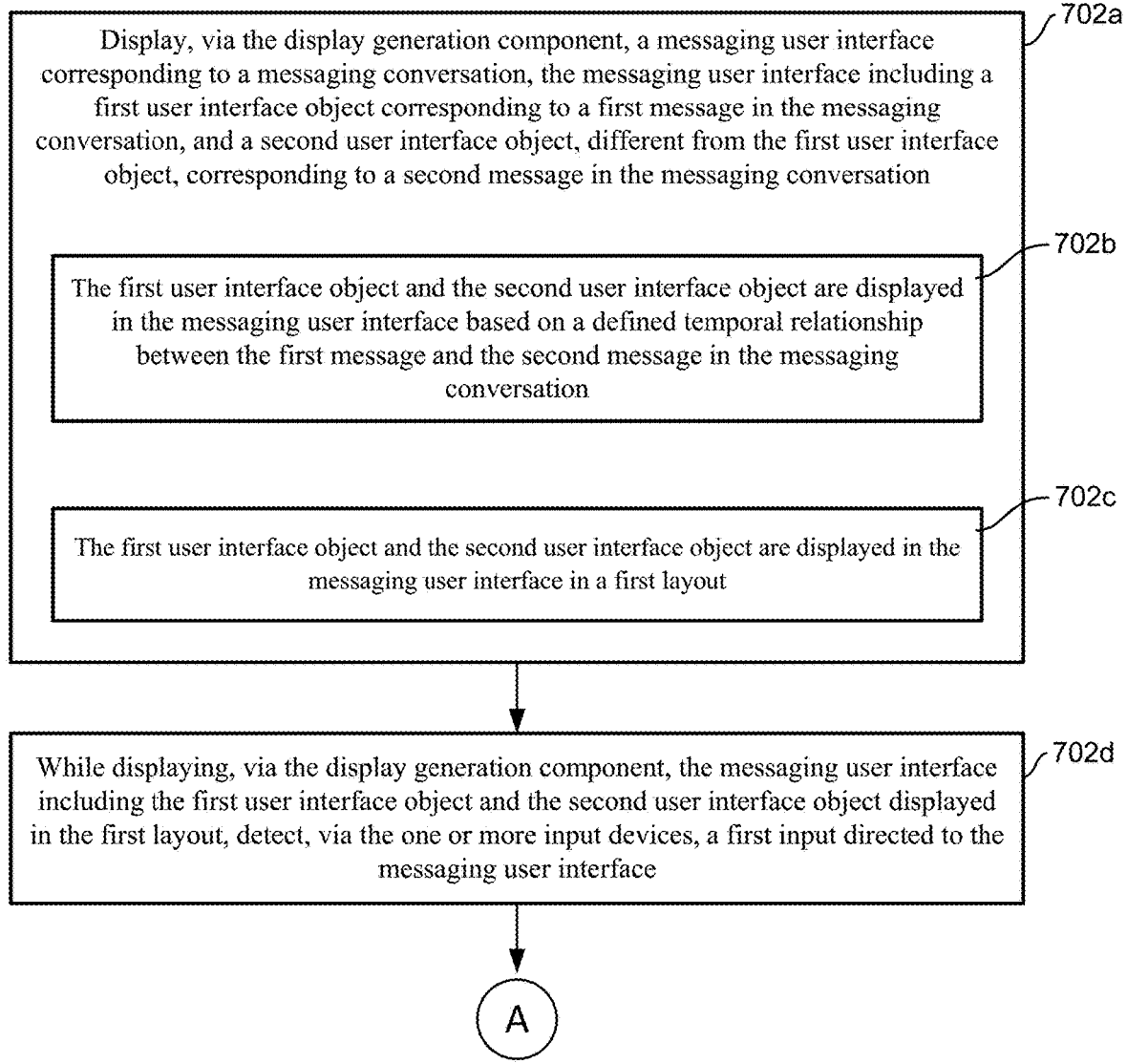
FIGS. 7A and 7B are flow diagrams illustrating a method 700 of displaying a plurality of content items (or user interface objects) corresponding to messages of a messaging conversation in accordance with some embodiments.
Figure 7B:
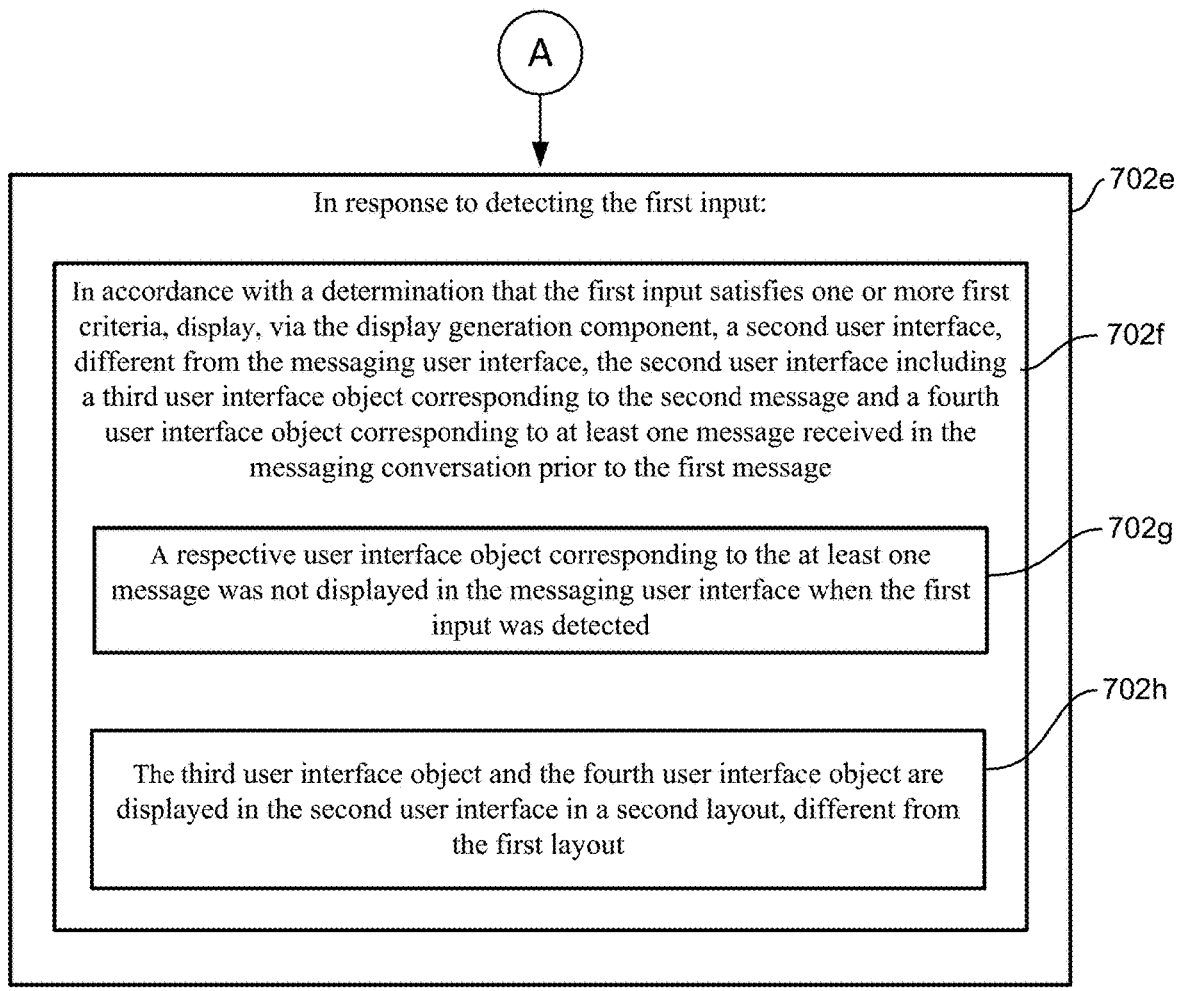
Figure 9:
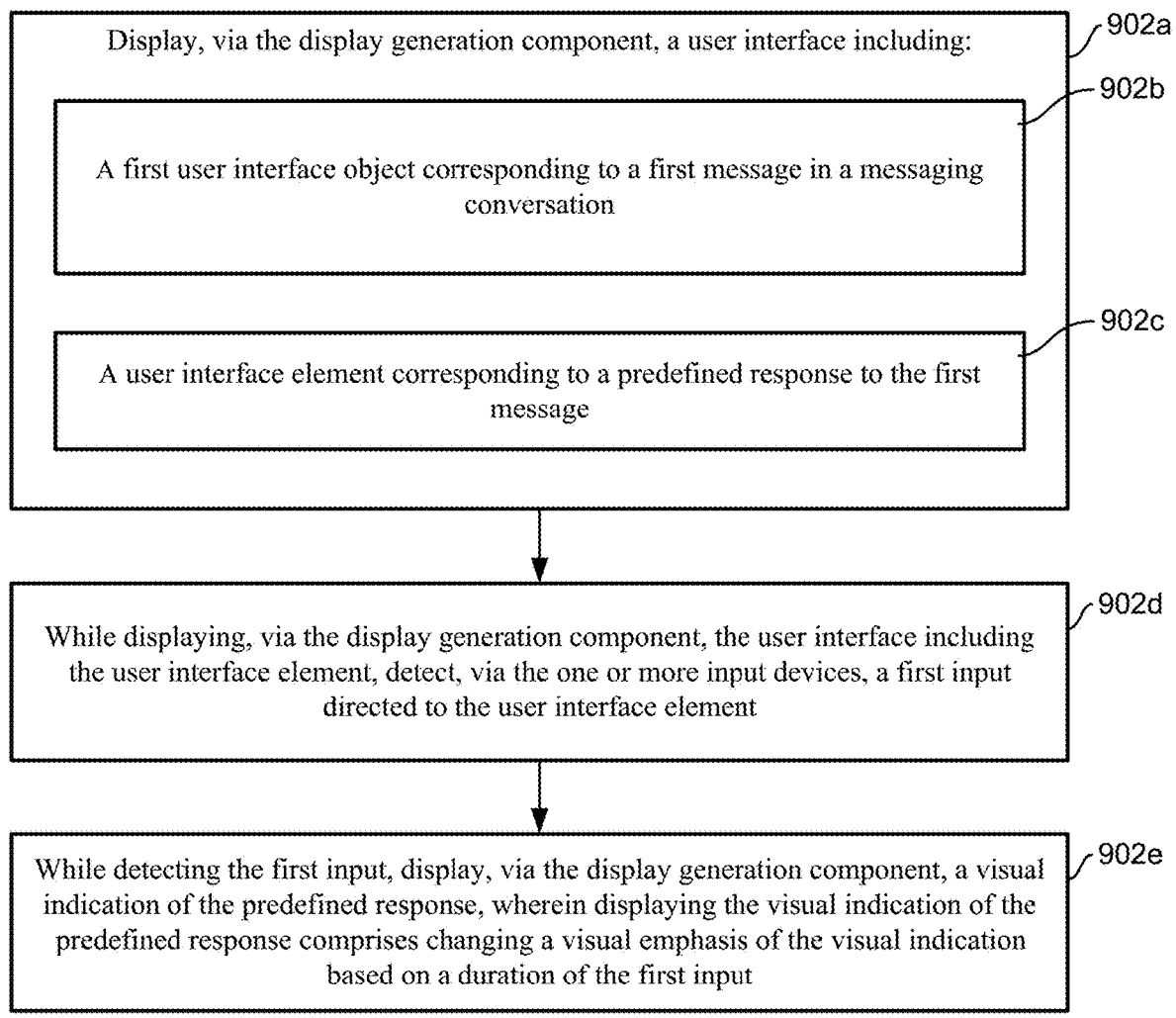
FIG. 9 is a flow diagram illustrating a method 900 of displaying messaging activity to a messaging conversation in accordance with some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A, 7B, and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
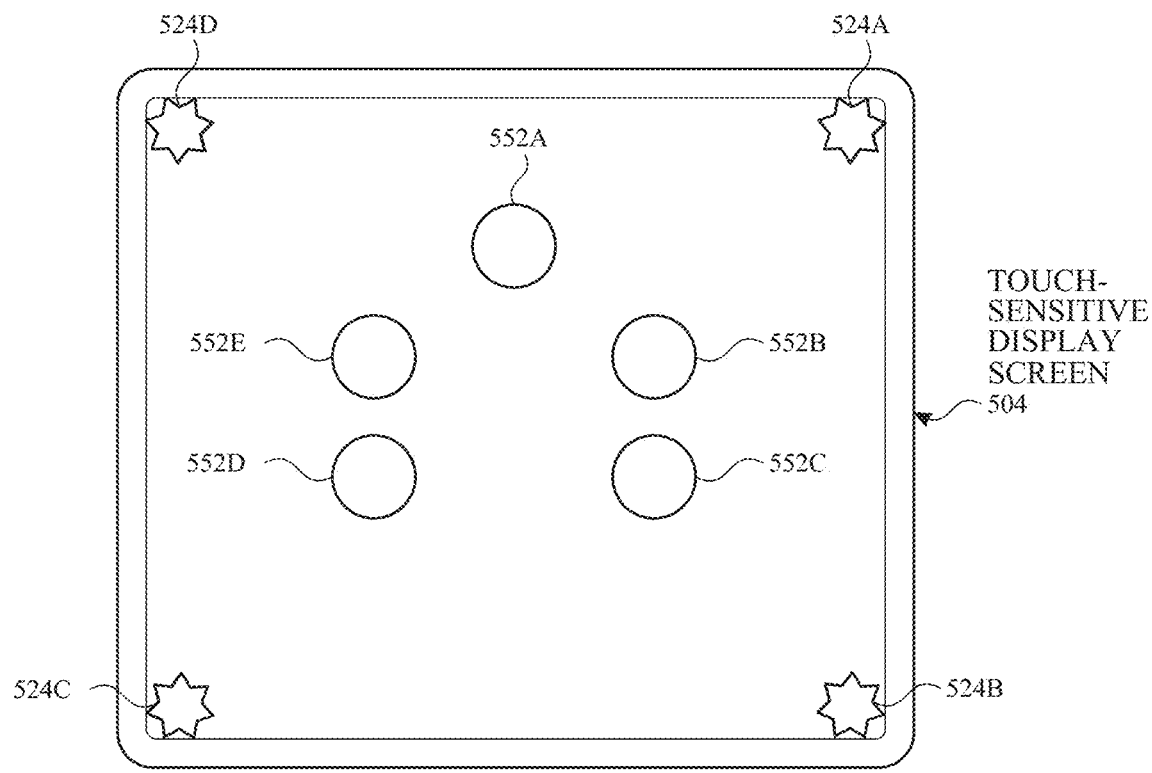
FIGS. 5C-5D illustrate exemplary components of a personal electronic device having a touch-sensitive display and intensity sensors in accordance with some embodiments.
Figure 5C:
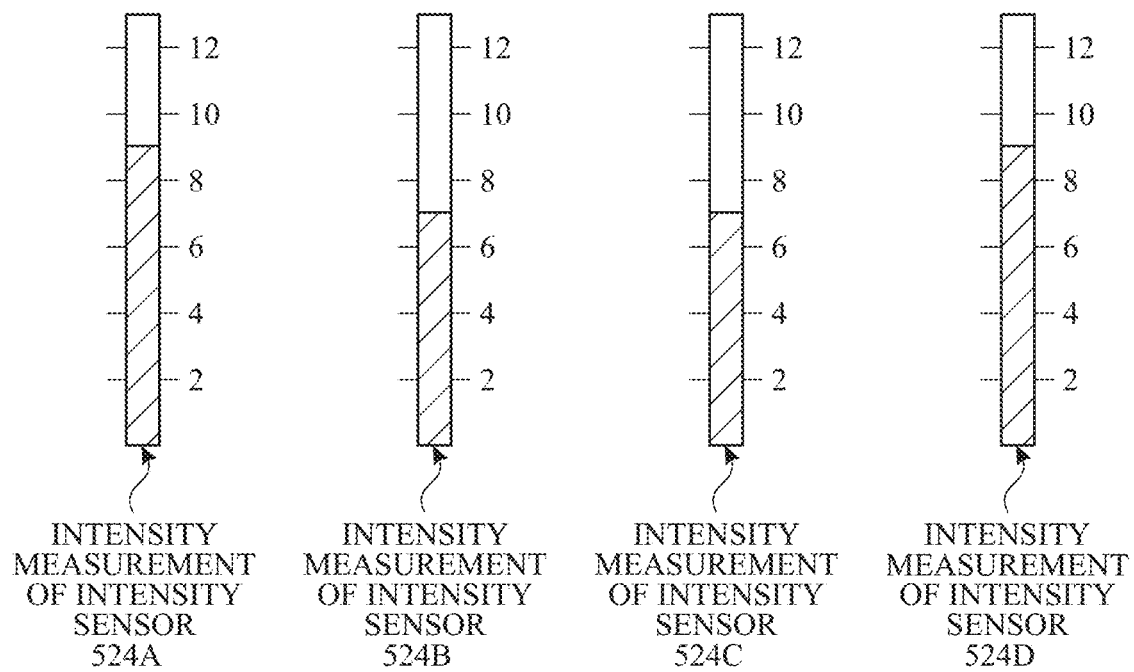
Figure 5D:
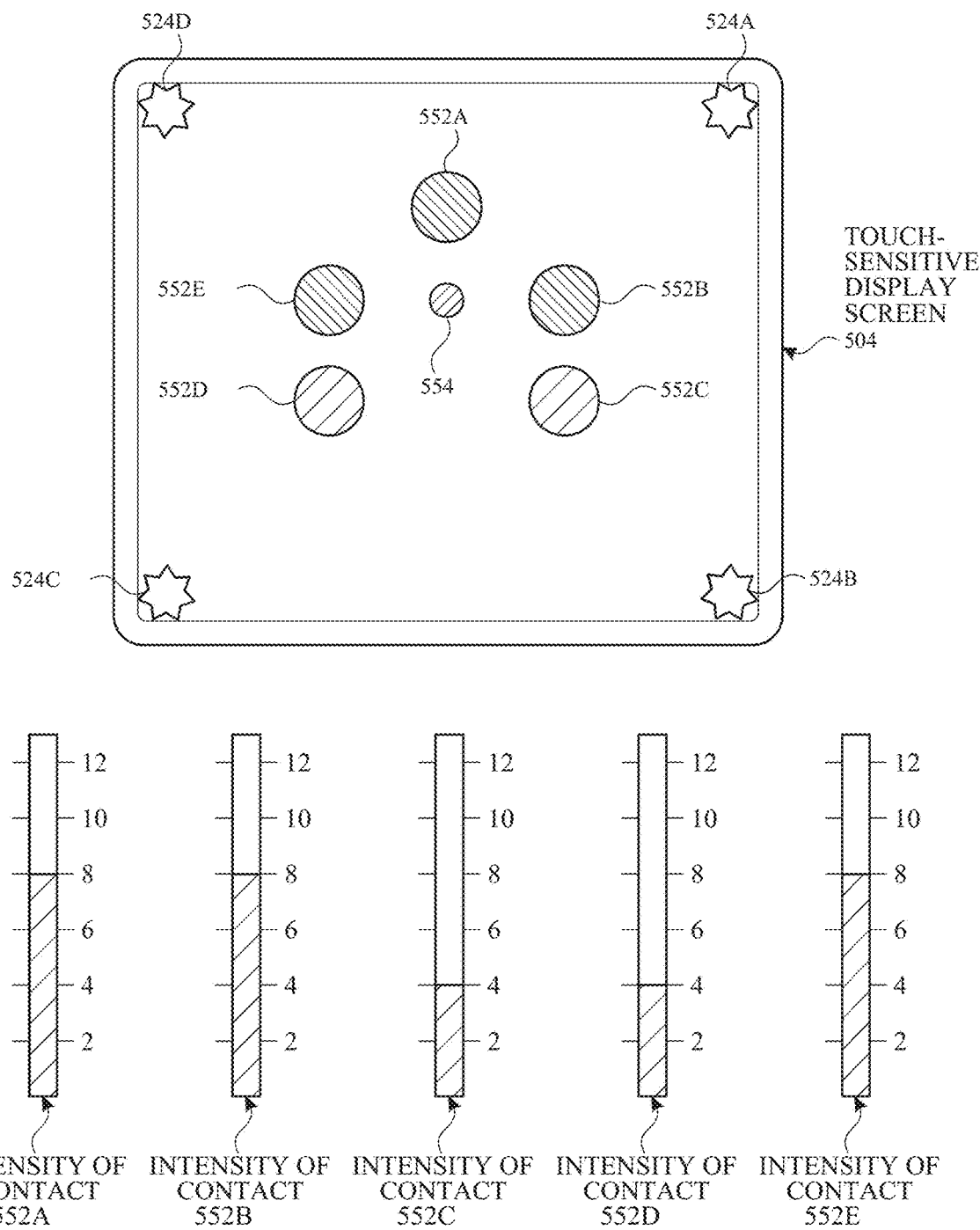

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
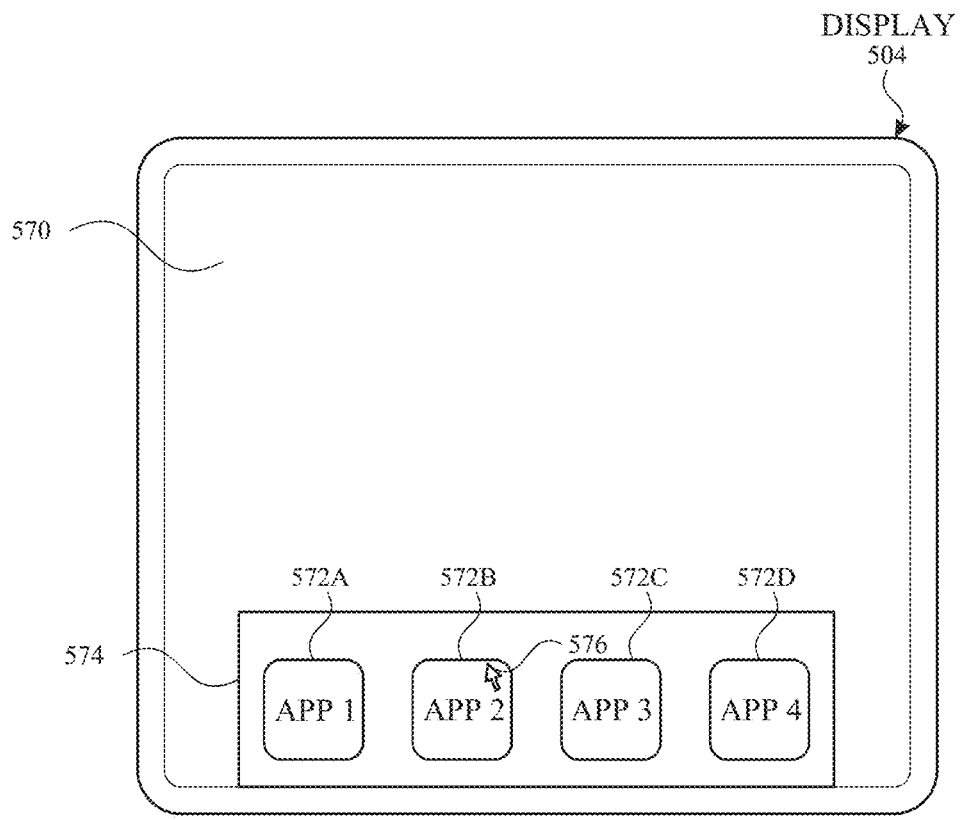
FIGS. 5E-5H illustrate exemplary components and user interfaces of a personal electronic device in accordance with some embodiments.
Figure 5E:
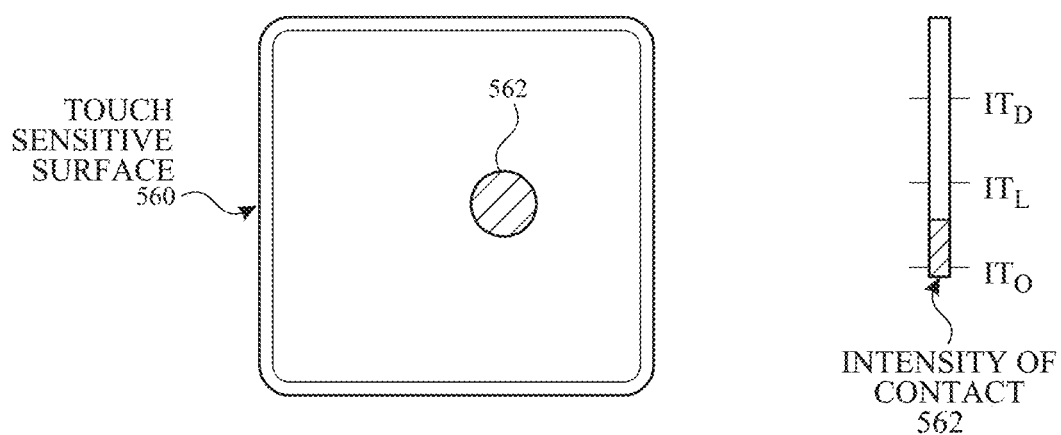
Figure 5F:
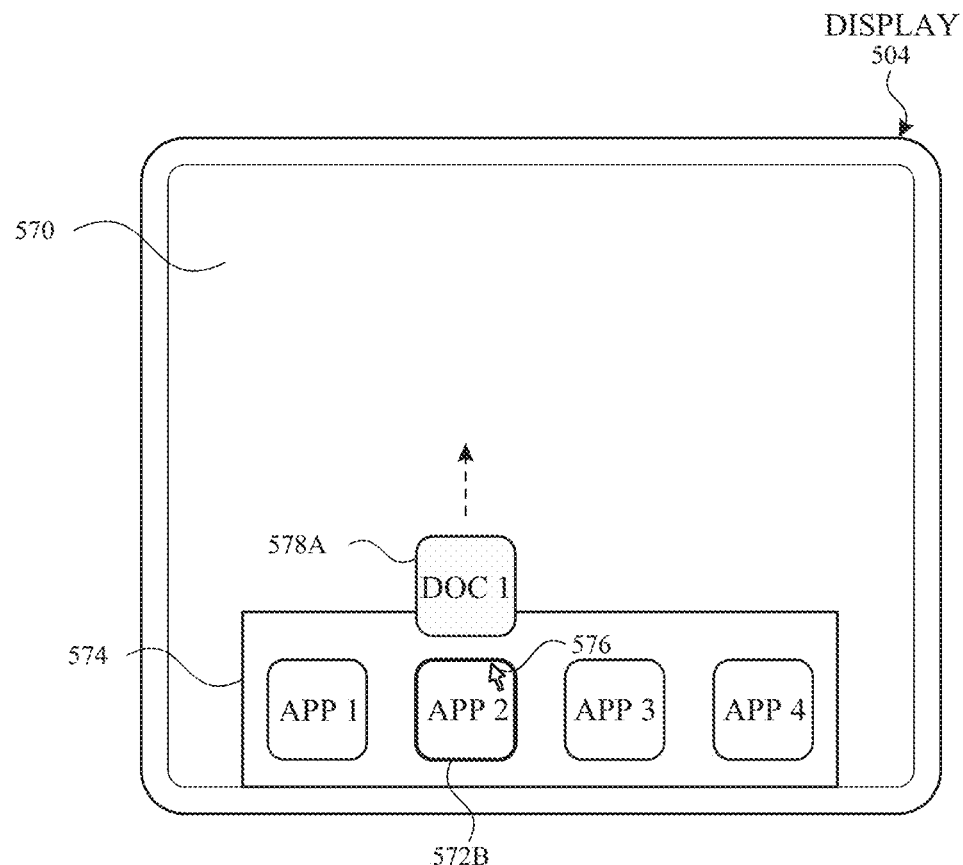
Figure 5F:
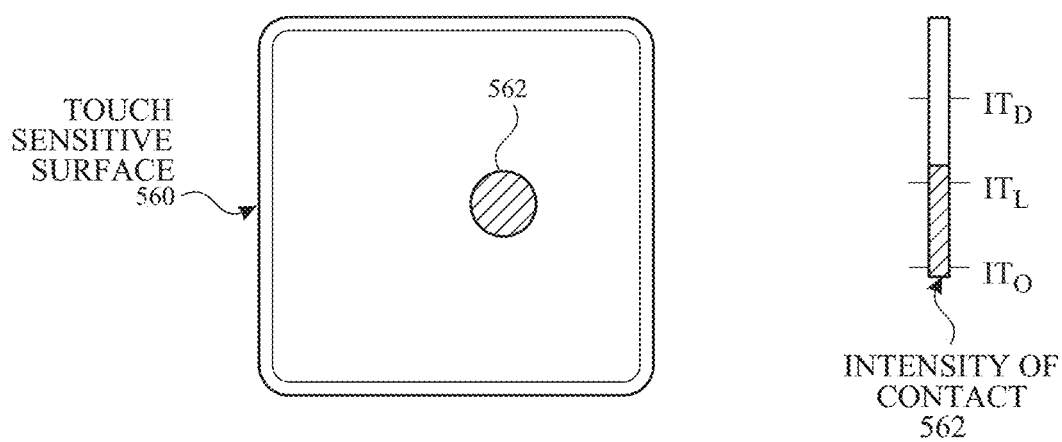
Figure 5G:
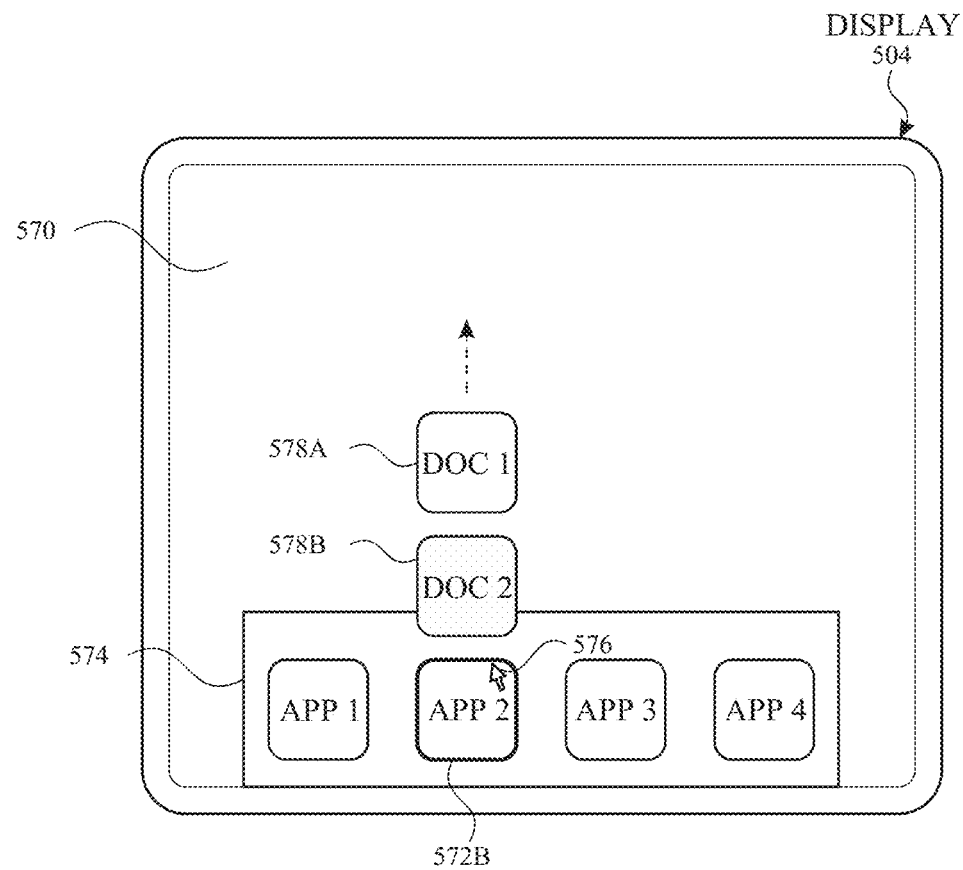
Figure 5G:
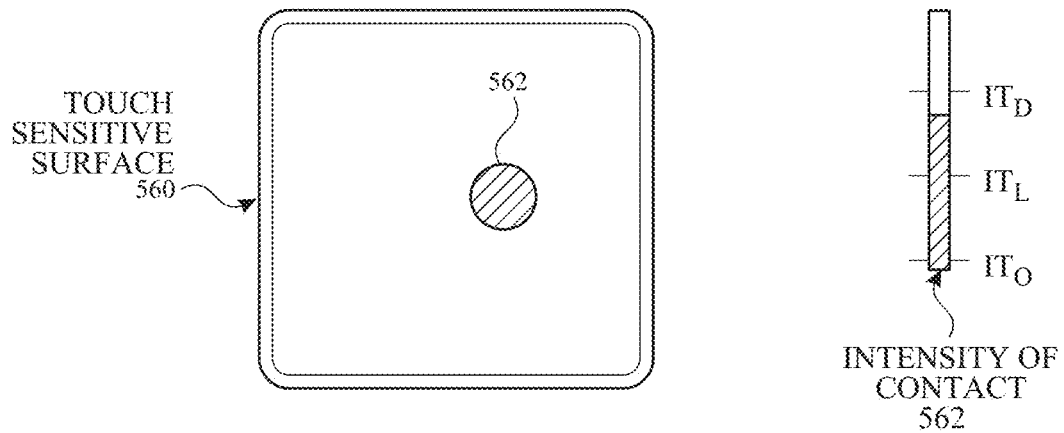
Figure 5H:
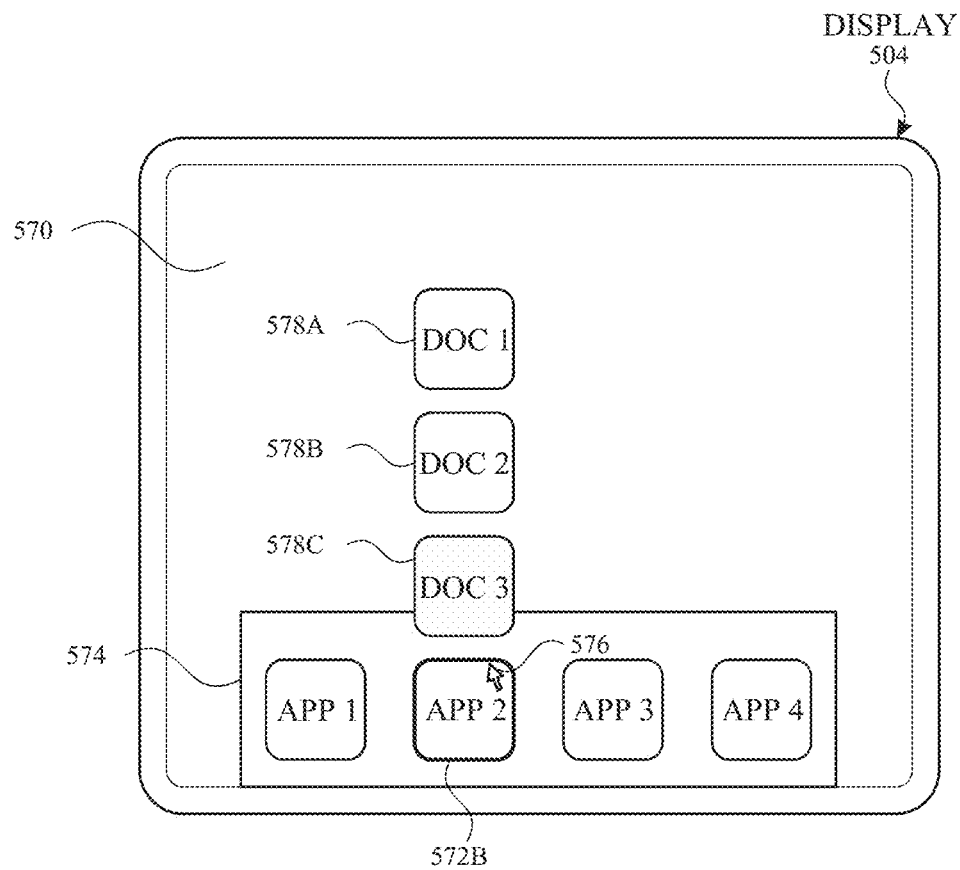
Figure 5H:
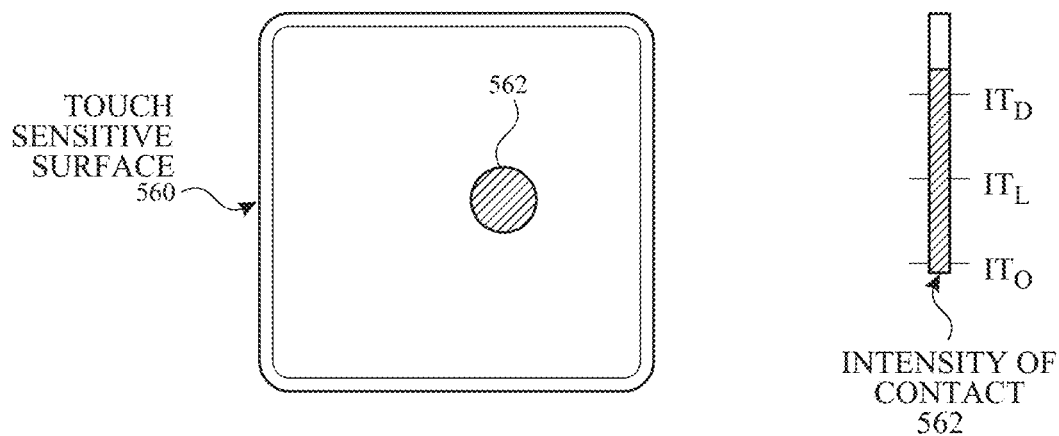

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Displaying a Plurality of Content Items Corresponding to Messages of a Messaging Conversation Users interact with electronic devices in many different manners. In some embodiments, a messaging conversation includes one or more text-based messages and/or messages comprising rich content. The embodiments described below provide ways in which an electronic device displays a plurality of content items corresponding to messages of a messaging conversation, thus enhancing the user's interactions with the electronic device. Enhancing interactions with a device reduces the amount of time needed by a user to perform operations, and thus reduces the power usage of the device and increases battery life for battery-powered devices.

Figure 6B:
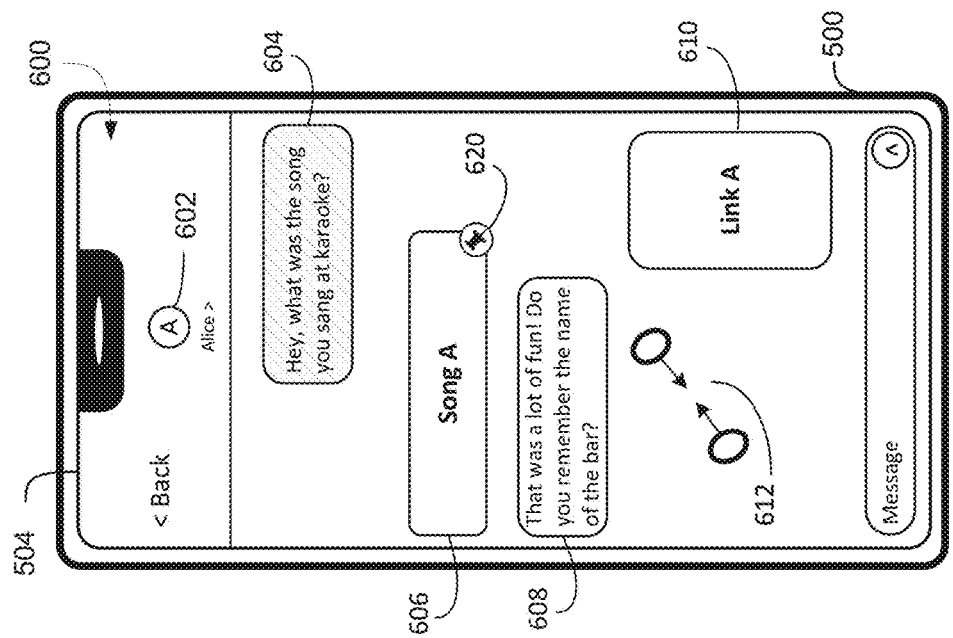
FIGS. 6A-6X illustrate exemplary ways of displaying a plurality of content items (or user interface objects) corresponding to messages of a messaging conversation in accordance with some embodiments of the disclosure.
Figure 6A:
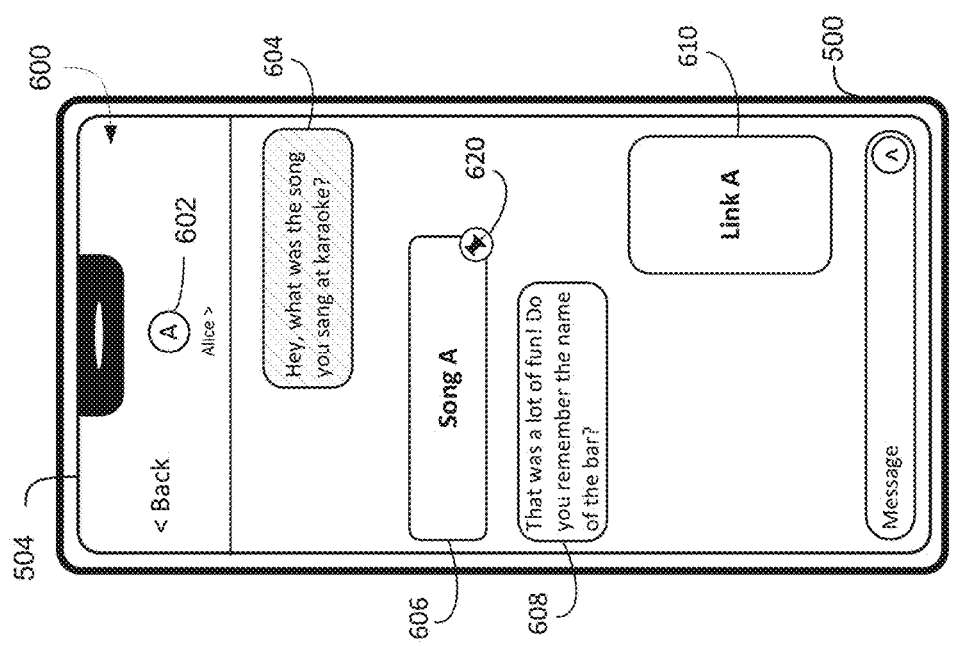
Figure 6D:
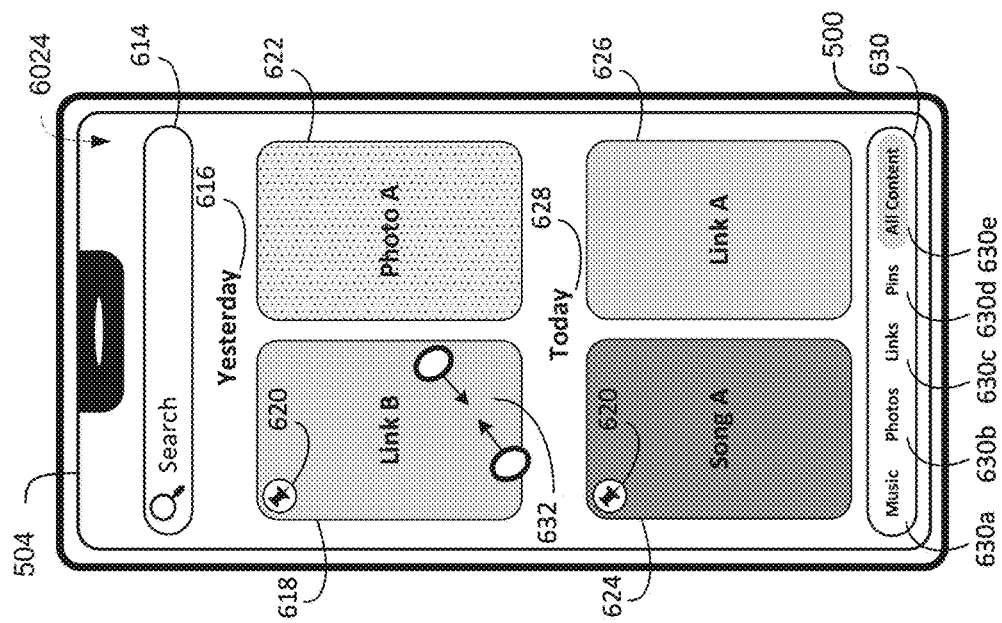
Figure 6C:
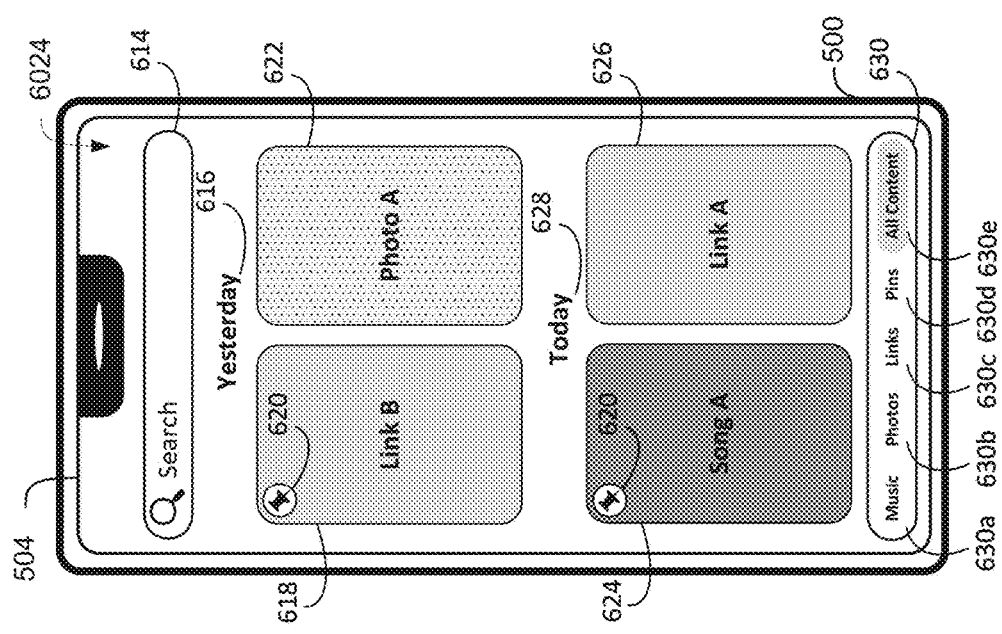
Figure 6F:
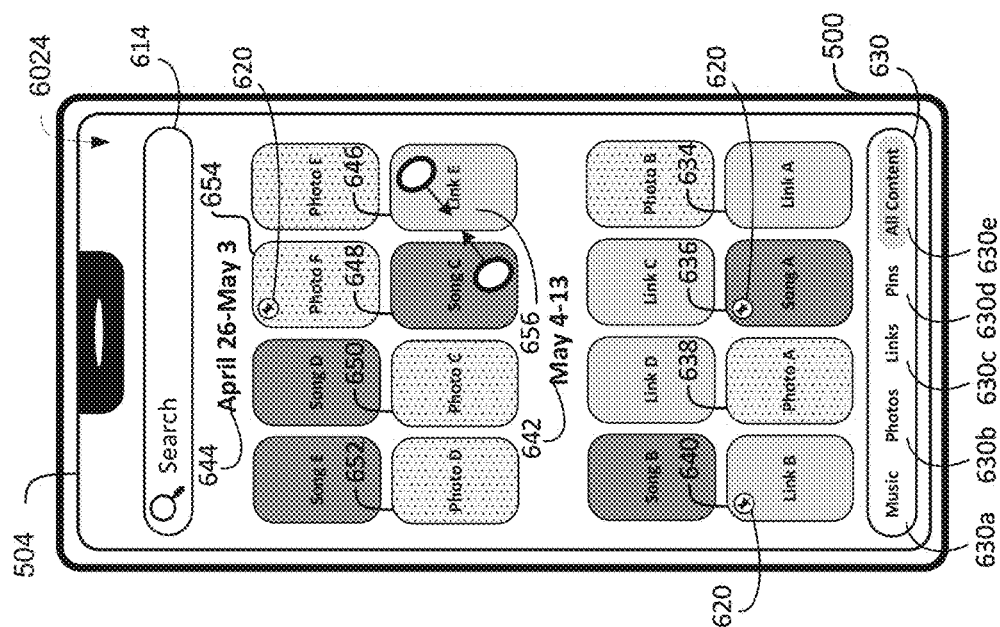
Figure 6E:
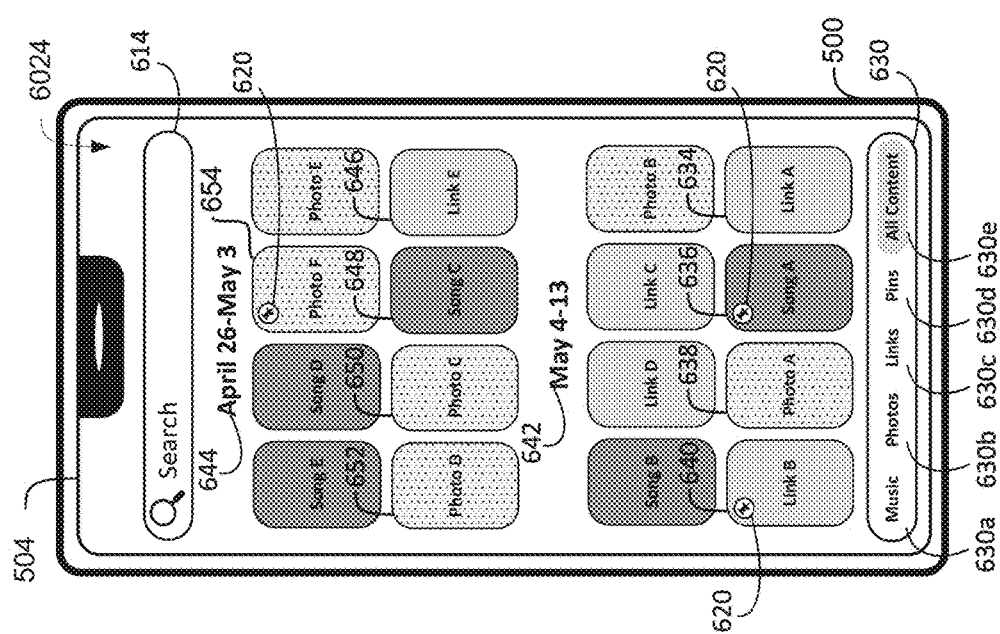
Figure 6H:
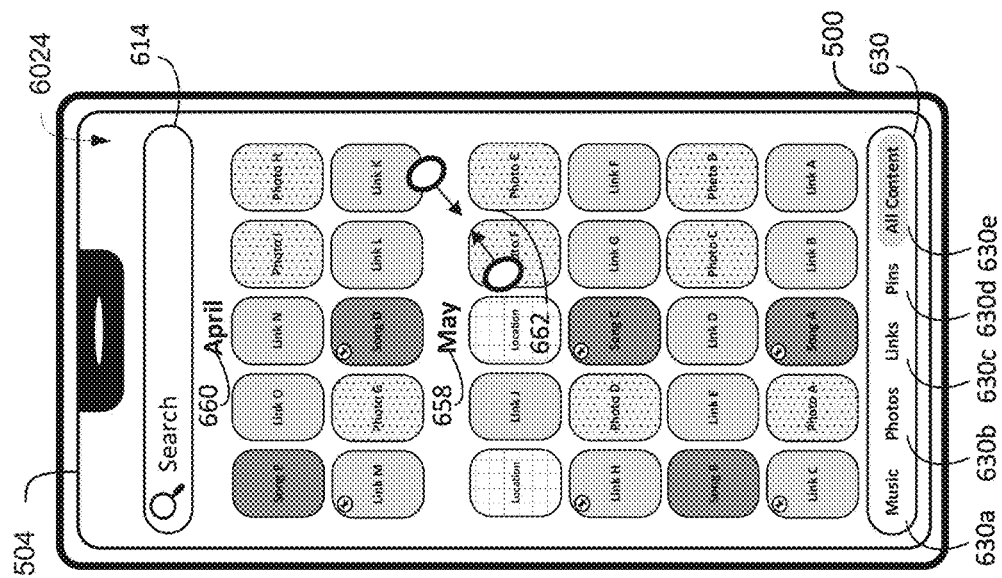
Figure 6G:
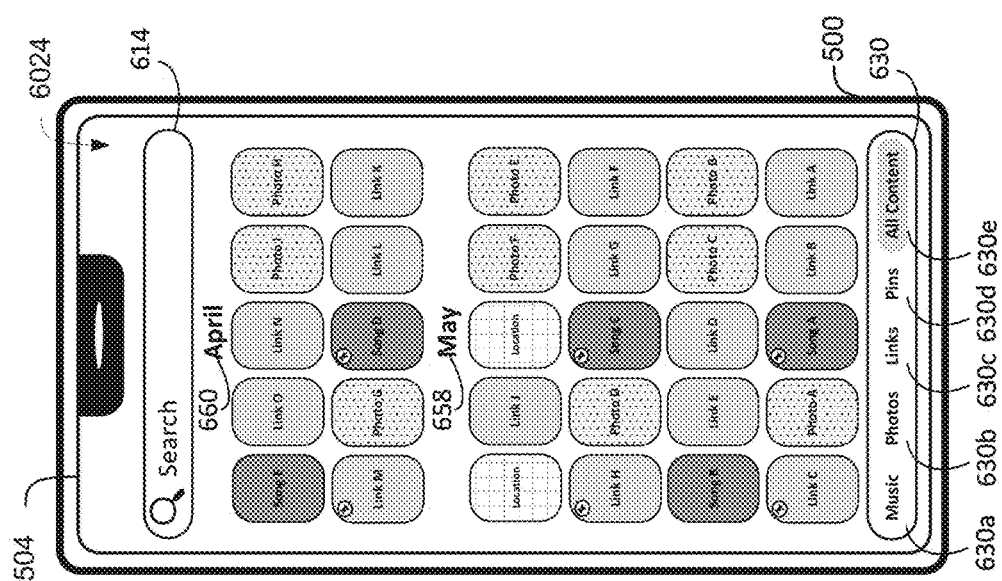
Figure 6J:
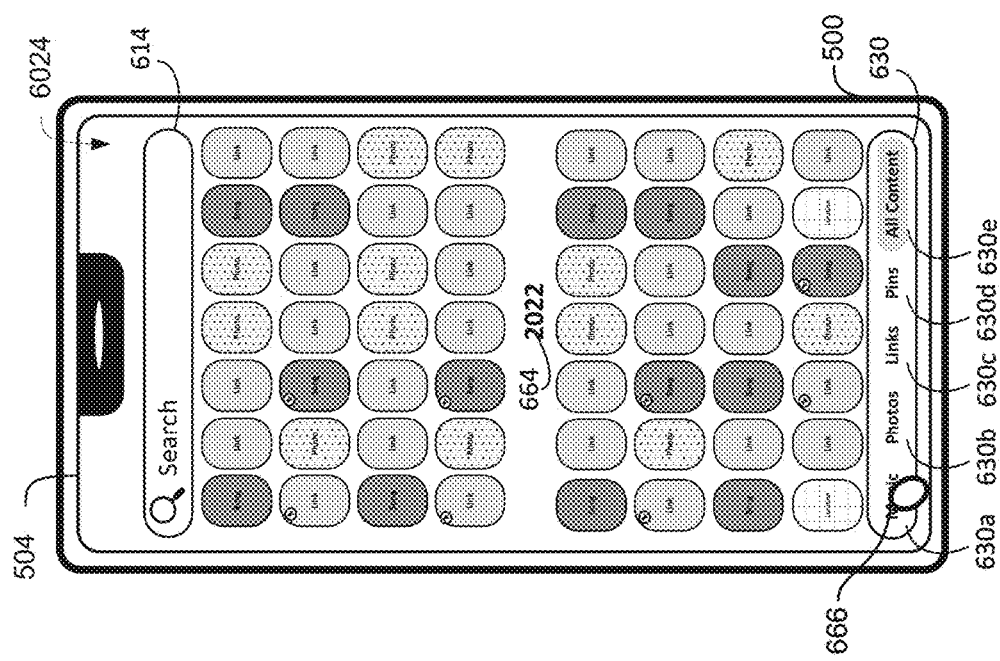
Figure 6I:
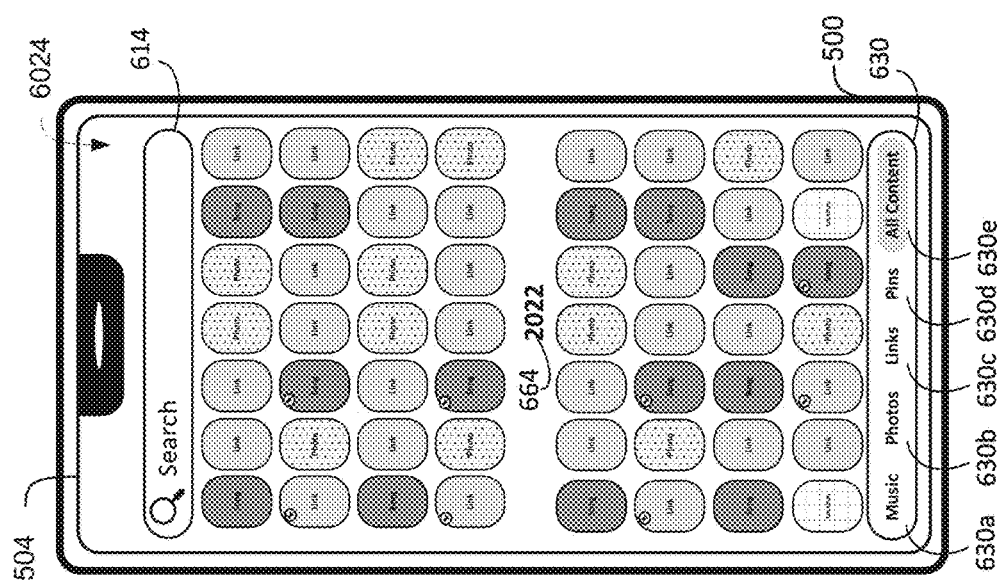
Figure 6L:
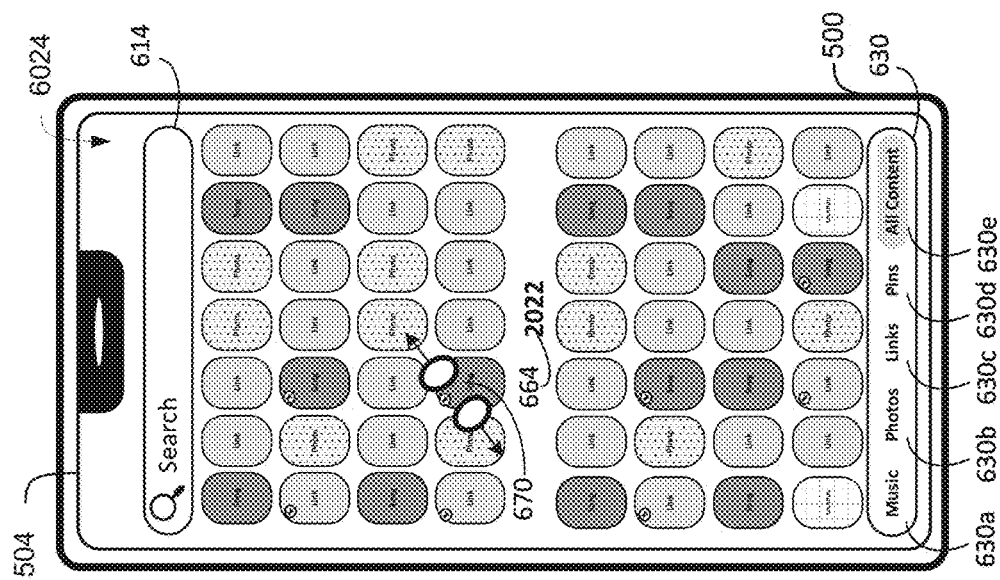
Figure 6K:
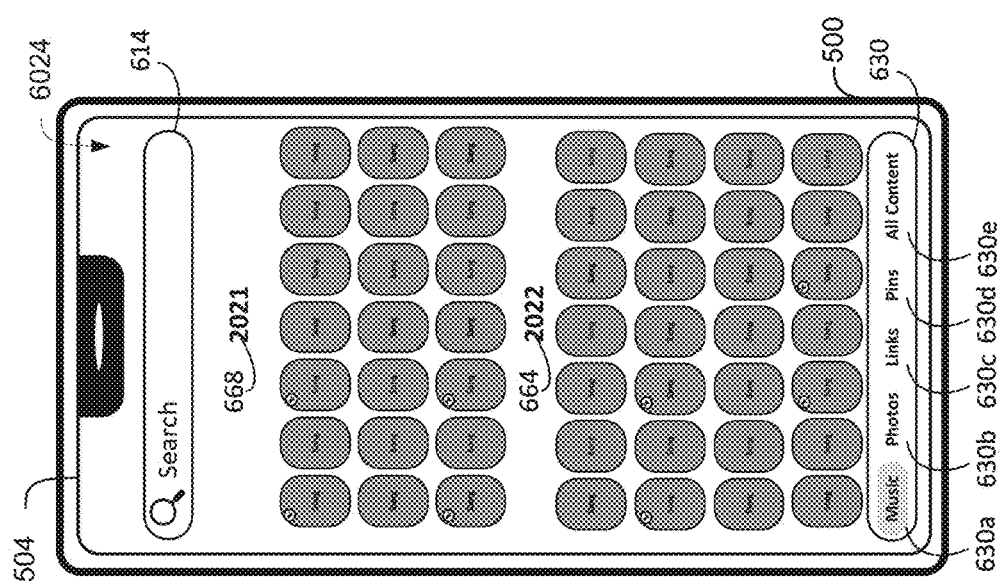
Figure 6N:
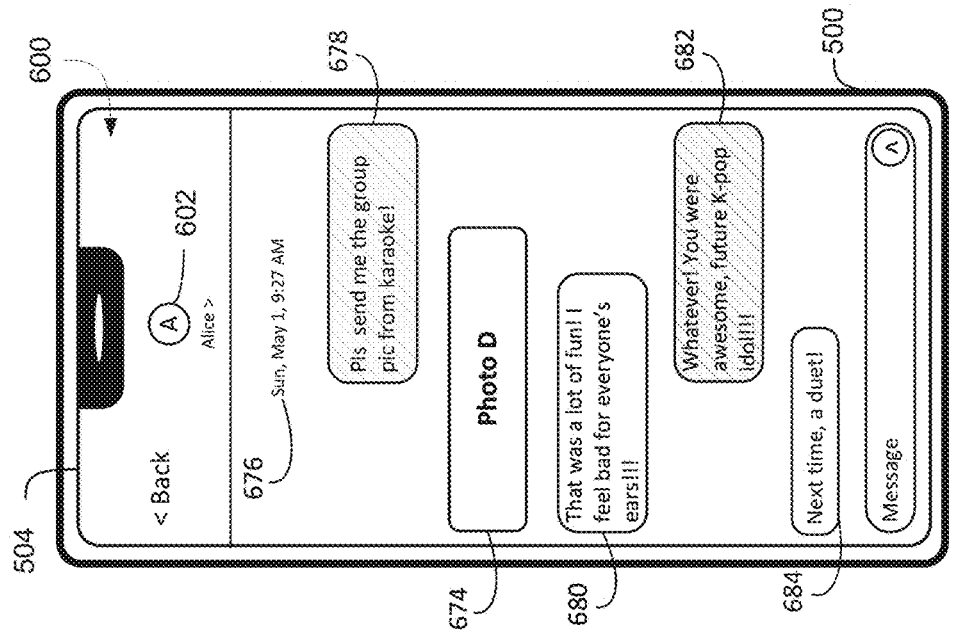
Figure 6M:
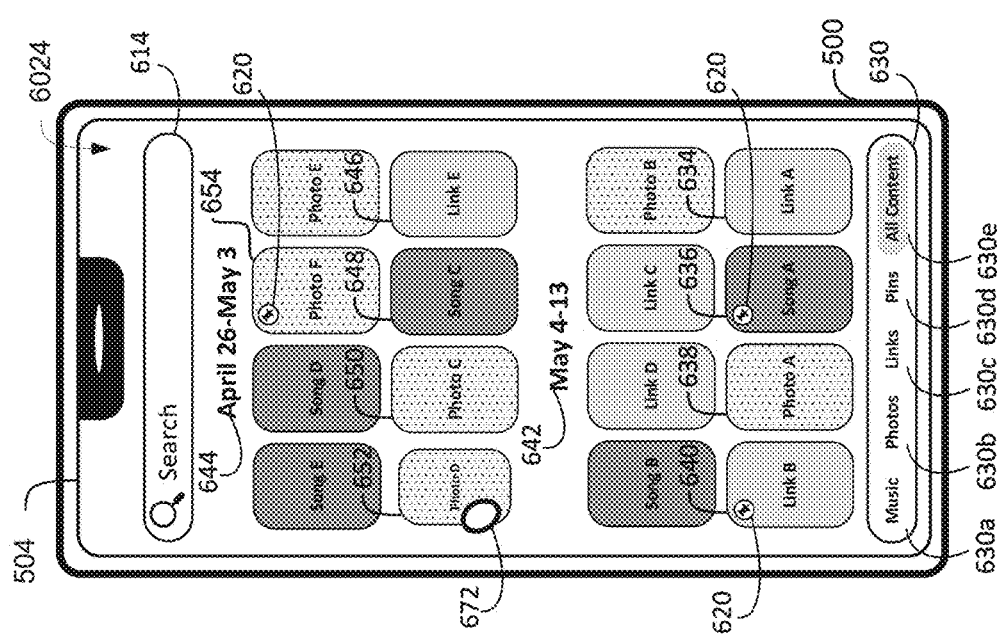
Figure 6P:
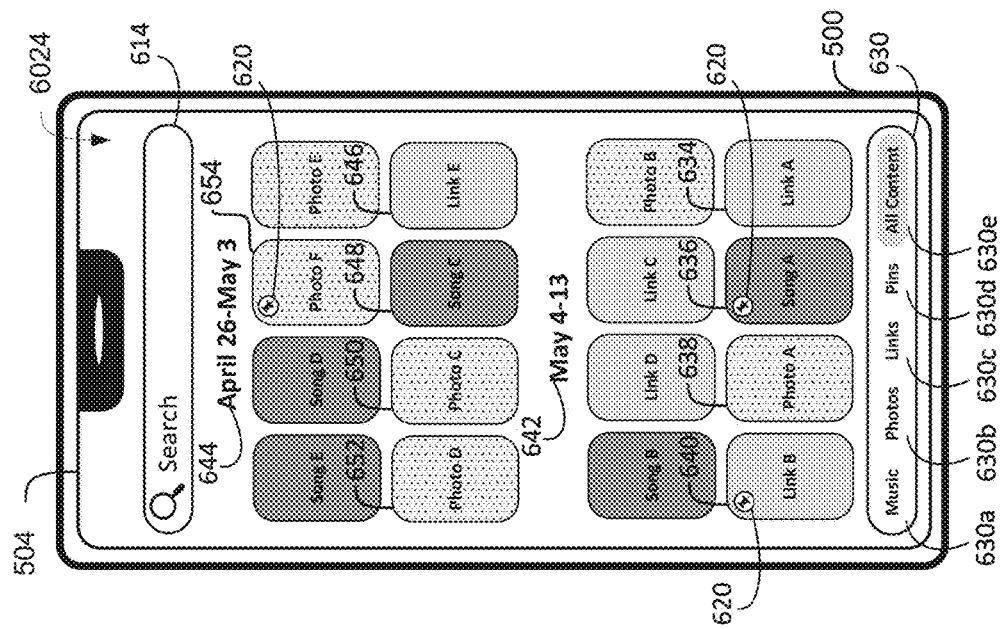
Figure 6O:
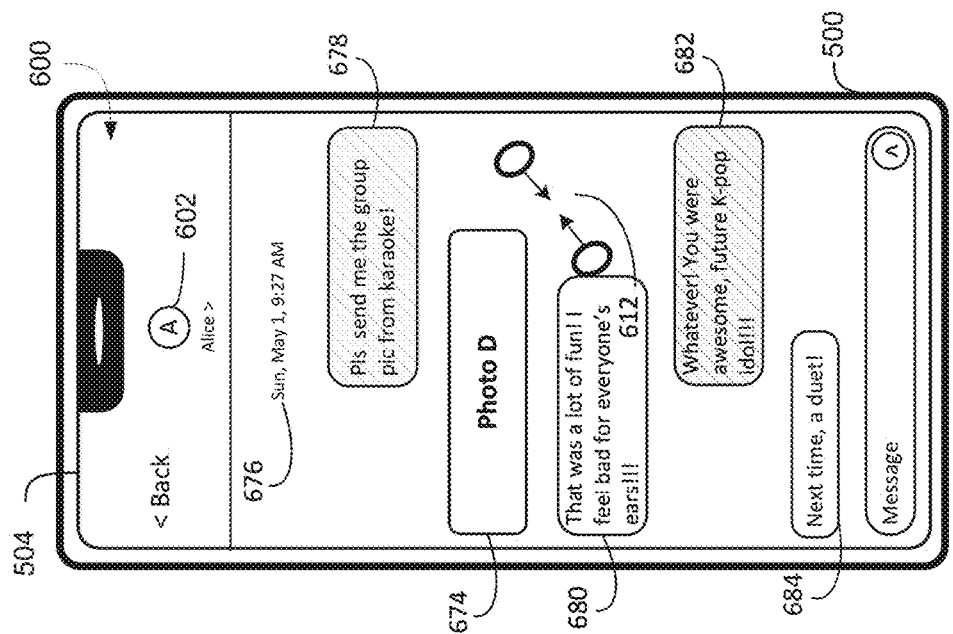
Figure 6R:
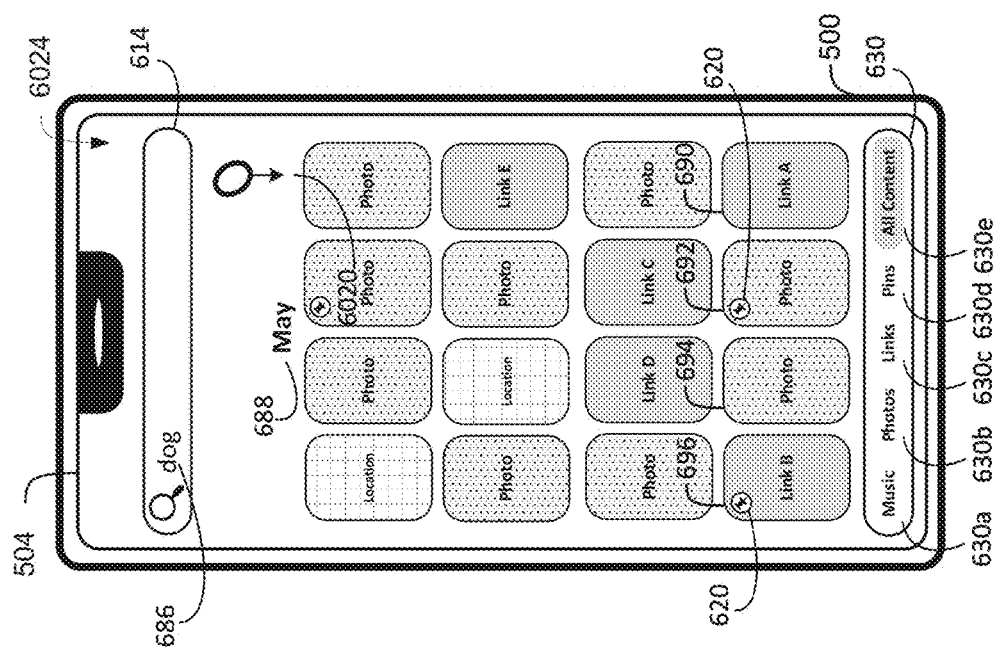
Figure 6Q:
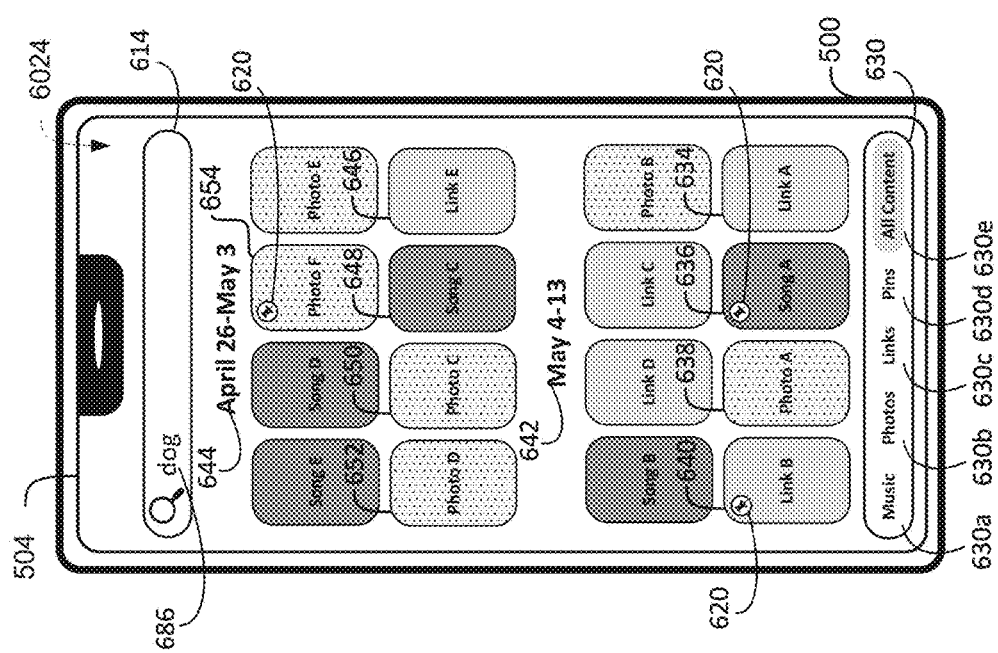
Figure 6T:
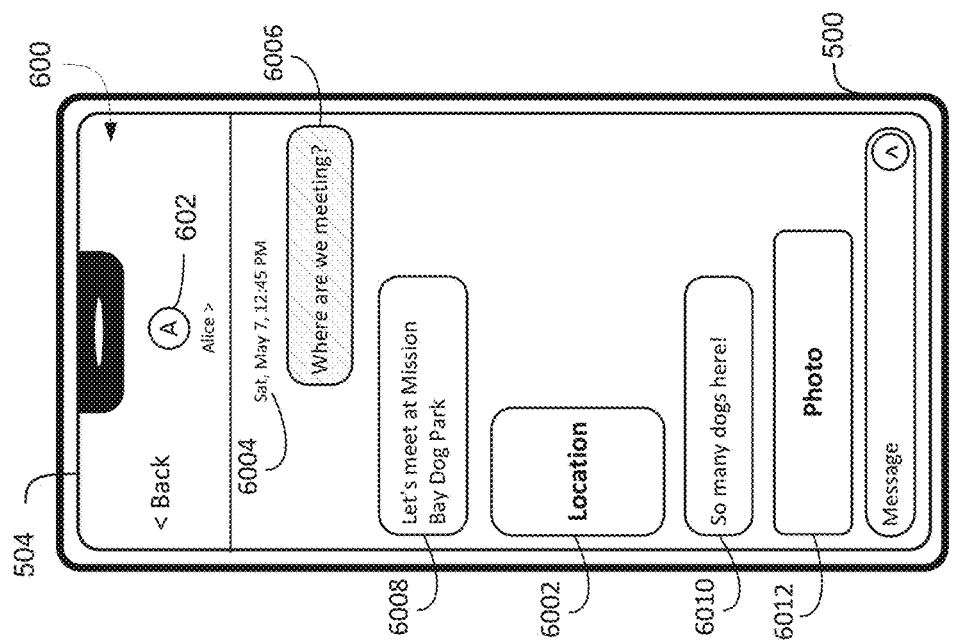
Figure 6S:
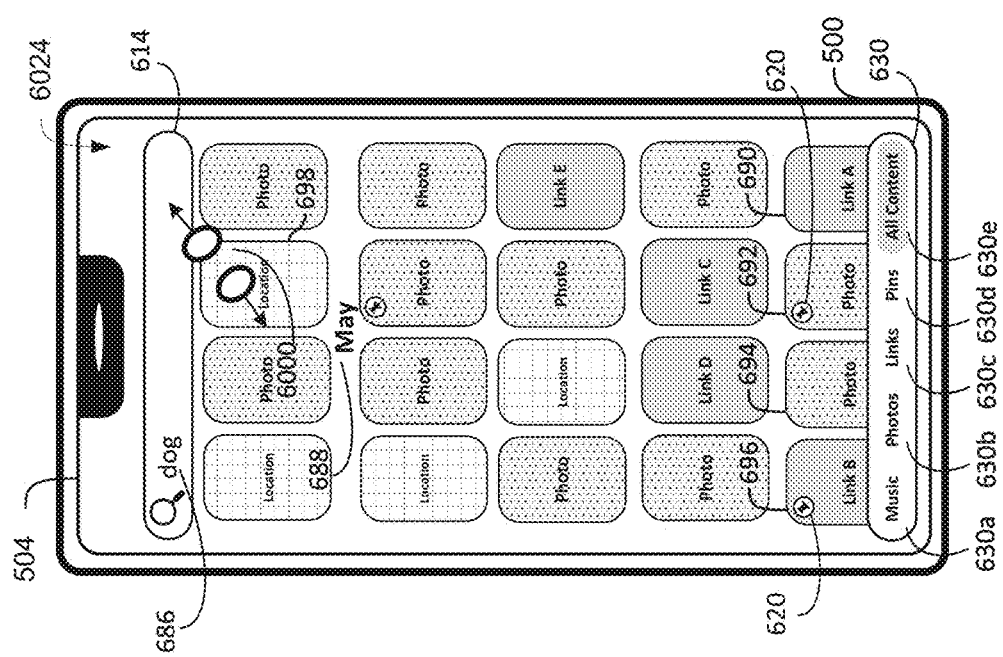
Figure 6V:
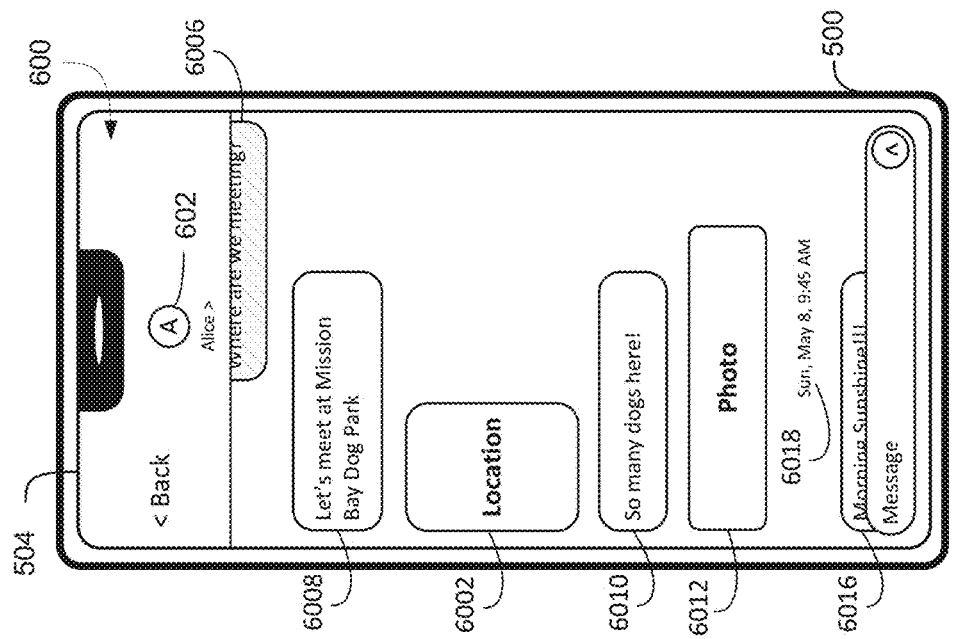
Figure 6U:
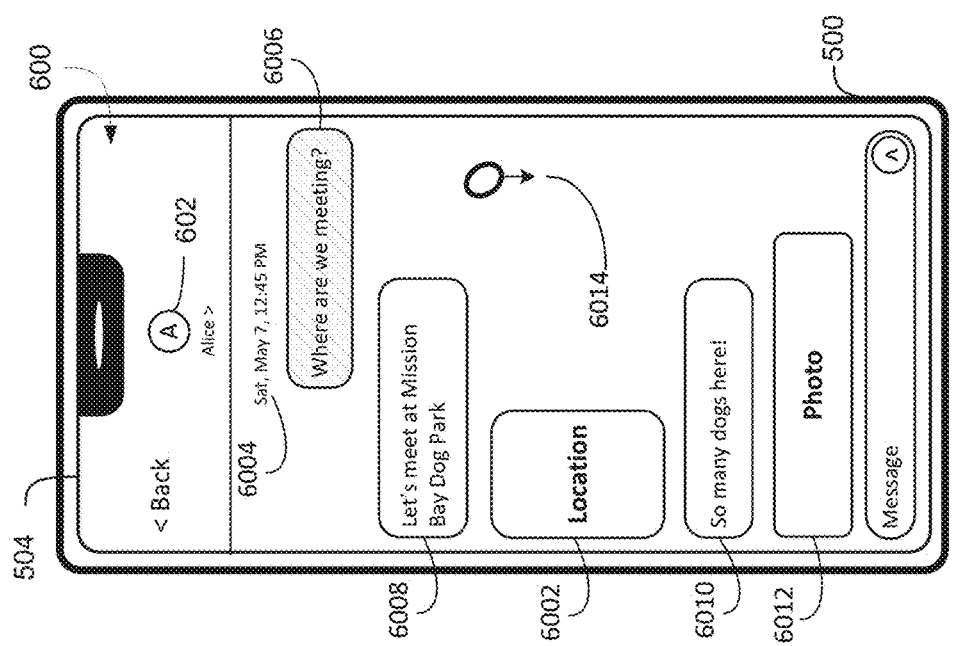
Figure 6X:
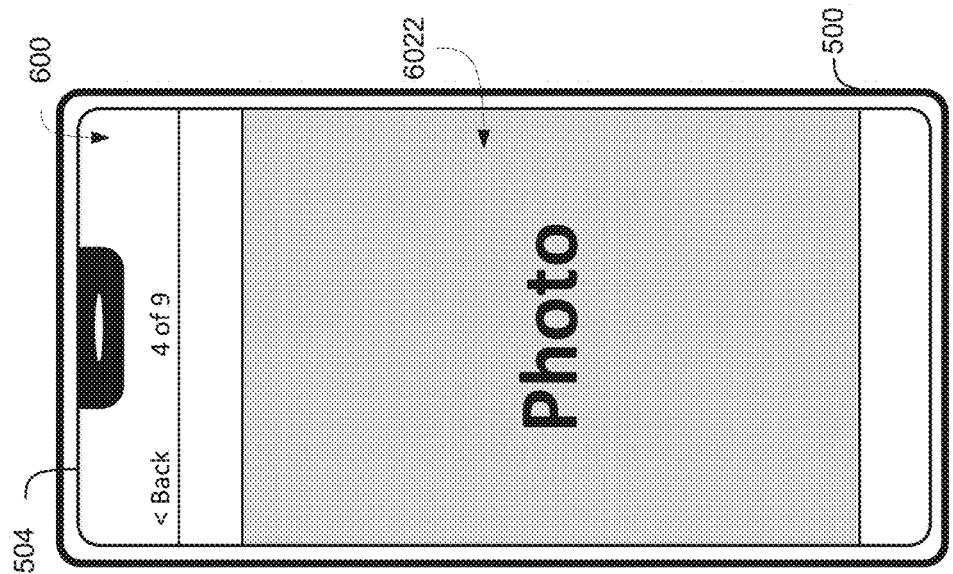

FIGS. 6A-6X illustrate various ways an electronic device displays a plurality of content items (or user interface objects) corresponding to messages of a messaging conversation in accordance with some embodiments of the disclosure. The embodiments in these figures are used to illustrate the processes described below, including the processes described with reference to FIGS. 7A-7B.

FIG. 6A illustrates an exemplary device 500 that includes a touchscreen 504. In FIG. 6A, the electronic device 500 is presenting a messaging user interface 600 that includes a messaging conversation between a user Bob (the user associated with device 500) and a contact named Alice (indicated by the representation 602 of Alice). The messaging user interface 600 includes a first user interface object 604 (or representation) of a first message that was added to the messaging conversation from a device associated with Bob, a second user interface object 606 (or representation) of a second message that was added to the messaging conversation from a device associated with Alice, a third user interface object 608 (or representation) of a third message that was also added to the messaging conversation from the device associated with Alice, and a fourth user interface object 610 (or representation) of a fourth message that was also added to the messaging conversation from the device associated with Bob. In some embodiments, the device 500 displays the first user interface object 604, in messaging user interface 600, in response to device 500 receiving an indication that the device associated with Bob has added the first message to the messaging conversation which included the text "Hey, what was the song you sang at karaoke?" In some embodiments, the device 500 displays the second user interface object 606, in messaging user interface 600, in response to device 500 receiving an indication that the device associated with Alice has added the second message comprising rich content, such as a song A to the messaging conversation. In some embodiments, the device 500 displays the second user interface object 606 including a representation 620 of a pinning attribute indicating that Bob had added a pin affordance or tag to the message indicating that the second user interface object 606 is especially interesting, favorited, and/or prioritized to be consumed before other messages and/or other rich content. In some embodiments, the device 500 displays the third user interface object 608, in messaging user interface 600, in response to device 500 receiving an indication that the device associated with Alice has added the third message to the messaging conversation which included the text "That was a lot of fun! Do you remember the name of the bar?" Similarly, in some embodiments, the device 500 displays the fourth user interface object 610, in the messaging user interface 600, in response to device 500 receiving an indication that the device associated with Bob has added the fourth message to the messaging conversation which includes rich content, such as a link A.

In some embodiments, the device 500 displays user interface objects (e.g., content items or representations of messages) in different manners (e.g., spatial layouts) in response to user input. For example, in FIG. 6B, while device 500 is displaying messaging user interface 600 including user interface objects 604, 606, 608, and 610 displayed in the manner described in FIG. 6A, device 500 receives a request to display a second user interface for managing and/or viewing user interface objects (indicated by touch contact 612 directed to messaging user interface 600). In some embodiments, the input from contacts 612 in FIG. 6B corresponds to a zoom-out input (e.g., in which the contacts 612 move towards each other on touch screen 504).

In some embodiments, the device 500 displays the second user interface including user interface objects corresponding to messages of a particular type of (e.g., text-only, rich content only, or both text and rich content). In some embodiments, the device 500 provides search functionality to search for one or more particular user interface objects, as will be described in more detail with reference to method 700. In some embodiments, the device 500 provides a quick and easy manner of transitioning between displaying a collection of user interface objects corresponding to messages and displaying user interface objects corresponding to messages in a messaging transcript view. Such methods of presenting messages as described in method 700 and shown below facilitate locating particular user interface objects/messages of a messaging conversation, as well as providing a transcript view associated with a desired user interface object described with reference to at least FIGS. 6M and 6N.

Returning to FIG. 6C, in response to receiving the request to display the second user interface, device 500 displays the second user interface 6024 in a second layout. The second layout includes user interface object 626 corresponding to the fourth message, user interface object 624 corresponding to the second message, user interface object 622 corresponding to a fifth message added to the messaging conversation before the first message, and user interface object 618 corresponding to a sixth message added to the messaging conversation before the fifth message, arranged chronologically in a 2×2 grid layout. In some embodiments, the device 500 displays user interface object 626 corresponding to the fourth message (e.g., most recent message) in the bottom, right of the second layout and the user interface object 618 corresponding to the first message (e.g., oldest message) in the top, left of the second layout. In some embodiments, the device 500 displays a time indicator 628 indicating that user interface objects 624 and 626 corresponding to messages were added to the messaging conversation today. In some embodiments, the device 500 displays user interface objects 618 and 622 below indicator 616 because their corresponding messages were added to the messaging conversation yesterday. In some embodiments, the device 500 displays user interface object 624 including the representation 620 of the pinning attribute applied to the second user interface object from the messaging user interface 600 in FIG. 6B. Similarly, the device 500 displays user interface object 618 including the representation 620 of the pinning attribute applied to a corresponding user interface object (not shown) of the messaging user interface 600. In some embodiments, the device 500 displays the user interface objects with different color hues according to their corresponding message type. For example, in FIG. 6C, user interface objects corresponding to web-link type messages are displayed with a light grey color (e.g., user interface objects 618 and 626). In contrast, user interface object 624 corresponding to a music-type message includes a darker grey color hue. Other means for displaying user interface objects with varying visual appearances are described with reference to method 700.

FIG. 6C further illustrates time indicators 616 and 628 indicating a time at which the messages corresponding to user interface objects 626, 624, 622, and 618 were received by device 500. In some embodiments, the device 500 displays time indicators 616 and 628 near their corresponding messages in the first layout. In some embodiments, the device 500 displays content filtering user interface element 630 having a plurality of selectable options to filter user interface objects according to type. For example and as illustrated in FIG. 6C, the content filtering user interface element 630 includes a selectable option 630a to display only user interface objects identified as music, a selectable option 630b to display only user interface objects identified as photos/images and/or videos, a selectable option 630c to display only user interface objects identified as web links, a selectable option 630d to display only user interface objects identified as pinned (e.g., having a pin attribute) and/or a selectable option 630e to display all content (e.g., do not apply any content filters). As illustrated in FIG. 6C, the selectable option 630e is selected, and in response, the device 500 displays all user interface objects for the second layout, such as user interface objects 626, 624, 622, and 618. Additional content filtering operations will be described and illustrated in more detail later.

As mentioned previously, the device 500 optionally displays user interface objects in different layouts in response to user input. For example, in FIG. 6D, while device 500 is displaying second user interface 6024 in the second layout including user interface objects 626, 624, 622, and 618 displayed in the manner described in FIG. 6C, device 500 receives a request to display the second user interface in a third layout (indicated by touch contacts 632 directed to second user interface 6024), different from the second layout and the messaging user interface in the first layout. In some embodiments, the input from contacts 632 in FIG. 6D corresponds to a zoom-out input (e.g., in which the contacts 632 move towards each other on touch screen 504).

In response to receiving the request to display the second user interface in the third layout, in FIG. 6E, device 500 displays the second user interface 6024 in the third layout where a plurality of user interface objects are arranged in a 4×4 grid layout. The plurality of user interface objects includes user interface object 634 corresponding to the fourth message, user interface object 636 corresponding to the second message, user interface object 638 corresponding to the fifth message added to the messaging conversation before the first message, and user interface object 640 corresponding to the sixth message added to the messaging conversation before the fifth message. In some embodiments, the device 500 displays user interface object 636 including the representation 620 of the pinning attribute applied to the second user interface object from the messaging user interface 600 in FIG. 6B. Similarly, the device 500 displays user interface object 640 including the representation 620 of the pinning attribute applied to a corresponding user interface object (not shown) of the messaging user interface 600. In some embodiments, the device 500 displays time indicators 642 and 644 for the third layout. When in the third layout, the device 500 groups the user interface objects in weekly date-based groups. As illustrated in FIG. 6E, the time indicator 642 corresponds to a most recent weekly group spanning approximately (plus or minus) 1, 2, 3, 4, or 5 days. In some embodiments, the most recent user interface object 634 is positioned in the far right, bottom of the second user interface 6024 in the third layout, and an older user interface object 640 (e.g., includes a corresponding message received prior to the message corresponding to the first message in the messaging conversation) in the weekly group is positioned in the far left, top of the second user interface 6024 in the third layout. Similarly, the device 500 displays, in the third layout, time indicator 644 corresponding to a weekly group comprising user interface objects 654, 652, 650, 648, and 646. The indicator 644 indicates that the group of user interface objects comprising user interface objects 654, 652, 650, 648, and 646 include corresponding messages received in the messaging conversation prior to the weekly group indicated by indicator 642. In some embodiments, the device 500 displays the user interface object 654, in the second user interface 6024 in the third layout, in response to device 500 receiving an indication of a message comprising rich content, such as a photo F was included in the messaging conversation within a date range April 26-May 3, as represented by indicator 644. In some embodiments, the device 500 displays user interface object 654 including the representation 620 of the pinning attribute applied to a corresponding user interface object (not shown) from the messaging user interface 600 in FIG. 6A.

Turning now to FIG. 6F, while device 500 is displaying second user interface 6024 in the third layout including the plurality of user interface objects displayed in the manner described in FIG. 6F, device 500 receives a request to display the second user interface in a fourth layout (indicated by touch contacts 656 directed to second user interface 6024), different from the third layout and the second layout of second user interface 6024 and the first layout of the messaging user interface 600. In some embodiments, the input from contacts 656 in FIG. 6F corresponds to a zoom-out input (e.g., in which the contacts 656 move towards each other on touch screen 504). In response to receiving the request to display the second user interface in the fourth layout, in FIG. 6G, device 500 displays the second user interface 6024 in the fourth layout. The fourth layout includes a plurality of user interface objects corresponding to messages in the messaging conversation referenced in FIG. 6A. As illustrated in FIG. 6G, the device 500 displays, in the fourth layout, time indicators 658 and 660 identifying the user interface objects as grouped by month. For example, while in the fourth layout of the second user interface 6024, a first group of user interface objects presented in chronological order below the indicator 658 labeled "May" correspond to messages of the messaging conversation received by the device 500 in the month of May. Similarly, the electronic device presents a second group of user interface objects, different from the first group, in chronological order below the indicator 660 labeled "April." The second group of user interface objects correspond to messages of the messaging conversation received by the device 500 in the month of April. In some embodiments, the electronic device displays a greater number of user interface objects corresponding to indicator 658 than corresponding to indicator 660 due to a size of the display region of the second user interface 6024. In some embodiments, the device 500 scrolls the second user interface 6024 downwards to reveal one or more additional rows of user interface objects corresponding to indicator 660.

As illustrated in FIG. 6H, while device 500 is displaying second user interface 6024 in the fourth layout including the plurality of user interface objects displayed in the manner described in FIG. 6G, device 500 receives a request to display the second user interface in a fifth layout (indicated by touch contacts 662 directed to second user interface 6024), different from the fourth layout, the third layout, and the second layout of second user interface 6024 and the first layout of the messaging user interface 600. In some embodiments, the input from contacts 662 in FIG. 6H corresponds to a zoom-out input (e.g., in which the contacts 662 move towards each other on touch screen 504). In response to receiving the request to display the second user interface in the fifth layout, in FIG. 6I, device 500 displays the second user interface 6024 in the fifth layout. The fifth layout includes a plurality of user interface objects corresponding to messages in the messaging conversation referenced in FIG. 6A. As illustrated in FIG. 6I, the device 500 displays, in the fifth layout, time indicator 664 identifying the user interface objects as grouped by year. For example, while in the fifth layout of the second user interface 6024, a first group of user interface objects presented in chronological order below the indicator 664 labeled "2022" correspond to messages of the messaging conversation received by the device 500 in the year 2022. Similarly, the electronic device presents a second group of user interface objects, different from the first group, in chronological order above indicator 664. The second group of user interface objects correspond to messages of the messaging conversation received by the device 500 in the year 2021. In some embodiments, the device 500 scrolls the second user interface 6024 downwards to reveal one or more additional rows of user interface objects corresponding the year 2021 and/or an indicator labeled for the year 2021. In some embodiments, the device 500 displays the user interface objects in the fifth layout with a smaller size than the user interface objects presented in the fourth layout illustrated in FIG. 6H.

As previously discussed, the second user interface 6024 includes content filtering user interface element 630 having a plurality of selectable options to filter user interface objects according to type. For example, in FIG. 6J, while device 500 is displaying second user interface 6024 in the fifth layout including user interface objects displayed in the manner described in FIG. 6I, device 500 receives a selection input 666 directed to selectable option 630*a* to display only user interface objects identified as corresponding to music. As illustrated in FIG. 6K, the selectable option 630*a* is selected, and in response, the device 500 displays only user interface objects identified as corresponding to music in the fifth layout. In some embodiments, the device 500 displays the user interface objects identified as corresponding to music in the fifth layout with a visual appearance (e.g., color) indicating that the rich content includes music. In some embodiments, the device 500 displays the selectable option 630*a* as highlighted to indicate that selectable option 630*a* is selected. In some embodiments, the device 500 receives a selection input (not shown) directed to selectable option 630*e* to remove the filter operation causing the device to display only user interface objects identified as music in the second user interface 6024. As illustrated in FIG. 6L, the selectable option 630*e* has been selected and is displayed having a highlighted visual appearance in response to the selection input directed to selectable option 630*e* to display all user interface objects (e.g., remove the filter option to display only user interface objects identified as music as previously shown in FIG. 6K).

FIG. 6L illustrates that while device 500 is displaying second user interface 6024 in the fifth layout including the plurality of user interface objects displayed in the manner described in FIG. 6I, device 500 receives a request to display the second user interface in a third layout (indicated by touch contacts 670 directed to second user interface 6024), different from the fifth layout, the fourth layout, and the second layout of second user interface 6024 and the first layout of the messaging user interface 600. In some embodiments, the input from contacts 670 in FIG. 6L corresponds to a zoom-in input (e.g., in which the contacts 670 move away from each other on touch screen 504). In response to receiving the request to display the second user interface in the fifth layout, in FIG. 6M, device 500 displays the second user interface 6024 in the third layout. The third layout includes a plurality of user interface objects corresponding to messages in the messaging conversation referenced in FIG. 6A. As described above with reference to FIG. 6E, when in the third layout, the device 500 groups the user interface objects in weekly date-based groups. In some embodiments, while device 500 is displaying second user interface 6024 in the third layout including the plurality of user interface objects displayed in the manner described in FIG. 6E, device 500 receives a request to display the messaging user interface in the first layout (indicated by touch contact 672 directed to user interface object 652, such as a tap of contact 672 on user interface object 652), different from the second layout, the third layout, the fourth layout, and the fifth layout of second user interface 6024. In response to receiving the request to display the first user interface in the first layout, in FIG. 6N, device 500 displays the messaging user interface 600 in the first layout. In some embodiments, the user interface object 674 corresponds to a same message that user interface object 652 corresponds to. In some embodiments, the device 500 displays, in messaging user interface 600, a portion of the messaging conversation comprising the message corresponding to user interface object 652 as well as other user interface objects that chronologically precede and chronologically follow the message. Thus, in some embodiments, the device 500 transitions from presenting the second user interface comprising a collection of user interface objects in FIG. 6M to the messaging user interface 600 including a portion of the messaging conversation that includes the corresponding message as illustrated in FIG. 6N.

FIG. 6O illustrates the device 500 receiving a request to display the second user interface in the third layout (indicated by touch contacts 612 directed to the messaging user interface). In some embodiments, the input from contacts 612 in FIG. 6O corresponds to a zoom-out input (e.g., in which the contacts 612 move toward each other on touch screen 504). In response to receiving the request to display the second user interface in the third layout, the device 500 displays in FIG. 6P the second user interface 6024 in the third layout in the manner described in FIG. 6E. The second user interface 6024 further includes a search user interface element 614 configured to search the messages in the messaging conversation and/or the user interface objects in second user interface 6024 using one or more keywords as discussed in further detail with reference to method 700. In some embodiments, the device 500 receives keyword 686 "dog" in the search user interface element 614, such as shown in FIG. 6Q. In response, the device retrieves and/or displays one or more messages related to the keyword 686 "dog", as shown in FIG. 6R. FIG. 6R illustrates a plurality of user interface objects including user interface objects 696, 694, 692, 690, and 698 having corresponding messages matching the keyword 686 "dog." As illustrated in FIG. 6R, device 500 also shows attributes related to the messages, such as user interface objects 696 and 692 including representation 620 of a pinning attribute.

In some embodiments, while the device displays the second user interface 6024 in the third layout in the manner described in FIG. 6R, the device receives a request to scroll the second user interface 6024 as indicated by touch contact 6020 directed to the second user interface 6024 (e.g., via a swipe of contact 6020). In response to the request to scroll the second user interface 6024, the device scrolls the second user interface 6024 to reveal more user interface objects related to the search input as illustrated in FIG. 6S. As illustrated in FIG. 6S, user interface object 698 is displayed but was not previously displayed in the second user interface 6024 of FIG. 6R. Returning to FIG. 6S, while the device 500 displays the second user interface 6024, the device receives a request to display the messaging user interface in the first layout (indicated by touch contact 6000 directed to user interface object 698, such as a tap of contact 6000 on user interface object 698 and/or a zoom-in input directed to user interface object 698) in the second user interface 6024. In response to the touch contact 6000, the device 500 displays messaging user interface 600 as illustrated in FIG. 6T. In some embodiments, the selection of user interface object 698 corresponding to a message from the past causes the device to display the portion of the messaging conversation (also from the past) that includes the message corresponding to user interface object 698 as shown in FIG. 6T. In some embodiments, the device 500 displays a time indicator 6004 within the range of time indicated by time indicator 688 displayed in FIG. 6S.

Figure 6W:
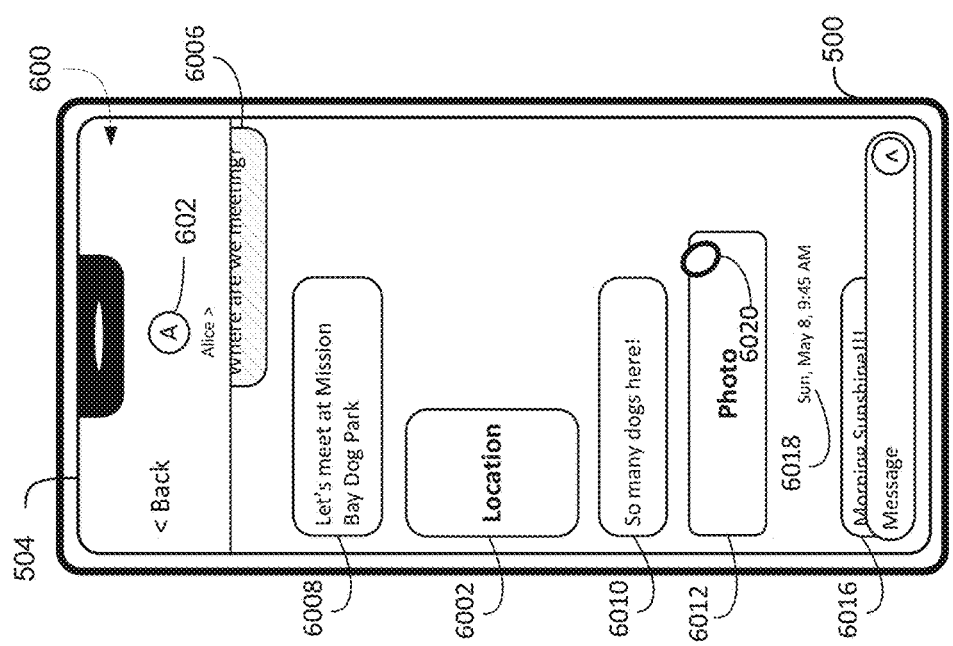

FIG. 6U illustrates that while the device 500 displays the messaging user interface 600, device 500 receives a request to scroll the messaging user interface 600 as indicated by touch input 6014 (e.g., a downward swipe input) and in response, the device 500 scrolls the messaging user interface 600 downwards to reveal a different portion of the messaging conversation as shown in FIG. 6V. In 6V, the device 500 displays messaging user interface 600 including user interface objects 6006, 6008, 6002, 6010, and 6012 displayed in the messaging user interface 600 in FIG. 6U. Additionally, device 500 displays in messaging user interface 600 of FIG. 6V time indicator 6018 and a portion of user interface object 6016. In some embodiments, while displaying FIG. 6W, the device 500 receives a request to select user interface object 6012 as indicated by touch contact 6020 (e.g., a tap of contact 6020 on user interface object 6012). In response to the request to select user interface object 6012, the device 500 displays the rich content item of user interface object 6012 as shown in FIG. 6X. In some embodiments, the rich content item of user interface object 6012 is a photo 6022 and device 500 displays photo 6022 enlarged covering the entirety of messaging user interface 600 as illustrated in FIG. 6X.

FIGS. 7A-7B are flow diagrams illustrating a method 700 of displaying a plurality of content items (or user interface objects) corresponding to messages of a messaging conversation in accordance with some embodiments, such as in FIGS. 6A-X. The method 700 is optionally performed at an electronic device such as device 100, device 300, or device 500 as described above with reference to FIGS. 1A-1B, 2-3, 4A-4B and 5A-5H. In some embodiments, method 700 is performed at or by an automobile (e.g., at an infotainment system of an automobile having or in communication with one or more display generation components and/or input devices). Some operations in method 700 are, optionally combined and/or order of some operations is, optionally, changed.

In some embodiments, method 700 is performed at an electronic device in communication with a display generation component and one or more input devices (e.g., device 500). For example, a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users.

In some embodiments, the electronic device displays (702a), via the display generation component, a messaging user interface corresponding to a messaging conversation, such as messaging user interface 600 in FIG. 6A. In some embodiments, the messaging conversation includes messages sent from the electronic device and messages sent from electronic devices associated with a plurality of users. The electronic device and the electronic devices associated with the plurality of users optionally have access to the messaging conversation. In some embodiments, messages sent from the electronic device (e.g., from a user account associated with the electronic device) are displayed on a first side of the messaging conversation (e.g., the right side) and messages sent from a different electronic device (e.g., from a user account associated with a different electronic device) are displayed on a second side (e.g., the left side) of the messaging conversation.

In some embodiments, the messaging user interface includes a first user interface object corresponding to a first message in the messaging conversation, such as user interface object 604 in FIG. 6A. In some embodiments, the messages transmitted and/or received include different types of messages based on what the message includes (e.g., text, photos, music, links, and/or other rich multimedia as will be described in more detail with reference to method 700. As used herein, the first message optionally refers to a message that includes only text. For example, the first user interface object is a representation of a first message, and includes text content corresponding to the first message. For example, the first user interface object corresponding to the first message "Hi, how's it going?" optionally includes the text "Hi, how's it going?" displayed within the first user interface object. Text content is optionally not limited to only "text" characters, but optionally includes emojis, special characters, non-English characters, and/or graphics.

In some embodiments, the messaging user interface includes a second user interface object, different from the first user interface object, corresponding to a second message in the messaging conversation, such as user interface object 606 in FIG. 6A. In some embodiments, the second message optionally includes rich content (e.g., links, photos, music, videos, electronic books, audiobooks, podcasts, playlists, locations, documents, and/or other rich multimedia), and the second user interface object is a representation of the second message. In some embodiments, the second message is a type of message, different from the first message, wherein the second message optionally includes content other than text content. In some embodiments, rich content is generated as a message (e.g., second message) by an app installed on the electronic device and is presented as such. For example, a second user interface object corresponding to music is generated as a message (e.g., a second message), and its user interface object optionally includes a representation (e.g., image, audio clip, and/or video) of a particular song generated by a music app.

In some embodiments, the first user interface object and the second user interface object are displayed in the messaging user interface based on a defined temporal relationship between the first message and the second message in the messaging conversation (702b), such as user interface object 604 corresponding to a message received by the electronic device before a message corresponding to user interface object 606 in FIG. 6A. For example, the first user interface object and the second user interface object are optionally displayed in chronological order of their corresponding messages (e.g., based on when those messages are sent to the messaging conversation), ranging from oldest to most recent messages of the messaging conversation.

In some embodiments, the first user interface object and the second user interface object are displayed in the messaging user interface in a first layout (702c), such as the layout shown by messaging user interface 600 in FIG. 6A. In some embodiments, the first layout is one of a plurality of predefined layouts in which representations of messages are presented at different locations in the messaging user interface or second user interface which will be described in more detail with reference to this method 700. For example, the first layout optionally includes the messages sent from the electronic device presented on the right side of the messaging user interface and messages sent from one or more different electronic devices are optionally displayed on the left side of the messaging user interface. In some embodiments, the respective positions of the first user interface object and/or the second user interface object correspond to chronological positions of the first user interface object and/or the second user interface object in the messaging conversation. For example, the first user interface object and/or the second user interface object are shown in a chronological order relative to other user interface objects (e.g., messages) that were received before and/or after the first user interface object and/or the second user interface object. For example, when a new user interface object (e.g., new message) is received by the electronic device and/or messaging conversation, the new user interface object is located in a location towards the bottom boundary of the messaging user interface and earlier user interface objects are moved to another location (e.g., towards the top boundary of the messaging user interface). Thus, in some embodiments, in the first layout, objects corresponding to messages are displayed at a location in the messaging user interface that is based both on the sender of the corresponding message and when the corresponding message was sent to the messaging conversation. In some embodiments, in the first layout, when a message was sent to the messaging conversation controls the vertical positioning of the corresponding user interface object in the messaging user interface, but not the horizontal positioning of the corresponding user interface object in the messaging user interface. In some embodiments, in the first layout, the sender of a message to the messaging conversation controls the horizontal positioning of the corresponding user interface object in the messaging user interface, but not the vertical positioning of the corresponding user interface object in the messaging user interface. In some embodiments, the messaging user interface is scrolled so that different user interface objects (e.g., messages not previously shown) are displayed. For example, the electronic device scrolls the messaging user interface, the first user interface object and/or the second user interface object in a downwards direction towards the bottom boundary of the messaging user interface, so that the different user interface objects are displayed and optionally, the first user interface object and/or the second user interface object are no longer displayed. In some embodiments, the first layout of the messaging user interface includes a time indicator that indicates a time at which the messages were received by the electronic device. In some embodiments, the electronic device detects a horizontal swipe gesture including contact with the messaging user interface, the first user interface object, and/or the second user interface object, and causes subsequent movement of the first user interface object and the second user interface object to a new location (e.g., to the left) to reveal respective time indicators associated with the first user interface object and the second user interface object (e.g., indicators of when the messages corresponding to those objects were sent to the messaging conversation).

In some embodiments, while displaying, via the display generation component, the messaging user interface including the first user interface object and the second user interface object displayed in the first layout, the electronic device detects (702*d*), via the one or more input devices, a first input directed to the messaging user interface, such as input 612 in FIG. 6B (e.g., detecting a gesture, such as a two-finger pinch gesture, a two finger left/right swipe, or other input such as a button selection input, at a particular location directed to the messaging user interface).

In some embodiments, in response to detecting the first input (702*e*), in accordance with a determination that the first input satisfies one or more first criteria, such as two touch inputs 612 in FIG. 6B (e.g., the one or more first criteria include a criterion that is satisfied when the first input is a pinch to zoom gesture to zoom out of the content displayed on the messaging user interface. In some embodiments, the pinch to zoom gesture includes two (finger) contacts directed to the messaging user interface and subsequent movement of the contacts towards each other (e.g., to zoom out of content displayed on the messaging user interface). In some embodiments, a pinch to zoom gesture to zoom into the content includes subsequently moving the two (finger) contacts away from each other (e.g., to zoom into content displayed on the messaging user interface)), the electronic device displays, via the display generation component, a second user interface, different from the messaging user interface, such as second user interface 6024 in FIG. 6C. For example, the second user interface is a rich content user interface for presenting rich content from the messaging conversation chronologically in a variety of ways (e.g., all rich content, only music, only photos, only links, and/or only pins/favorites), and optionally does not include user interface objects corresponding to text content messages in the messaging conversation. In some embodiments, the second user interface includes all rich content associated with the electronic device. In some embodiments, the second user interface includes user interface objects corresponding both to rich content and to text content in the messaging conversation, optionally displayed chronologically as described herein. Additional examples of the second user interface will be described in more detail later with reference to method 700.

In some embodiments, the second user interface includes a third user interface object corresponding to the second message, such as user interface object 626 in FIG. 6C, and a fourth user interface object corresponding to at least one message received in the messaging conversation prior to the first message, such as user interface object 624 in FIG. 6C. For example, the third user interface object is optionally a representation of the second message and the fourth user interface object is optionally a representation of the at least one message. In some embodiments, the at least one message optionally includes only text content. In some embodiments, the at least one message is a message that was optionally included for presentation in the messaging user interface before the second message. In some embodiments, the at least one message includes a time indicator that is earlier than the time indicator of the second message. In some embodiments, the second message is a message reply associated with the at least one message (e.g., added messaging activity to the messaging conversation related to the at least one message).

In some embodiments, a respective user interface object corresponding to the at least one message was not displayed in the messaging user interface when the first input was detected (702*g*), such as user interface object 622 corresponding to a message not displayed in FIG. 6A, but includes a corresponding user interface object (e.g., user interface object 622) which is displayed in FIG. 6C, and the third user interface object and the fourth user interface object are displayed in the second user interface in a second layout, different from the first layout (702*h*), such as layout shown by the second user interface 6024 in FIG. 6C. In some embodiments, the fourth user interface object (and/or the respective user interface object) is not displayed in the messaging user interface if the electronic device is displaying user interface objects (e.g., the first user interface object and the second user interface object) in accordance with the first layout. In some embodiments, the third user interface object is optionally a representation of the second message (comprising rich multimedia), different from the second user interface object that is also a representation of the second message. In some embodiments, displaying the second user interface object corresponding to the second message in accordance with the first layout includes displaying a representation of the second message (e.g., second user interface object) with a first visual appearance (e.g., a first color, a first size, and/or optionally including one or more controls to play and/or pause the rich multimedia). In some embodiments, displaying the second user interface object in accordance with the first layout includes displaying the second user interface object in a pre-determined (e.g., spatial) layout as described with reference to method 700. In some embodiments, displaying the third user interface object in accordance with the second layout in the second user interface includes displaying a representation of the second message (e.g., third user interface object) with a second visual appearance (e.g., a second color different from the first color, a second size smaller or larger (e.g., a dynamic size based on a zoom level of the second user interface) than the first size (e.g., a fixed size in the messaging user interface that cannot be changed in the messaging user interface), and/or optionally not including one or more controls to play and/or pause the rich multimedia). In some embodiments, displaying the third user interface object in accordance with the second layout includes displaying the third user interface object in a dynamically resized layout different from the predetermined layout as described with reference to the first layout, such as in method 700.

In some embodiments, in the second layout, objects corresponding to messages are displayed at a location in the second user interface that is based on when the corresponding message was sent to the messaging conversation, but not based on the sender of the corresponding message. In some embodiments, in the second layout, when a message was sent to the messaging conversation controls the vertical and/or horizontal positioning of the corresponding user interface object in the second user interface. In some embodiments, in the second layout, the sender of a message to the messaging conversation does not control the horizontal or vertical positioning of the corresponding user interface object in the second user interface. In some embodiments, the second user interface displays the third user interface object and the fourth user interface object in chronological order based on the date-times the corresponding messages were sent and/or received by the electronic device and/or in the messaging conversation. Navigating between the messaging user interface and the second user interface in response to the described first input provides an efficient way of displaying messages of a messaging conversation without having to scroll through the messaging conversation in the messaging user interface, which additionally reduces power usage and improves battery life of the electronic device by enabling the user to use the electronic device more quickly and efficiently.

In some embodiments, the third user interface object corresponding to the second message and the fourth user interface object corresponding to the at least one message are displayed in a chronological order based on a defined temporal relationship between the second message and the at least one message in the messaging conversation, such as user interface objects 626 and 624 in FIG. 6C are displayed in the same chronological order as user interface objects 610 and 606 in FIG. 6A. For example, the third user interface object and the fourth user interface object are optionally displayed in chronological order of their corresponding messages (e.g., based on when the second message and the at least one message are sent to the messaging conversation), ranging from oldest to most recent messages of the messaging conversation. In some embodiments, the third user interface object and the fourth user interface object are presented in the second user interface in the same chronological order according to when their corresponding messages were received in the messaging conversation. Additional examples of presenting user interface objects in the second user interface will be described in more detail later with reference to method 700. Displaying messages of a messaging conversation in the messaging user interface and the second user interface in the same chronological order enables the user to easily locate a particular message, which reduces power usage and improves battery life of the electronic device by enabling the user to use the electronic device more quickly and efficiently.

In some embodiments, the first user interface object corresponds to messaging content of a first type, such as user interface object 604 in FIG. 6A (e.g., text-only content). In some embodiments, the second user interface object corresponds to messaging content of a second type, different from the first type, such as user interface object 606 in FIG. 6A (e.g., rich content object, such as images, videos, music, location objects, application links, and/or web links). In some embodiments, the third user interface object and the fourth user interface object correspond to messaging content of the second type, such as user interface objects 626 and 624, and the second user interface does not include user interface objects corresponding to messaging content of the first type, such as messaging content of user interface object 604 in FIG. 6A. For example, the second user interface optionally includes only rich content objects. In contrast, and in some embodiments, the messaging user interface displays messaging content of the first type and the second type. The second user interface provides an efficient way of displaying messages of a messaging conversation based on type of messaging content without having to scroll through the messaging conversation in the messaging user interface, which additionally reduces power usage and improves battery life of the electronic device by enabling the user to use the electronic device more quickly and efficiently.

In some embodiments, the second layout includes displaying a plurality of user interface objects including the third user interface object and fourth user interface object grouped according to different ranges of date values, such as user interface objects 634 and 636 grouped with date value indicator 642 and user interface objects 652 and 650 grouped with date value indicator 654 in FIG. 6E. For example, the plurality of user interface objects including the third user interface object and the fourth user interface object are optionally grouped into date-based groups, such as "today," "yesterday," "week," "month," or "year." In some embodiments, metadata associated with the corresponding messages to the third user interface object and the fourth user interface object indicate respective date-times the corresponding messages were received by the electronic device and/or messaging conversation. The date-time of the corresponding messages are optionally used to group the third user interface object and the fourth user interface object in the second layout. In contrast and in some embodiments, the first layout does not include grouping user interface objects into date-based groups, but rather listing the objects from least recent to most recent. In some embodiments, the user interface objects are displayed as a list of user interface objects with time indicators (indicating a time at which the messages were received by the electronic device) displayed near their corresponding messages in the first layout. Providing a second layout in which groups of messages of a messaging conversation are grouped enables the user to easily locate a particular message, which reduces power usage and improves battery life of the electronic device by enabling the user to use the electronic device more quickly and efficiently.

In some embodiments, the second layout includes displaying a plurality of user interface objects including the third user interface object and fourth user interface object at different positions in two directions (e.g., horizontal and vertical) in the second user interface chronologically, based on date and/or time associated with corresponding messages, such as user interface objects in FIG. 6E. In some embodiments, the second layout is one of a plurality of predefined layouts in which representations of messages are presented at different locations and/or different sizes in the second user interface. In some embodiments, the predefined layouts are based on one or more display parameters: a size of the display area, the orientation of the second user interface (e.g., portrait or landscape), the date-times the corresponding messages were sent and/or received by the electronic device and/or in the messaging conversation, or the first input corresponding to a zoom-in or zoom-out input. For example, the second layout optionally displays the plurality of user interface objects including the third user interface object and the fourth user interface object with a second size, second arrangement, and/or second visual characteristic based on the one or more display parameters. For example, the second arrangement includes the plurality of user interface objects optionally arranged in a grid layout (e.g., 4×4 grid layout). In some embodiments, the second layout includes the plurality of user interface objects displayed in chronological order, sequentially starting from the oldest to the most recent corresponding messages. For example, a user interface object representing the oldest message is positioned in the top left of the second user interface, and another user interface object representing the most recent message is positioned in the bottom right of the second user interface. In some embodiments, the positions of the plurality of user interface objects in the second user interface is based on an ordering other than date and/or time associated with corresponding messages, such as popularity, most recently viewed/played, view/play count, or alphabetical.

In some embodiments, first layout includes displaying the plurality of user interface objects including the first user interface object and the second user interface object at different positions in one direction (e.g., vertical) in the messaging user interface chronologically, based on the date and/or time associated with the corresponding messages, such as user interface objects in FIG. 6A. In some embodiments, a first arrangement of the first layout includes arranging the plurality of user interface objects including the first user interface object and the second user interface object in one direction chronologically from a bottom of the messaging user interface (e.g., most recent) to a top of the messaging user interface (e.g., least recent). For example, a recently received user interface object is revealed (included for display in the first layout) at the bottom of the messaging user interface causing the user interface objects received prior to the recently received user interface object to move to positions closer to the top of the messaging user interface in the first layout. In contrast, a second arrangement of the second layout optionally includes arranging the plurality of user interface objects including the third user interface object and the fourth user interface object in at least two directions chronologically from bottom right to top left in the second user interface. For example, the recently received user interface object is optionally included for display in the second layout at the bottom right causing the user interface objects received prior to the recently received user interface object to shift positioning from right to left and/or bottom to top. Additional examples of presenting user interface objects in the first layout compared to the second layout will be described in more detail later with reference to method 700. Providing a second layout in which messages of a messaging conversation are positioned in two directions brings display order/clarity and enables the user to easily locate a particular message, which reduces power usage and improves battery life of the electronic device by enabling the user to use the electronic device more quickly and efficiently.

In some embodiments, the one or more first criteria include a criterion that is satisfied when the first input corresponds to a zoom-out input, such as input 512 in FIG. 6B. For example, the zoom-out input optionally includes two contacts on a surface (e.g., a touch-sensitive surface) moving approximately linearly in a manner that decreases a distance between them. In some embodiments, a zoom operation (e.g., zoom in or zoom out) is dynamically selected by the device based on such motion of increasing or decreasing the distance between the contacts. Zooming in or out to see greater detail or a larger subset of the plurality of user interface objects in response to the described first input provides an efficient way of displaying messages of a messaging conversation without having to scroll through the messaging conversation in the messaging user interface, which additionally reduces power usage and improves battery life of the electronic device by enabling the user to use the electronic device more quickly and efficiently.

In some embodiments, while displaying, via the display generation component, the second user interface including the third user interface object and the fourth user interface object displayed in the second user interface according to a first set of ranges of date values of the corresponding messages, such as user interface objects 626 and 624 in FIG. 6D, the electronic device detects, via the one or more input devices, a second input directed to the second user interface, such as input 632 in FIG. 6D. In some embodiments, the first set of ranges of date values of the corresponding messages span a week. In some embodiments, in response to detecting the second input and in accordance with a determination that the second input satisfies one or more second criteria including a criterion that is satisfied when the second input corresponds to a zoom-in input, such as indicated by the two touch inputs and directional arrows of input 632 in FIG. 6D, the electronic device displays, via the display generation component, the second user interface including the third user interface object and the fourth user interface object in a third layout, and according to a second set of ranges of date values of the corresponding messages, different from the first set of ranges of date values of the corresponding messages, such as second user interface 6024 in FIG. 6E including user interface objects 634, 636, and 654 and time indicators 642 and 644. In some embodiments, the zoom-in input optionally includes two contacts on a surface (e.g., a touch-sensitive surface) moving approximately linearly in a manner that increases a distance between them. In some embodiments, the second set of ranges of date values of the corresponding messages include a shorter time span (e.g., two days) than the first set of range of date values spanning a week (e.g., seven days). In some embodiments, the third layout and second layout include the same display size and the same vertical orientation. In some embodiments, the third layout includes the third user interface object and the fourth user interface object with a third size larger than the second size when displayed in the second layout. In some embodiments, the third layout optionally displays the third user interface object and the fourth user interface object with a third arrangement wherein the third user interface object and the fourth user interface object are arranged in a grid layout (e.g., 2×2 grid layout) smaller than the 4×4 grid layout of the second layout.

In some embodiments and in accordance with a determination that the second input satisfies the one or more first criteria including the criterion that is satisfied when the second input corresponds to the zoom-out input, such as input 656 in FIG. 6F, the electronic device displays, via the display generation component, the second user interface including the third user interface object and the fourth user interface object in a fourth layout, different from the third layout and according to a third set of ranges of date values, different from the first set and the second set of ranges of date values, of the corresponding messages, such as second user interface 6024 in FIG. 6G including user interface objects and time indicators 658 and 660. In some embodiments, the zoom-out input optionally includes two contacts on a surface (e.g., a touch-sensitive surface) moving approximately linearly in a manner that decreases a distance between them. In some embodiments, the fourth set of ranges of date values of the corresponding messages include a longer time span (e.g., 30 days) than the first set of range of date values spanning a week and the second set of range of date values spanning two days. In some embodiments, the fourth layout includes the same display size and the same vertical orientation of the second layout and the third layout. In some embodiments, the fourth layout includes the third user interface object and the fourth user interface object with a fourth size smaller than the second size when displayed in the second layout and smaller than the third size when displayed in the third layout. In some embodiments, the fourth layout optionally displays the third user interface object and the fourth user interface object with a fourth arrangement wherein the third user interface object and the fourth user interface object are arranged in a 6×5 grid layout larger than the 4×4 grid layout of the second layout and the 2×2 grid layout of the third layout. In some embodiments, displaying the predefined layouts include displaying a label indicating the date values, such as "Today," "Yesterday," "May 30-June 5," "May," or "2022." In some embodiments, the labels are selectable and upon selection, the second user interface is configured to include the plurality of user interface objects with corresponding messages within the selected range of date values. Zooming in or out from a year to a month to a week to a day, as well in the reverse in response to the described input, provides an efficient way of displaying messages of a messaging conversation without having to scroll through the messaging conversation in the messaging user interface, which additionally reduces power usage and improves battery life of the electronic device by enabling the user to use the electronic device more quickly and efficiently.

In some embodiments, the second user interface in the fourth layout includes all user interface objects corresponding to messages that are included in the second user interface in the third layout, such as layout of second user 6024 in FIG. 6F includes user interface objects 634 and 636 corresponding to respective messages, wherein the respective messages correspond to user interface objects 626 and 624, respectively in FIG. 6D. For example, when changing from the third layout to the fourth layout, the second user interface optionally maintains display of all user interface objects corresponding to messages that were included in the third layout, while optionally adding for display one or more user interface objects corresponding to messages that are included in the range of date values of the fourth layout. In some embodiments, the added one or more user interface objects were not displayed in the third layout; however, scrolling the second user interface while presenting the third layout reveals the added one or more user interface objects in the third layout. Navigating between the third layout and the fourth layout while maintaining the messages of a messaging conversation brings display order/consistency and enables the user to easily locate a particular message, which reduces power usage and improves battery life of the electronic device by enabling the user to use the electronic device more quickly and efficiently.

In some embodiments, in response to detecting the first input, such as input 6014 in FIG. 6U and in accordance with a determination that the first input satisfies one or more second criteria, different from the one or more first criteria, the electronic device initiates a process associated with the first user interface object or the second user interface object, without displaying the second user interface, such as the electronic device displaying messaging user interface 600 without the second user interface in FIG. 6V. For example, the first input optionally does not satisfy the one or more first criteria and instead satisfies the one or more second criteria as will be described in more detail later with reference to method 700. In some embodiments, in response to determining that the one or more second criteria are satisfied, the electronic device initiates an operation associated with the first user interface object or the second user interface object as will be described in more detail later with reference to method 700. In some embodiments, initiating the operation associated with the first user interface object or the second user interface object does not include displaying the second user interface. Initiating a process associated with the first user interface object or the second user interface object in response to the described first input and forgoing the display of the second user interface prevents interaction that is not intended, thus preventing needless display of information, which additionally reduces power usage and improves battery life of the electronic device by enabling the user to use the electronic device more quickly and efficiently.

In some embodiments, the one or more second criteria include a first criterion that is satisfied when the first input corresponds to a scrolling input, such as input 6014 in FIG. 6U (e.g., request to scroll the first user interface object or the second user interface object or the messaging user interface or another user interface object of the messaging user interface, such as an upward or downward swipe of a contact on a touch-sensitive surface). In some embodiments, the process associated with the first user interface object or the second user interface object includes the electronic device scrolling the first user interface object and the second user interface object to different locations in the messaging user interface in accordance with the first input, different from their respective locations in the messaging user interface prior to the first input, while maintaining display, via the display generation component, of the first user interface object and the second user interface object on the messaging user interface, such as user interface objects 6006 and 6012 and their respective location in FIG. 6U are different from their respective location in FIG. 6V. In some embodiments, the electronic device scrolls the first user interface object and the second user interface object towards a bottom border of the messaging user interface (e.g., in the case of an input for scrolling up in the messaging user interface) to reveal in a top portion of the messaging user interface additional user interface objects corresponding to messages received prior to the first message and the second message. Scrolling the first user interface object and the second user interface object in response to the described first input allows for easier and more seamless interaction with the messaging user interface, which additionally reduces power usage and improves battery life of the electronic device by enabling the user to use the electronic device more quickly and efficiently.

In some embodiments, the one or more second criteria include a second criterion that is satisfied when the first input is a selection input directed to the first user interface object (e.g., contacting a touch-sensitive surface at a location of the first user interface object), such as input 6020 directed to user interface object 6012. In some embodiments, the process associated with the first user interface object or the second user interface object includes the electronic device displaying, via the display generation component, the first user interface object with a first visual emphasis, greater than a second visual emphasis of the first user interface object prior to the first input, such as user interface object 6022 having a visual emphasis in FIG. 6X different from the visual emphasis of user interface object 6012 in FIG. 6W. In some embodiments, the first user interface object includes a first visual emphasis while the second user interface object is displayed with a second visual emphasis (e.g., indicating the second user interface object has not been selected). In some embodiments, the first user interface object is highlighted while the second user interface object is not highlighted and/or the first user interface object appears larger than the second user interface object. In some embodiments, the first user interface object is displayed larger in size in response to the selection input and the second user interface object is no longer displayed (e.g., hidden or grayed out (e.g., not selectable)). Visually emphasizing the message in response to the described first input allows for easier and more seamless interaction with the messaging user interface, which additionally reduces power usage and improves battery life of the electronic device by enabling the user to use the electronic device more quickly and efficiently.

In some embodiments, the second user interface includes a first plurality of user interface objects corresponding to a first plurality of messages, such as second user interface 6024 including a plurality of user interface objects in FIG. 6J. For example, the first plurality of user interface objects are representations of the first plurality of messages, wherein each of the first plurality of user interface objects is associated with a first content category (e.g., photos, videos, music, map objects, favorites, web links, electronic literature, podcasts, television, or other content category). In some embodiments, the second user interface includes a first selectable option (e.g., first category icon or affordance) that is selectable to filter display of the plurality of user interface objects according to a first category (e.g., music), and a second selectable option (e.g., second category icon or affordance) that is selectable to filter display of the plurality of user interface objects according to a second category (e.g., links), different from the first category, such as selectable option 630e and selectable option 630a in FIG. 6J configured to filter display of the plurality of user interface objects as shown in FIG. 6K. In some embodiments, a user interface object is categorized or identified as the first category when the corresponding message is generated by an app (e.g., camera generating photos, music app generating songs, video app generating videos, web browser generating links, or other app generating corresponding content) installed on the electronic device and is presented as such. In some embodiments, a user interface object is categorized as a favorite when the corresponding message receives an indication of being "pinned." In some embodiments, in response to detecting an input corresponding to selection of the first selectable option, the electronic device displays on the second user interface a subset of the first plurality of user interface objects corresponding to messages that match the first category. In some embodiments, in response to detecting an input corresponding to selection of the second selectable option, the electronic device displays on the second user interface a second subset of the first plurality of user interface objects corresponding to messages that match the second category. Displaying selectable options to filter messages reduces the cognitive burden on a user when filtering messages and provides a more tailored user interface that is less cluttered and includes more of the desired messages, which additionally reduces power usage and improves battery life of the electronic device by enabling the user to use the electronic device more quickly and efficiently.

In some embodiments, the third user interface object corresponds to messaging content of a first type (e.g., music) and is displayed with a first visual characteristic (e.g., color) having a first value, such as user interface object 636 in FIG. 6E and the fourth user interface object corresponds to messaging content of a second type (e.g., photo), different from the first type, and is displayed with the first visual characteristic having a second value, different from the first value, such as user interface object 638 in FIG. 6E. For example, the first value is optionally a darker color (e.g., dark gray, black, or blue) than the second value (e.g., light gray, white, or yellow) of the first characteristic. In some embodiments, the value of the first visual characteristic is based on a dominant color of the corresponding message generated by the app. For example, a message comprising the "White Album" by the Beatles includes a corresponding user interface object that is primarily white in color. In some embodiments, the displayed visual characteristic of the user interface object is independent of the dominant color of the corresponding message generated by the app. For example, user interface objects corresponding to messages comprising web links are displayed with a red hue, user interface objects corresponding to messages comprising images are displayed with a blue hue, and/or user interface objects corresponding to messages comprising music objects (e.g., songs, albums, artists, or playlists) are displayed with a green hue. Displaying a visual characteristic of the user interface objects with different values based on content type allows a user to easily distinguish types of messages, thereby reducing the amount of time searching for a message, which additionally reduces power usage and improves battery life of the electronic device by enabling the user to use the electronic device more quickly and efficiently.

In some embodiments, while displaying, via the display generation component, the second user interface, the electronic device detects, via the one or more input devices, a search input, such as input 686. In some embodiments, the search input is a rich content related search query, such as query for user interface objects corresponding to messages comprising rich content. In some embodiments, the second user interface includes a search field into which search terms are inputted, and the search input includes entry, into the search field, of one or more search terms. In some embodiments, in response to detecting the search input, the electronic device displays, via the display generation component, one or more user interface objects corresponding to the search input, wherein corresponding messages of the one or more user interface objects are related to the search input, such as user interface objects in FIG. 6R. In some embodiments, the electronic device performs a rich content/user interface object search based on a text string match between the text associated with the search input (e.g., the text entered into the search field) and metadata/keywords (e.g., timestamps, locations, information, titles, and/or descriptions) associated with the messages corresponding to the user interface object. In some embodiments, the one or more user interface objects corresponding to the search input are displayed in the second user interface. In some embodiments, the one or more user interface objects are arranged according to their relevance to the search input. For example, user interface objects with a higher relevance are located closer to the top of the second user interface. In some embodiments, user interface objects with corresponding messages not related to the search input are not displayed in the second user interface. Providing search functionality provides an easy way to locate desired messages in a potentially large and difficult-to-search messaging conversation, which additionally reduces power usage and improves battery life of the electronic device by enabling the user to use the electronic device more quickly and efficiently.

In some embodiments, the corresponding messages of the one or more user interface objects displayed in response to the search input include metadata determined to be related to the search input, such as user interface object 698 including a location related to the search input 686 in FIG. 6S. For example, the electronic device determines if a corresponding message of a user interface object matches the search input by comparing characteristics and/or attributes of the corresponding message (e.g., in the messaging conversation), as well as any description, information, metadata, and/or content associated with the message. For example, the electronic device optionally compares any metadata associated with the corresponding message, such as timestamp of the message, a location of the message and/or a location of the device from which the message was sent when the message was sent, a scene depicted in the message (e.g., the message is a photo of a crowd at a concert, and thus depicts a concert scene), one or more objects identified in the message (e.g., image), a type of object identified in the message (e.g., dogs), one or more people identified in the message, an author of the message, an app associated with the message, and/or other property or attribute of the message. Providing search functionality based on various metadata of messages provides an easy way to locate desired messages in a potentially large and difficult-to-search messaging conversation, which additionally reduces power usage and improves battery life of the electronic device by enabling the user to use the electronic device more quickly and efficiently.

In some embodiments, the corresponding messages of the one or more user interface objects include metadata derived from the messaging conversation determined to be related to the search input, such as metadata of user interface object 6010 in FIG. 6T causes a user interface object 692 in FIG. 6S to be displayed, wherein user interface object 692 and user interface object 6012 in FIG. 6T correspond to the same message found to be related to the search input 686. In some embodiments, the electronic device includes data derived from the messaging conversation and uses the text data derived from the messaging conversation to determine if one or more messages matches the search input. For example, text data of a first message includes a phrase "Mission Bay Dog Park." In some embodiments, the electronic device includes the user interface object corresponding to a second message received by the electronic device and/or messaging conversation (optionally directly) before or after the first message as a search result for the search input comprising "dog" or within a predetermined time of (e.g., before or after) the first message (e.g., 1 second, 5 seconds, 30 seconds, 1 minute, 3 minutes, 5 minutes, 10 minutes or 1 hour). Providing search functionality using metadata derived from a messaging conversation provides increased search efficiency and saves time by not having to perform multiple searches, which additionally reduces power usage and improves battery life of the electronic device by enabling the user to use the electronic device more quickly and efficiently. In some embodiments, while displaying, via the display generation component, the second user interface, the electronic device detects, via the one or more input devices, a selection input, such as input 672 in FIG. 6M directed to the fourth user interface object (user interface object 652 in FIG. 6M) corresponding to the at least one message received in the messaging conversation prior to the first message (e.g., contacting at touch-sensitive surface at a location of the fourth user interface object).

In some embodiments, in response to detecting the selection input, the electronic device displays via the display generation component, the messaging user interface scrolled to a position including a fifth user interface object corresponding to the at least one message received in the messaging conversation prior to the first message, such as messaging user interface 600 including user interface object 674, wherein the scrolled-to position in the messaging user interface optionally does not include the first user interface object corresponding to the first message and/or the second user interface object corresponding to the second message. In some embodiments, selection of a user interface object in the second user interface causes the display of a portion of the messaging conversation (and ceasing display of the second user interface) in the messaging user interface including user interface objects/messages in connection with the selected user interface object and/or corresponding to the selected user interface object. For example, the messaging user interface includes user interface objects/messages of the portion of the messaging conversation received by the electronic device and/or messaging conversation before and/or after the corresponding message of the selected user interface object, in chronological order. In some embodiments, when the electronic device receives in the second user interface a selection input directed to a different user interface object, different from the fourth user interface object and corresponding to a different message received one year before the at least one message, the electronic device displays the messaging user interface scrolled to a position in the messaging user interface including a second different user interface object corresponding to the different message and does not include the user interface objects corresponding to the first message, the second message, and the at least one message. Navigating between the second user interface and the messaging user interface in response to the described first input provides an efficient way of displaying messages of a messaging conversation without having to scroll through the messaging conversation in the messaging user interface, which additionally reduces power usage and improves battery life of the electronic device by enabling the user to use the electronic device more quickly and efficiently. In some embodiments, while displaying, via the display generation component, the second user interface, the electronic device detects a second input, such as input 6000 in FIG. 6S (e.g., corresponding to a zoom-in input, such as described previously).

In some embodiments, in response to detecting the second input: and in accordance with a determination that the second input satisfies one or more second criteria including a criterion that is satisfied when the second input corresponds to a zoom-in input, such as directional arrows of the two touch inputs of input 6000 in FIG. 6S, the electronic device displays, via the display generation component, the messaging user interface including one or more user interface objects corresponding to one or more messages, wherein the one or more user interface objects are displayed in the first layout, such as layout in FIG. 6T. In some embodiments, the zoom-in input optionally includes two contacts on a surface (e.g., a touch-sensitive surface) moving approximately linearly in a manner that increases a distance between them. In some embodiments, the zoom-in input causes the display of the most recent portion of the messaging conversation in the messaging user interface including user interface objects/messages recently received by the electronic device and/or messaging conversation, regardless of the location in the second user interface to which the second input was directed. In some embodiments, when the zoom-in input is directed to a specific user interface object (e.g., the two contacts and/or a centroid between the two contacts on the touch-sensitive surface are at a location of the specific user interface object), the messaging user interface includes user interface objects/messages of the portion of the messaging conversation received by the electronic device and/or messaging conversation before and/or after the corresponding message of the specific user interface object, in chronological order. In some embodiments, when the electronic device receives a zoom-in input directed to a different user interface object corresponding to a different message received one month prior to the first message, the electronic device displays the messaging user interface including a second different user interface object corresponding to the different message of the messaging conversation and does not include the first user interface object corresponding to the first message. Navigating between the second user interface and the messaging user interface in response to the described second input provides an efficient way of displaying messages of a messaging conversation without having to scroll through the messaging conversation in the messaging user interface, which additionally reduces power usage and improves battery life of the electronic device by enabling the user to use the electronic device more quickly and efficiently.

In some embodiments, displaying the messaging user interface in response to detecting the selection input is independent of a layout being displayed by the second user interface when the selection input is detected, such as input 6000 detected the layout in FIG. 6S or any of the layouts in FIG. 6Q, 6K, 6I or 6D. For example, displaying the messaging user interface is independent of the predefined layouts of the second user interface described with reference to method 700. In some embodiments, the electronic device transitions from the first user interface with the first layout to the second user interface with the second layout in response to a selection input directed to a user interface object in the first user interface or a zoom-out input. In some embodiments, the electronic device transitions from the second user interface with the second layout to the first user interface with the first layout in response to a selection input directed to a user interface object in the second user interface or a zoom-in input as described with reference to method 700. In some embodiments, transitions between one predefined layout to another predefined layout is based on a degree or amount of zooming (e.g., distance between the contacts) associated with the zoom input. For example, the electronic device optionally transitions from the second user interface with the second layout to the second user interface with the third layout in response to a zoom-out input. In another example, the electronic device optionally transitions from the second user interface with the third layout to the second user interface with the fifth layout in response to a zoom-out input. In another example, the electronic device optionally transitions from the second user interface with the fifth layout to the second user interface with the fourth layout in response to a zoom-in input. In yet another example, the electronic device optionally transitions from the second user interface with the fourth layout to the second user interface with the second layout in response to the zoom-in input. In some embodiments, a transition from a second user interface to the messaging user interface is made as long as the electronic device detects a selection input directed to a user interface object of the second user interface independent of which predefined layout (or range of date values) the second user interface includes when the selection input directed to the user interface object is detected. For example, the electronic device optionally transitions from the second user interface with the fifth layout to the first user interface with the first layout in response to a selection input directed to a user interface object in the second user interface. In another example, the electronic device optionally transitions from the second user interface with the third layout to the first user interface with the first layout in response to a selection input directed to a user interface object in the second user interface. In some embodiments, the selected user interface object in the fifth layout is smaller than the selected user interface object in the third layout.

Navigating between the second user interface and the messaging user interface in response to the described second input provides an efficient way of displaying messages of a messaging conversation without having to navigate through the predefined, which additionally reduces power usage and improves battery life of the electronic device by enabling the user to use the electronic device more quickly and efficiently. In some embodiments, the one or more criteria include a criterion that is satisfied when the first input corresponds to a first function, such as input 662 in FIG. 6H (e.g., a zoom-out function). In some embodiments, the first input optionally corresponds to a further zooming-out function leading to a fourth layout of the second user interface (e.g., 6×5 grid layout). In some embodiments, while displaying, via the display generation component, the second user interface, the electronic device detects a second input, different from the first input, such as input 6000 in FIG. 6S.

In some embodiments, in response to detecting the second input and in accordance with a determination that the second input satisfies one or more second criteria, different from the one or more first criteria, including a criterion that is satisfied when the second input corresponds to a second function that is an opposite function of the first function, such as directional arrows of input 6000 in FIG. 6S are opposite in direction from directional arrow of input 662 in FIG. 6H, the electronic device displays, via the display generation component, the messaging user interface including the first user interface object and the second user interface object displayed in the first layout, such as messaging user interface 600 in FIG. 6T. In some embodiments, the second input satisfies the one or more second criteria including a criterion that is satisfied when the second input corresponds to a zoom-in function. In some embodiments, the zoom-in input causes the display of the messaging user interface as described with reference to method 700. In some embodiments, the first input corresponds to a double tap with the two contacts and the second input corresponds to repeating the double tap with two contacts to reverse the first function (e.g., reverse the prior zoom-out function). In some embodiments, the first input corresponds to a swipe left with two contacts and the second input corresponds to a swipe right with two contacts. Navigating between the second user interface and the messaging user interface in response to the described second input provides an efficient way of displaying messages of a messaging conversation without having to scroll through the messaging conversation in the messaging user interface, which additionally reduces power usage and improves battery life of the electronic device by enabling the user to use the electronic device more quickly and efficiently.

In some embodiments and in accordance with a determination that the second message is associated with a first attribute (e.g., saved as a favorite message), such as indicator 620 of user interface object 606 in FIG. 6B, the third user interface object includes a first visual indication corresponding to the first attribute (e.g., a favorite indicator/icon or "pinned" (e.g., reported as a favorited)) of the corresponding second message, such as indicator 620 of user interface object 624 in FIG. 6C.

In some embodiments and in accordance with a determination that the at least one message received in the messaging conversation prior to the first message is associated with a second attribute (e.g., saved with a predefined response such as a "like" tag), the fourth user interface object includes a second visual indication corresponding to the second attribute (e.g., a like indicator/icon) of the corresponding at least one message received in the messaging conversation prior to the first message, such as indicator 620 of user interface object 618 in FIG. 6C. In some embodiments, when the electronic device determines an attribute associated with the message, the electronic device displays the user interface object corresponding to the message in the second user interface with a visual indication of the attribute. In some embodiments, when the electronic device determines that the attribute is not associated with the message, the electronic device does not display the user interface object corresponding to the message in the second user interface with the visual indication of the attribute. In some embodiments, when the first attribute indicates the sender of the message, the corresponding user interface object includes an icon comprising an image or avatar associated with the sender or the sender's name as initials. In some embodiments, when the first attribute indicates the app that generated the message, the corresponding user interface object includes app indicator/icon identifying the app. In some embodiments, when the user interface object includes more than one visual indicator, the visual indicators appear as a fanned stacked of visual indicators, each one partially visible. Displaying a visual indication corresponding to a messaging attribute, as described herein, allows a user to easily distinguish messages, thereby reducing the amount of time searching for a message, which additionally reduces power usage and improves battery life of the electronic device by enabling the user to use the electronic device more quickly and efficiently.

In some embodiments, while displaying, via the display generation component, the second user interface including the third user interface object corresponding to the second message and the fourth user interface object corresponding to the first at least one message received in the messaging conversation prior to the first message, the electronic device detects, via the one or more input devices, a scrolling input (e.g., request to scroll the second user interface, such as an upward or downward swipe of a contact on a touch-sensitive surface), such as input 6020 in FIG. 6R.

In some embodiments, in response to detecting the scrolling input, the electronic device scrolls through the second user interface, including displaying, in the second user interface, a fifth user interface object corresponding to a third message received in the messaging conversation prior to the at least one message, wherein the fifth user interface object was not displayed in the second user interface when the scrolling input was detected, such as second user interface 6024 including user interface object 698 in FIG. 6S. For example, the scrolled-to portion of the second user interface optionally reveals the fifth user interface object not previously displayed in the second user interface.

In some embodiments, while displaying the second user interface including the fifth user interface object, the electronic device detects a second input (e.g., selection input, or a zoom-in input, as described previously), such as input 6000 in FIG. 6S. In some embodiments, in response to detecting the second input and in accordance with a determination that the second input satisfies one or more second criteria (e.g., the one or more second criteria include a criterion that is satisfied when the selection input includes contacting the surface at a location of the fifth user interface object, or the one or more second criteria are satisfied when the second input corresponds to a sufficiently large zoom-in input to transition back to the messaging user interface from the second user interface), the electronic device displays, via the display generation component, the messaging user interface scrolled to a position including a sixth user interface object corresponding to the third message, such as messaging user interface 600 in FIG. 6T. In some embodiments, the sixth user interface object is a representation of the third message in the messaging user interface.

In some embodiments, the sixth user interface object was not displayed in the messaging user interface when the first input was detected, such as messaging user interface 600 in FIG. 6O. In some embodiments, selection of the fifth user interface object in the second user interface causes the display of a portion of the messaging conversation in the messaging user interface including user interface objects/messages in connection with the fifth user interface object. For example, the messaging user interface includes user interface objects/messages of the portion of the messaging conversation received by the electronic device and/or messaging conversation before and/or after the corresponding third message of the fifth user interface object, in chronological order. In some embodiments, most recent messages of the messaging conversation and their corresponding user interface objects are not displayed in the messaging user interface. Navigating between the second user interface and the messaging user interface in response to the described scrolling input and the second input provides an efficient way of temporally navigating the messaging conversation, which additionally reduces power usage and improves battery life of the electronic device by enabling the user to use the electronic device more quickly and efficiently.

In some embodiments, the second user interface includes user interface objects corresponding to all messages of a respective type in the messaging conversation, such as second user interface 6024 in FIG. 6P including respective user interface objects corresponding to messages 604 and 608 of FIG. 6A. In some embodiments, user interface objects corresponding to all messages include only rich content or both rich content and text-only content. Therefore, in some embodiments, the electronic device does not apply filtering operations to filter the display of messages and corresponding user interface objects as the electronic device transitions from the messaging user interface to the second user interface, and also as the electronic device transitions from one predefined layout to another predefined layout. The various predefined layouts are described with reference to method 700. Thus, in some embodiments, if the messaging user interface includes a user interface object corresponding to a particular message, the second user interface will also include a user interface object corresponding to the particular message; optionally regardless of the type of message (e.g., text-only or rich content), optionally only if the type of message is rich content. Displaying user interface objects corresponding to all messages, as described herein, allows a user to easily view all messages in one user interface, thereby reducing the amount of time searching, which additionally reduces power usage and improves battery life of the electronic device by enabling the user to use the electronic device more quickly and efficiently.

In some embodiments, the second user interface includes user interface objects corresponding to a subset of all messages of a respective type in the messaging conversation, such as the second user interface 6024 in FIG. 6S. In some embodiments, user interface objects corresponding to a subset of all messages include a filtered subset of only rich content or both rich content and text-only content. In some embodiments, duplicate user interface objects/messages are filtered out, user interface objects/messages associated with expired app content are filtered out, and/or user interface objects associated with deleted messages (which are all optionally included in the messaging user interface) are filtered out in the view presented in the second user interface. Therefore, in some embodiments, the remaining user interface objects/messages automatically determined by the electronic device (e.g., without user input) are presented in the second user interface. In some embodiments, the remaining user interface objects/messages are considered significant to the user of the electronic device. In some embodiments, the electronic device determines a significant user interface object/message as a user interface object/message having a favorite attribute as described with reference to method 700 or as a user interface object/message recently accessed or edited or as a user interface object/message accessed (e.g., used or played) more than a predetermined number of times or as a user interface object/message associated with a location the user has visited many times or as a user interface object/message associated with a sender the user frequently corresponds with or as a user interface object/message associated with a person, object, or animal frequently mentioned in messaging conversations or appearing in photos and/or videos. Thus, in some embodiments, if the messaging user interface includes a user interface object corresponding to a particular message, the second user interface optionally includes or optionally does not include a user interface object corresponding to the particular message, as described above. Displaying a subset of interface objects corresponding to a subset of messages, as described herein, reduces the cognitive burden on a user when navigating from the messaging user interface to the second user interface and/or within the second user interface, and provides a more tailored user interface that is less cluttered and includes more of the desired messages, which additionally reduces power usage and improves battery life of the electronic device by enabling the user to use the electronic device more quickly and efficiently.

It should be understood that the particular order in which the operations in FIGS. 7A-7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7B. For example, the layout of messaging user interface and visual appearance of user interface objects corresponding to messages described above with reference to method 700 optionally has one or more of the characteristics of the user interface and user interface objects described with reference to method 900.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7B are, optionally, implemented by components depicted in FIGS. 1A-1B. For example, displaying operation 702a and detecting operation 702d are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Messaging Activity to a Messaging Conversation

Users respond to messages in many different manners. The embodiments described below provide ways in which an electronic device displays responses to messages that vary according to user input, thus enhancing the user's interactions with the electronic device. Enhancing interactions with a device reduces the amount of time needed by a user to perform operations, and thus reduces the power usage of the device and increases battery life for battery-powered devices.

Figure 8A:
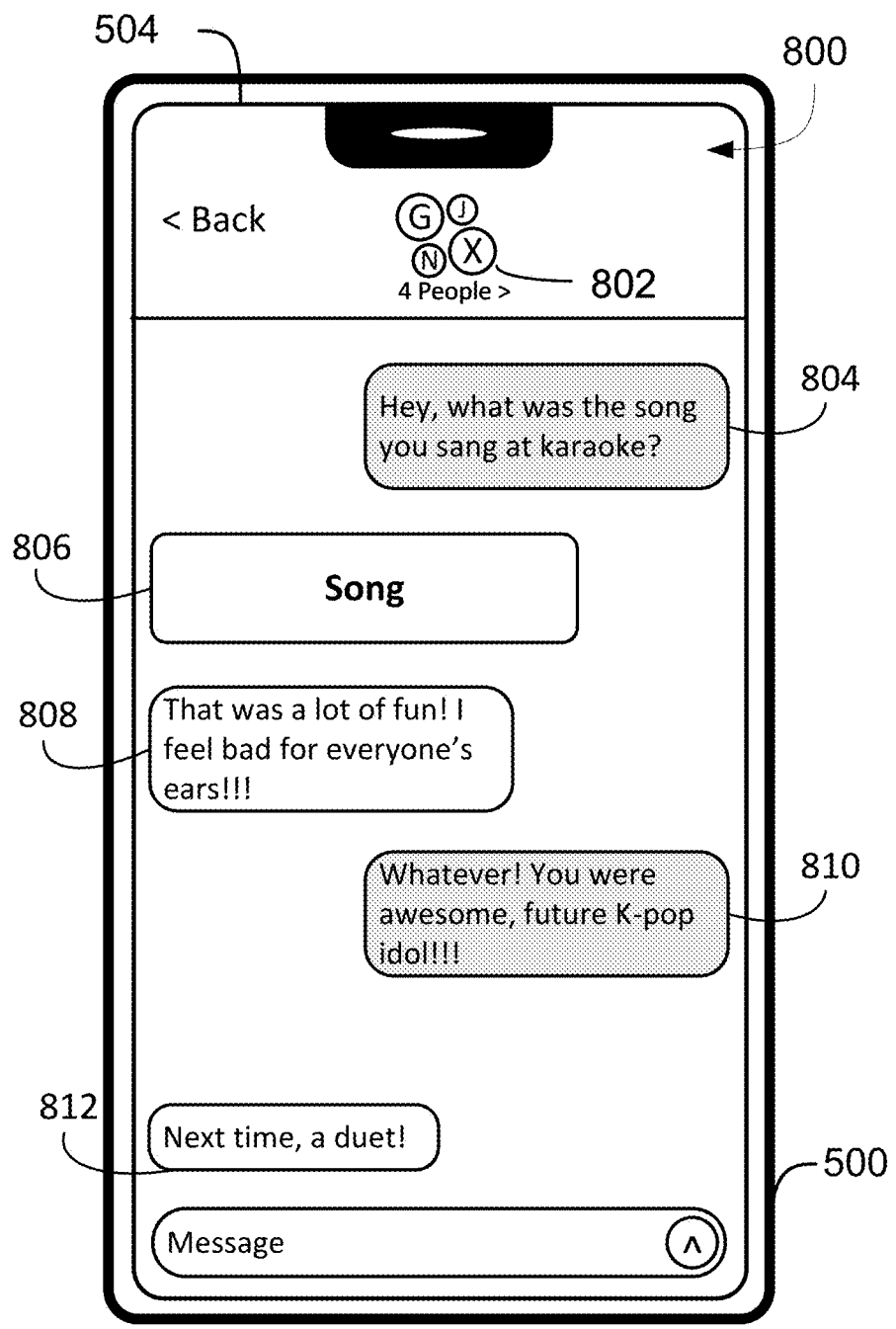
FIGS. 8A-8X illustrate exemplary ways of displaying messaging activity to a messaging conversation in accordance with some embodiments of the disclosure.
Figure 8B:
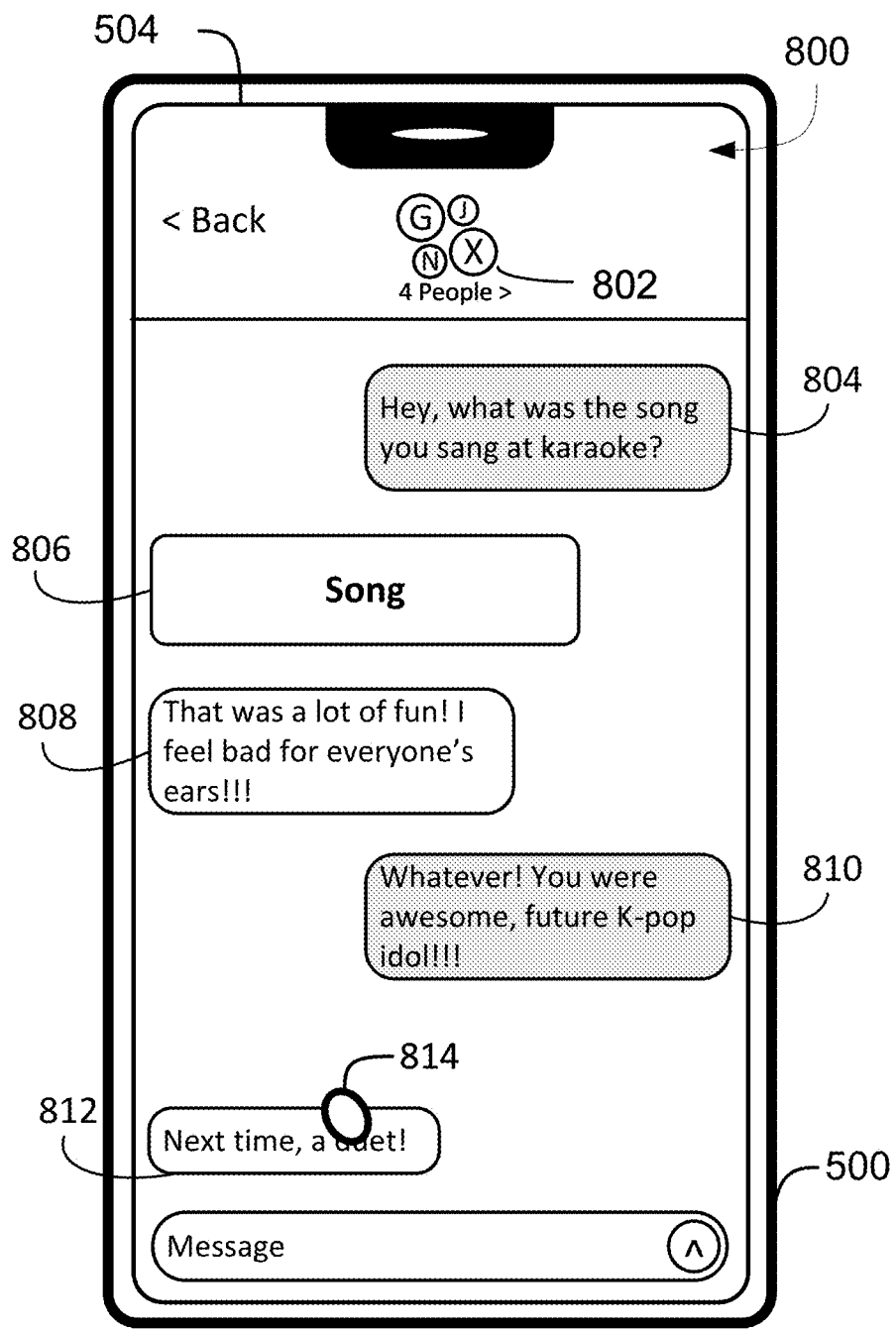
Figure 8C:
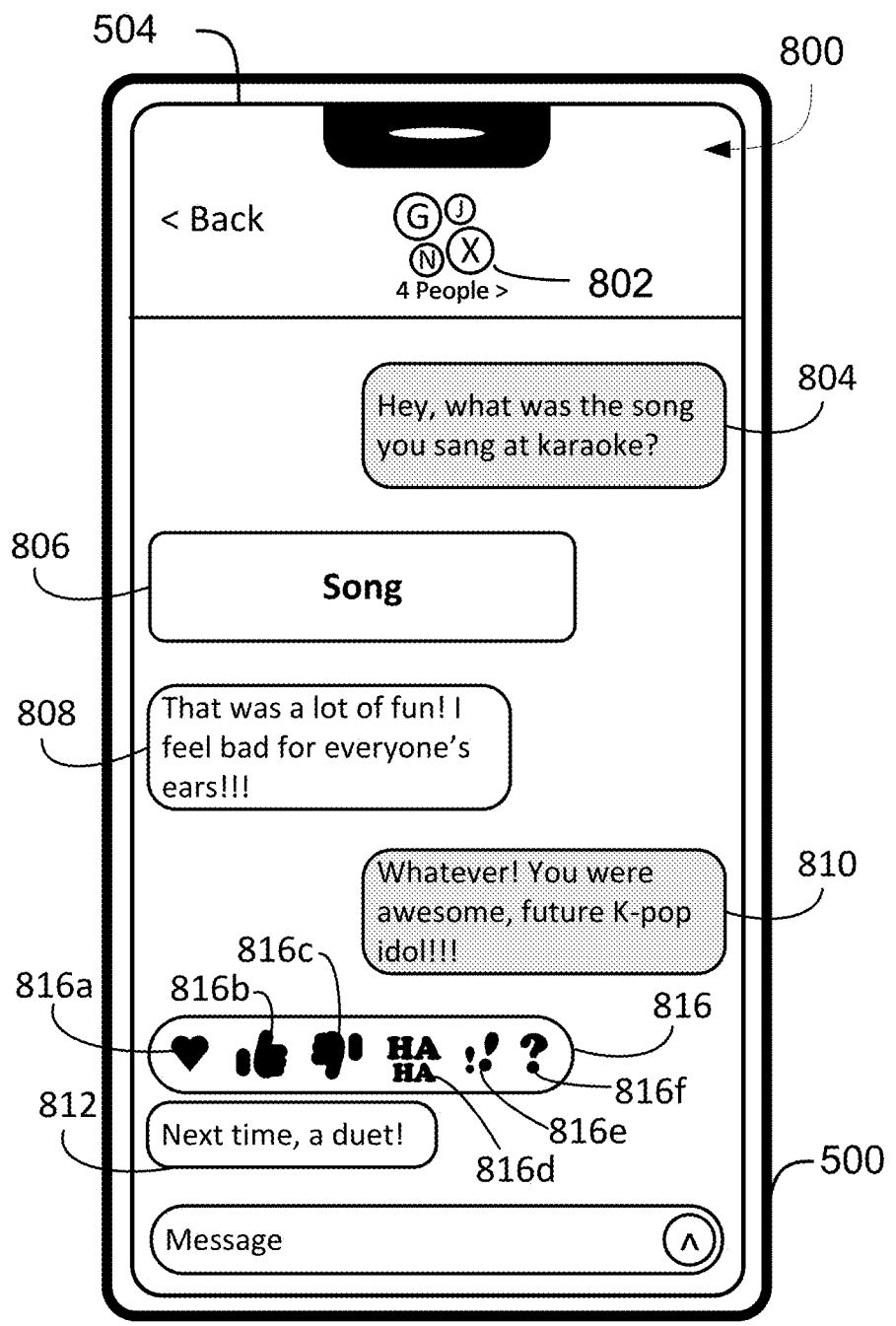
Figure 8D:
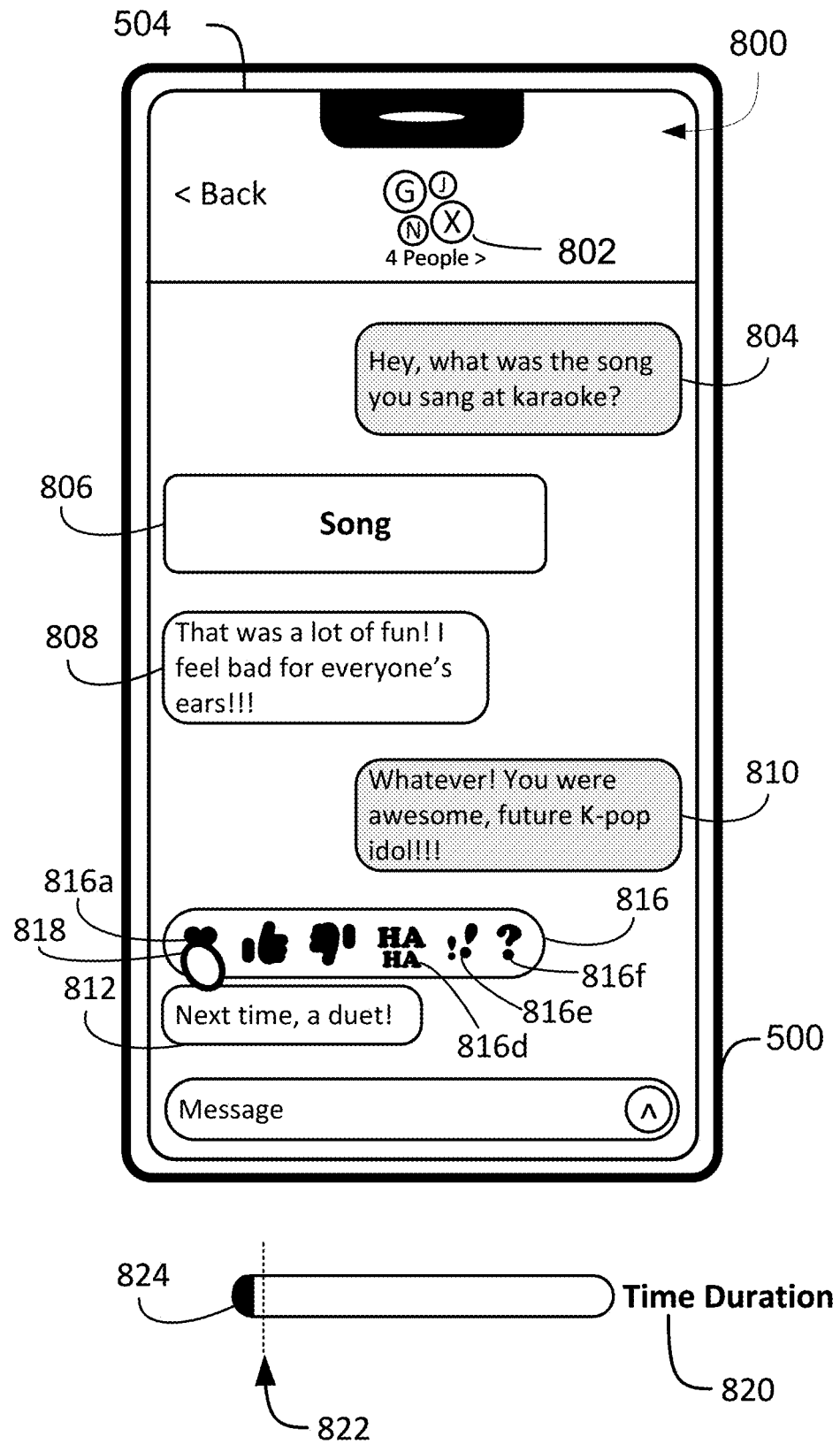
Figure 8E:
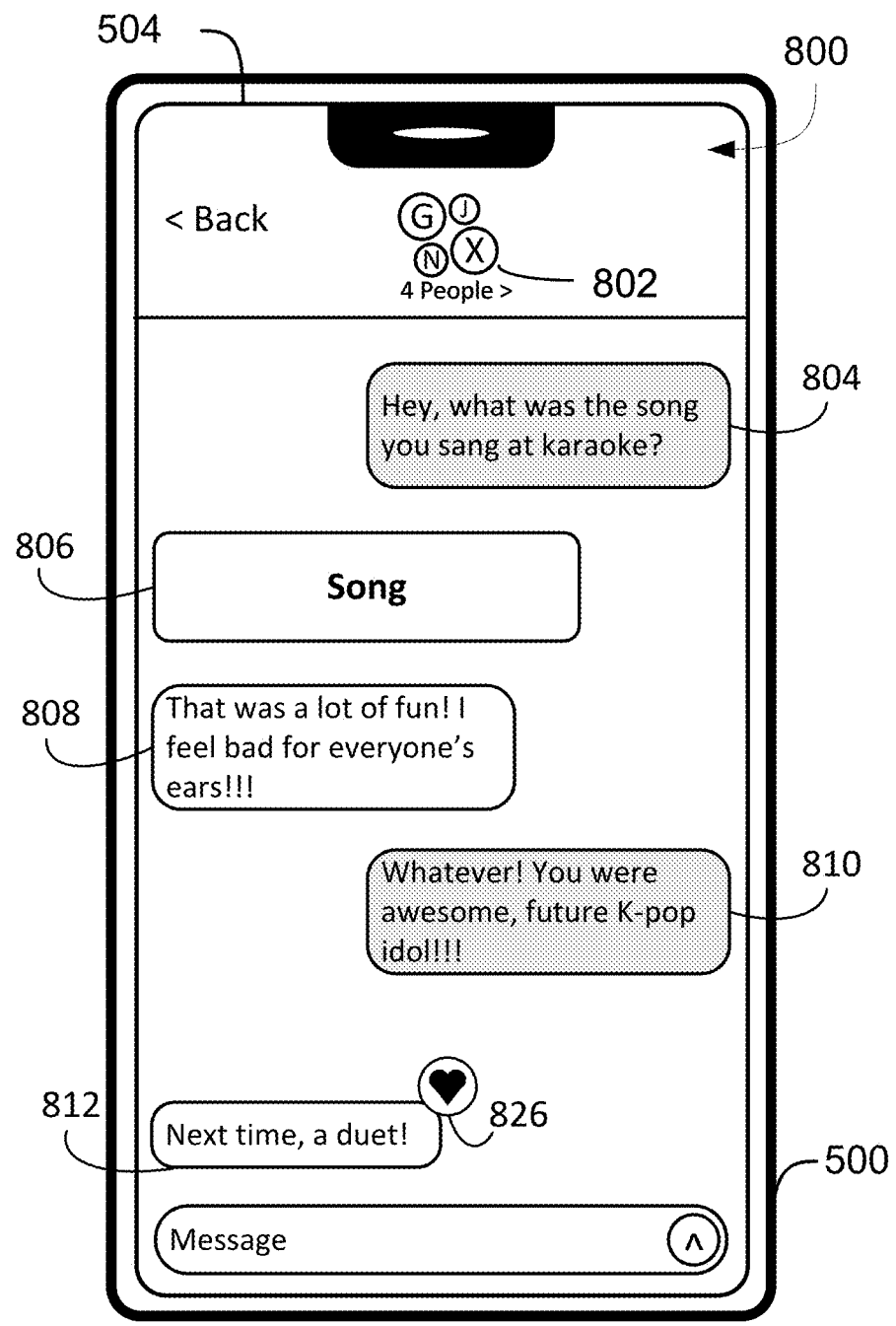
Figure 8F:
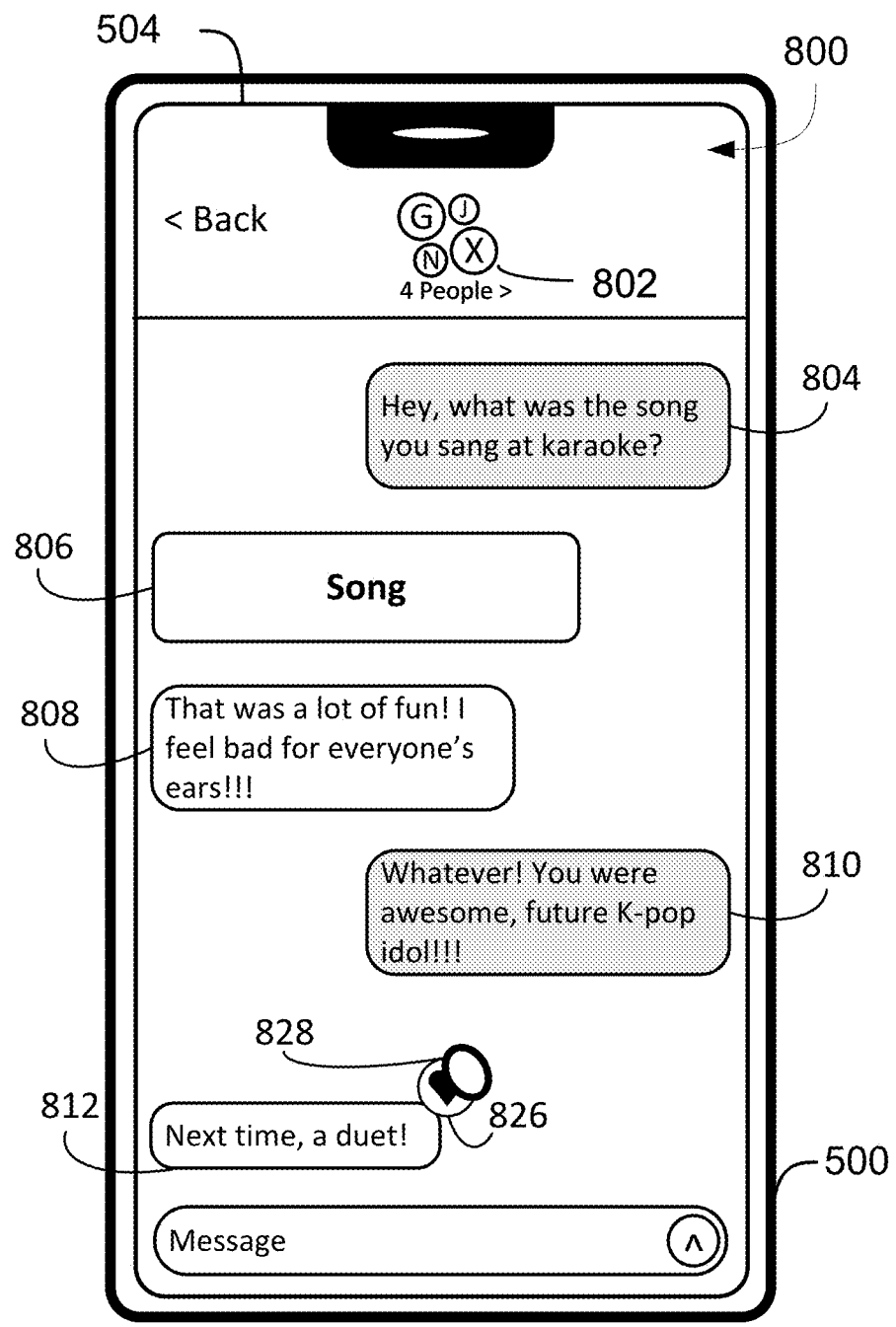
Figure 8G:
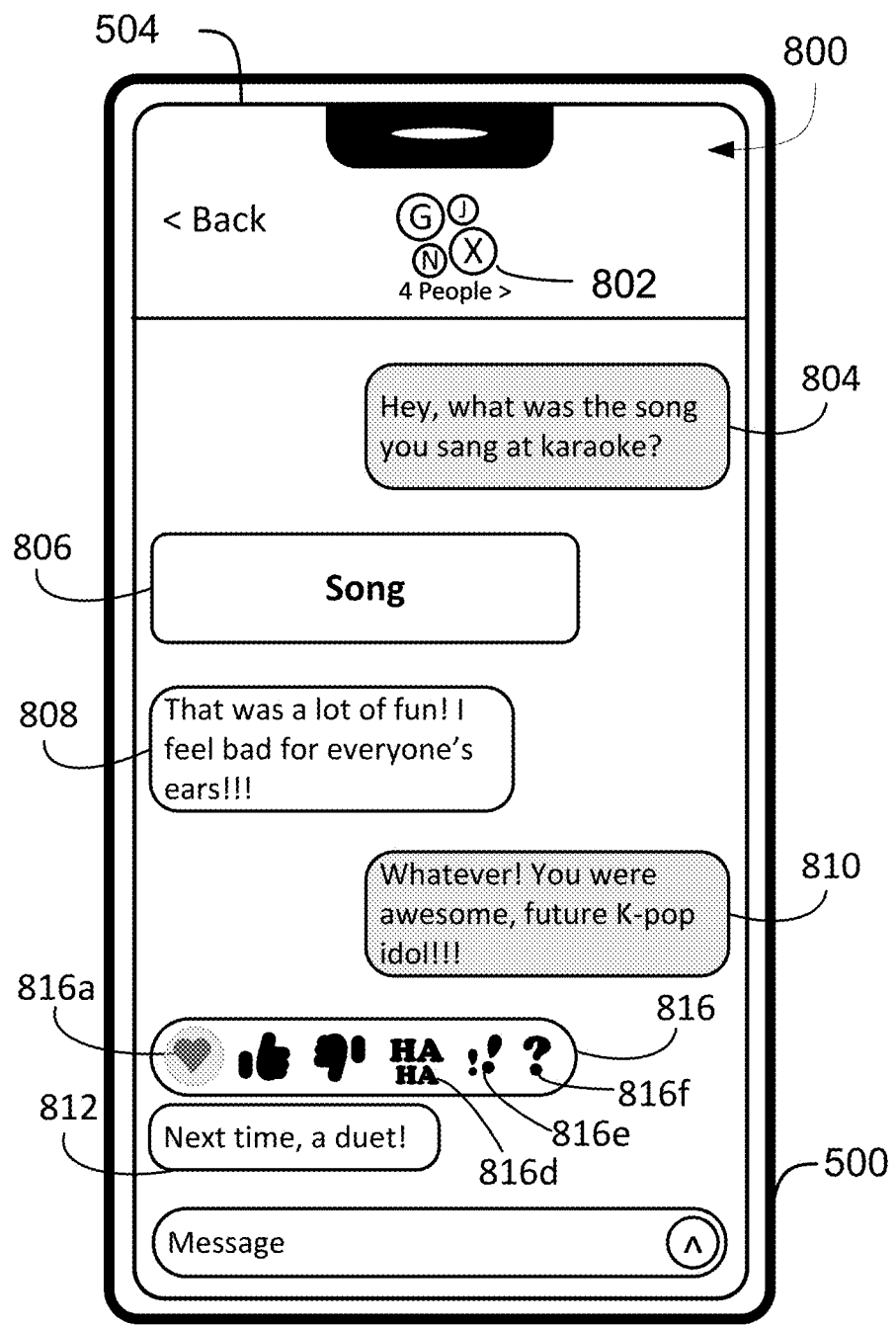
Figure 8H:
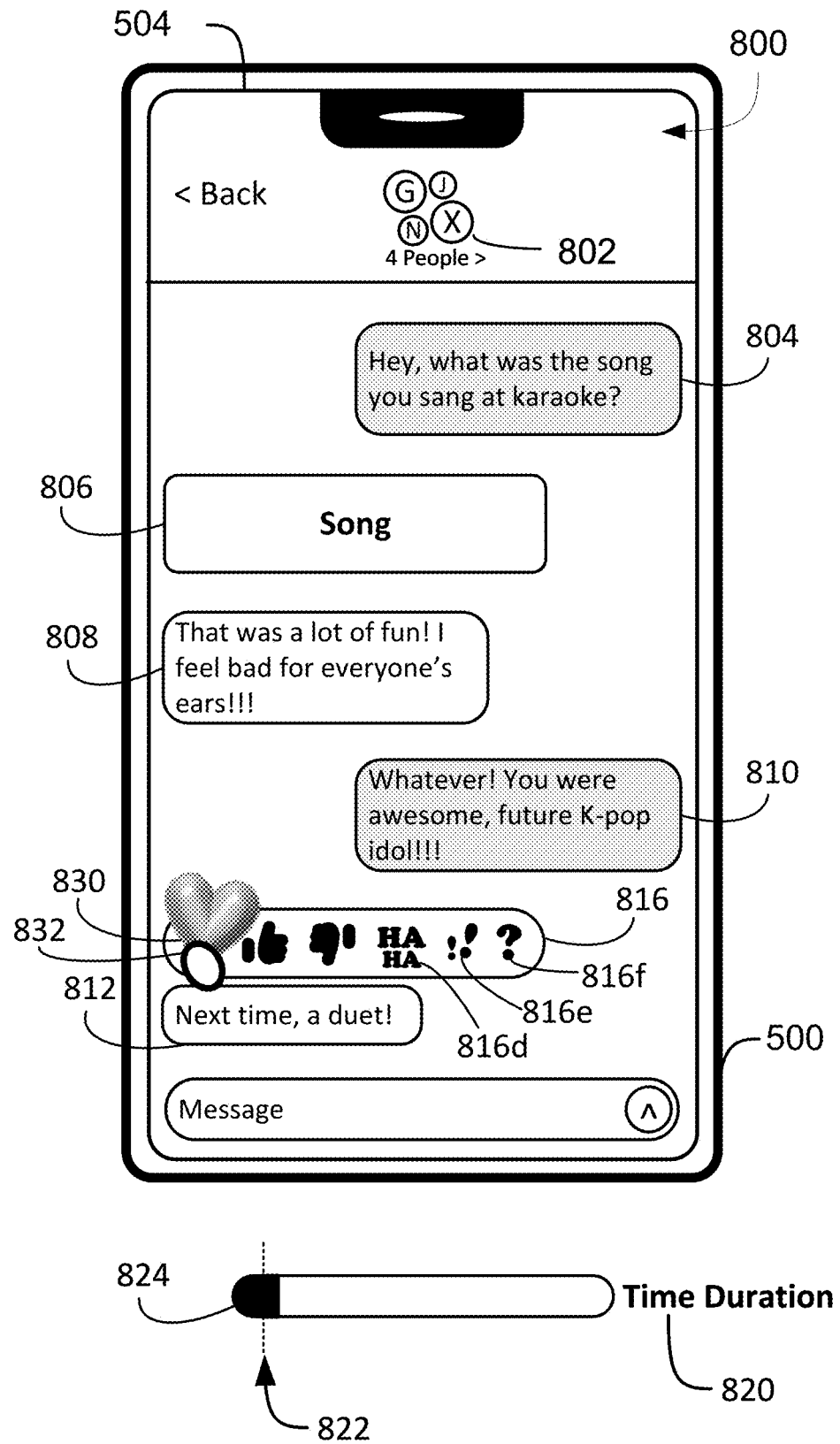
Figure 8I:
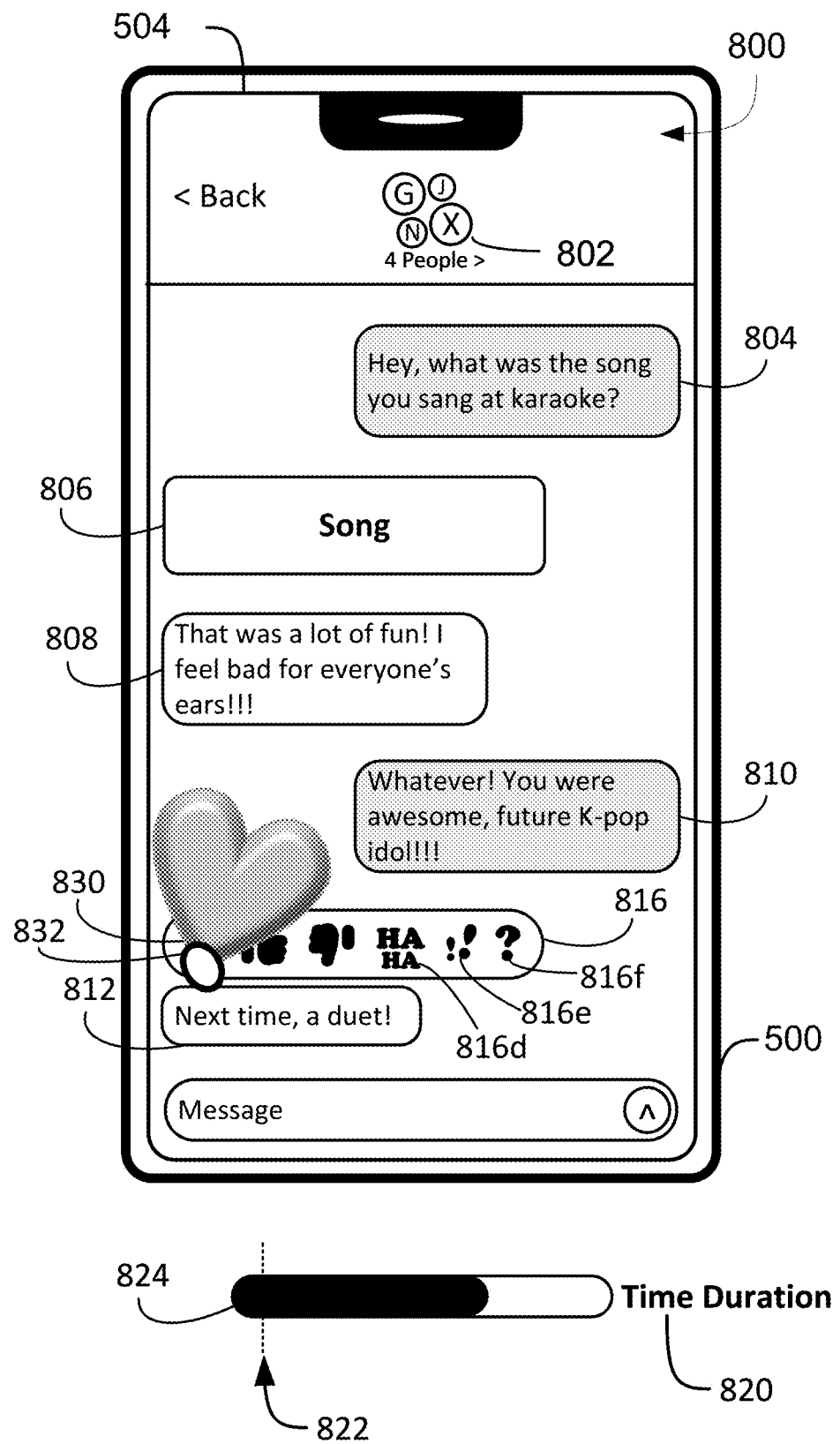
Figure 8J:
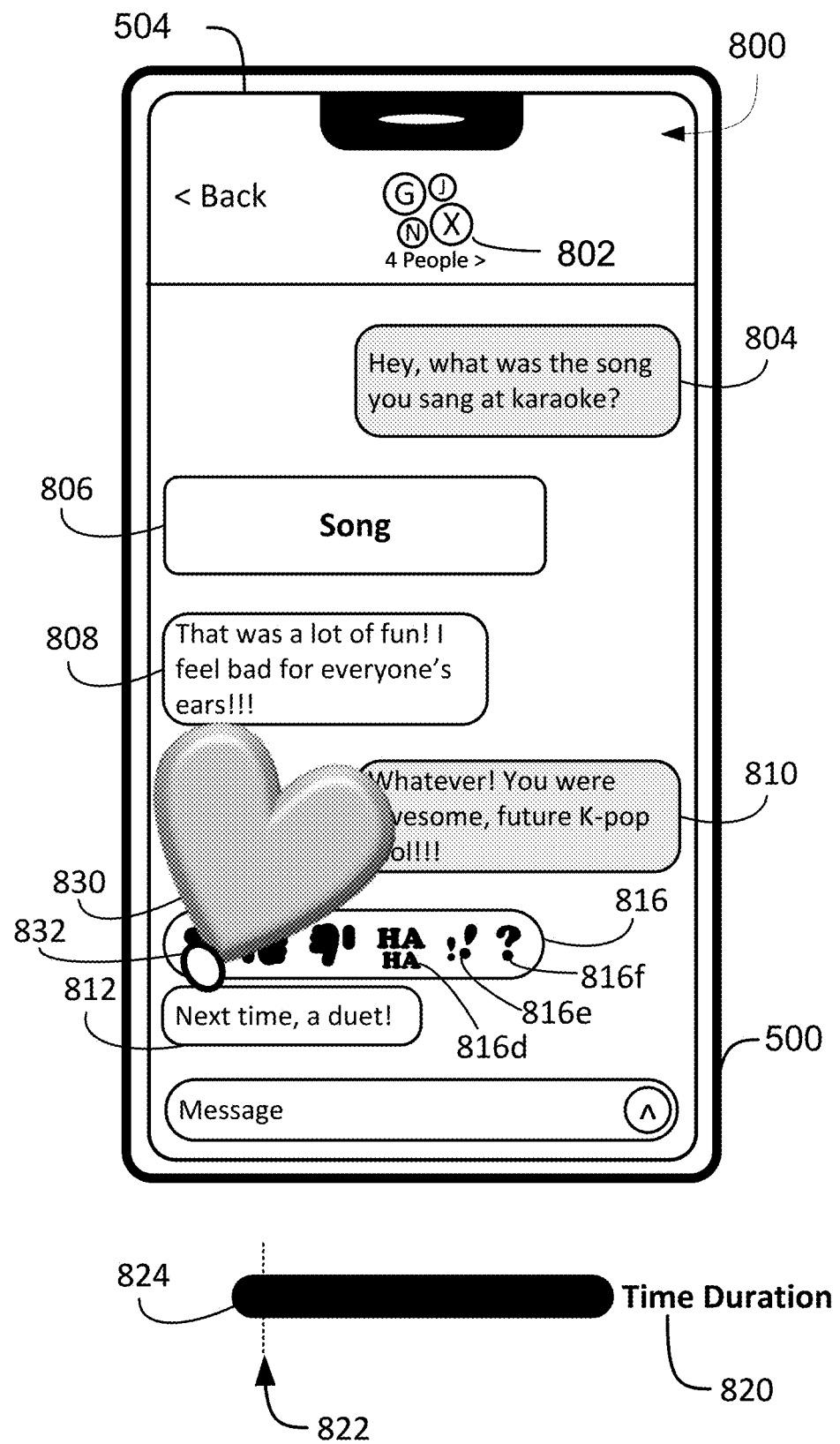
Figure 8K:
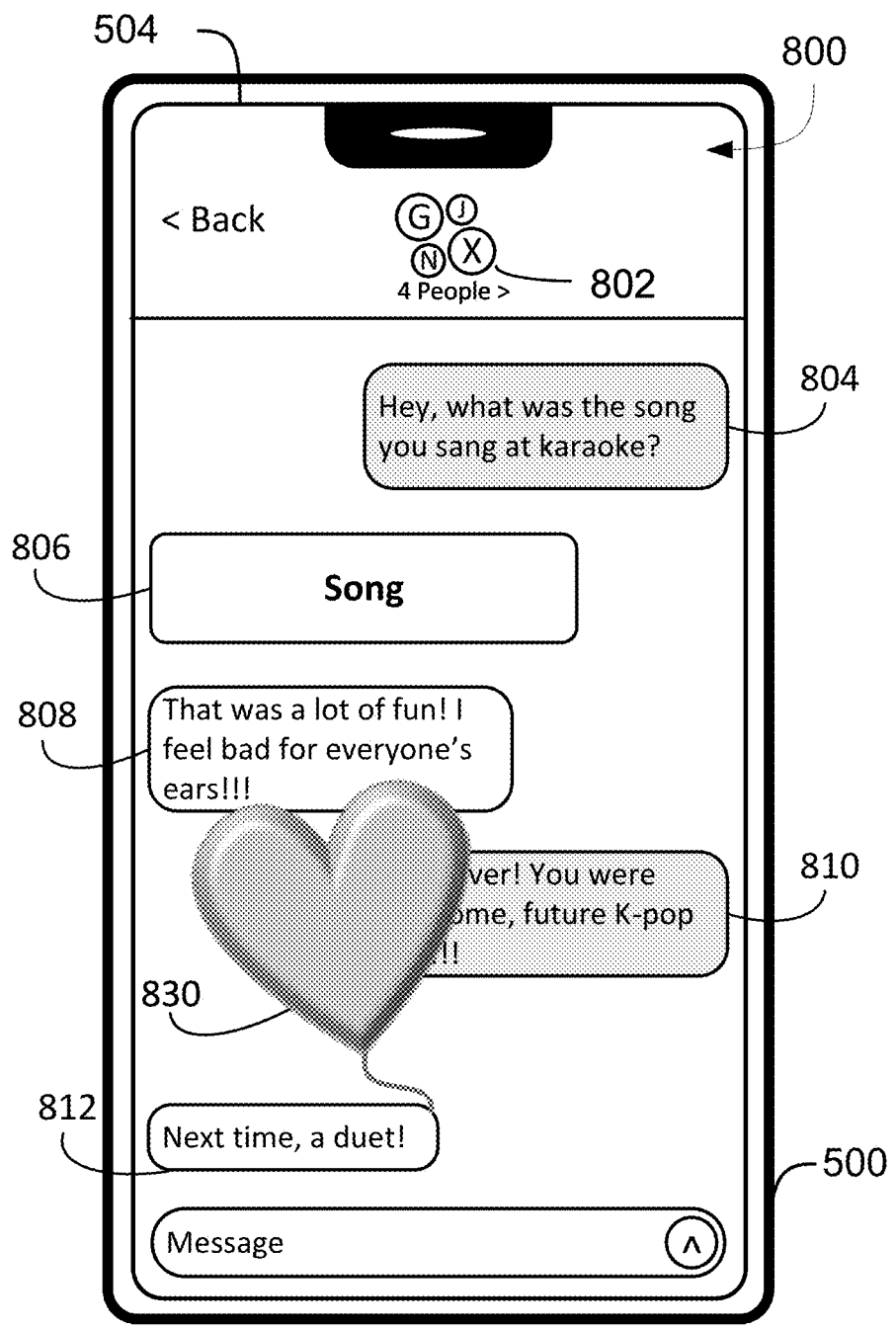
Figure 8L:
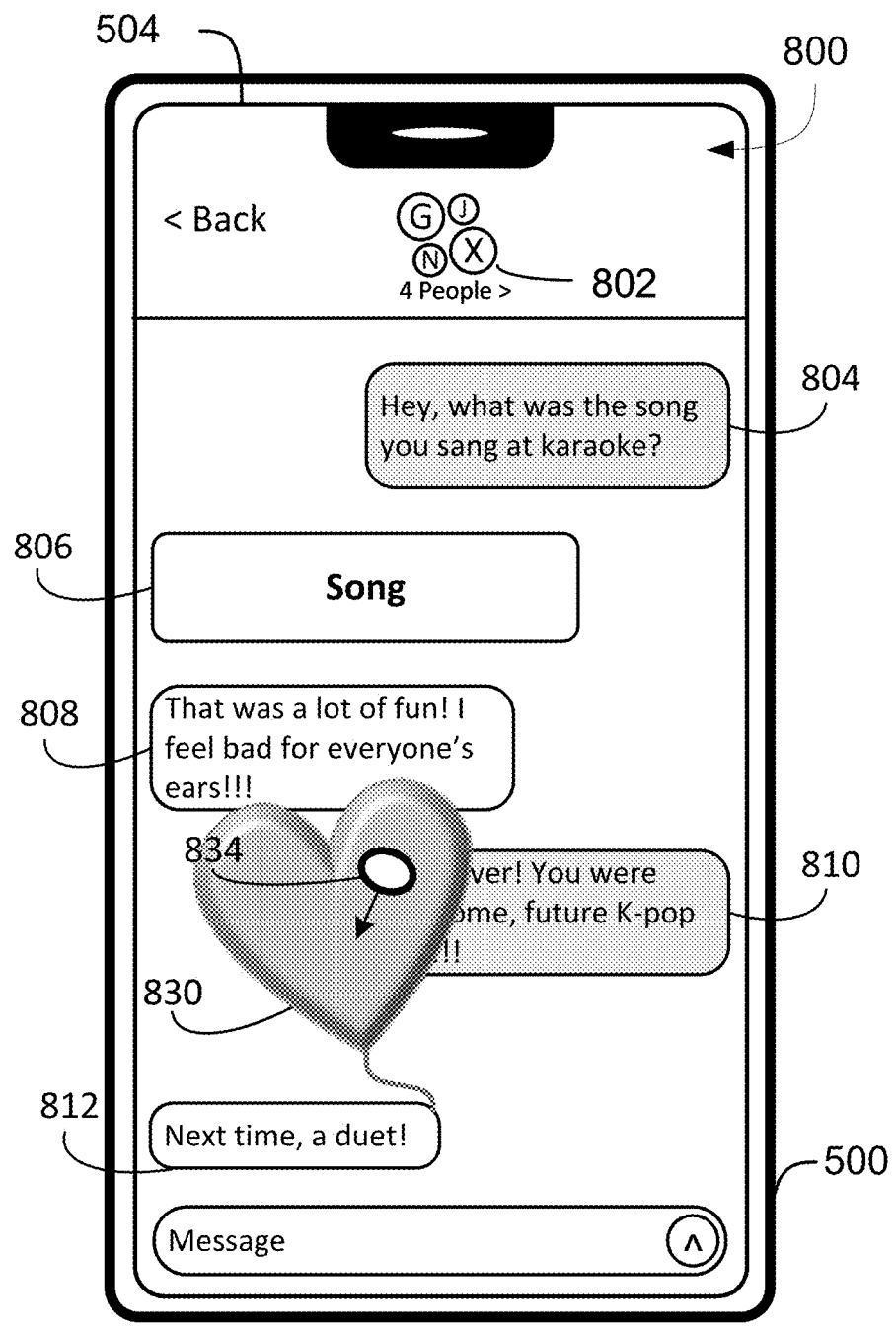
Figure 8M:
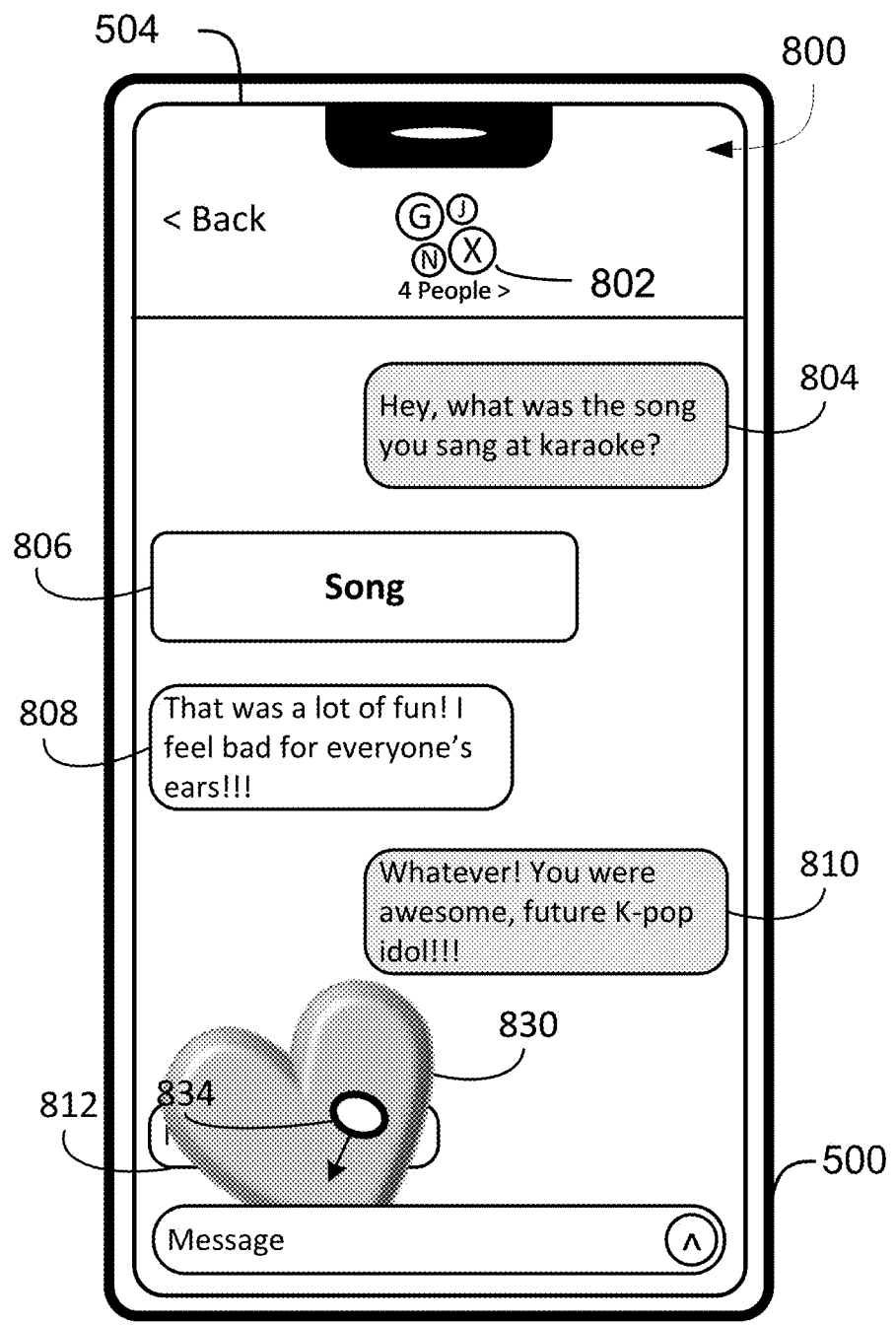
Figure 8N:
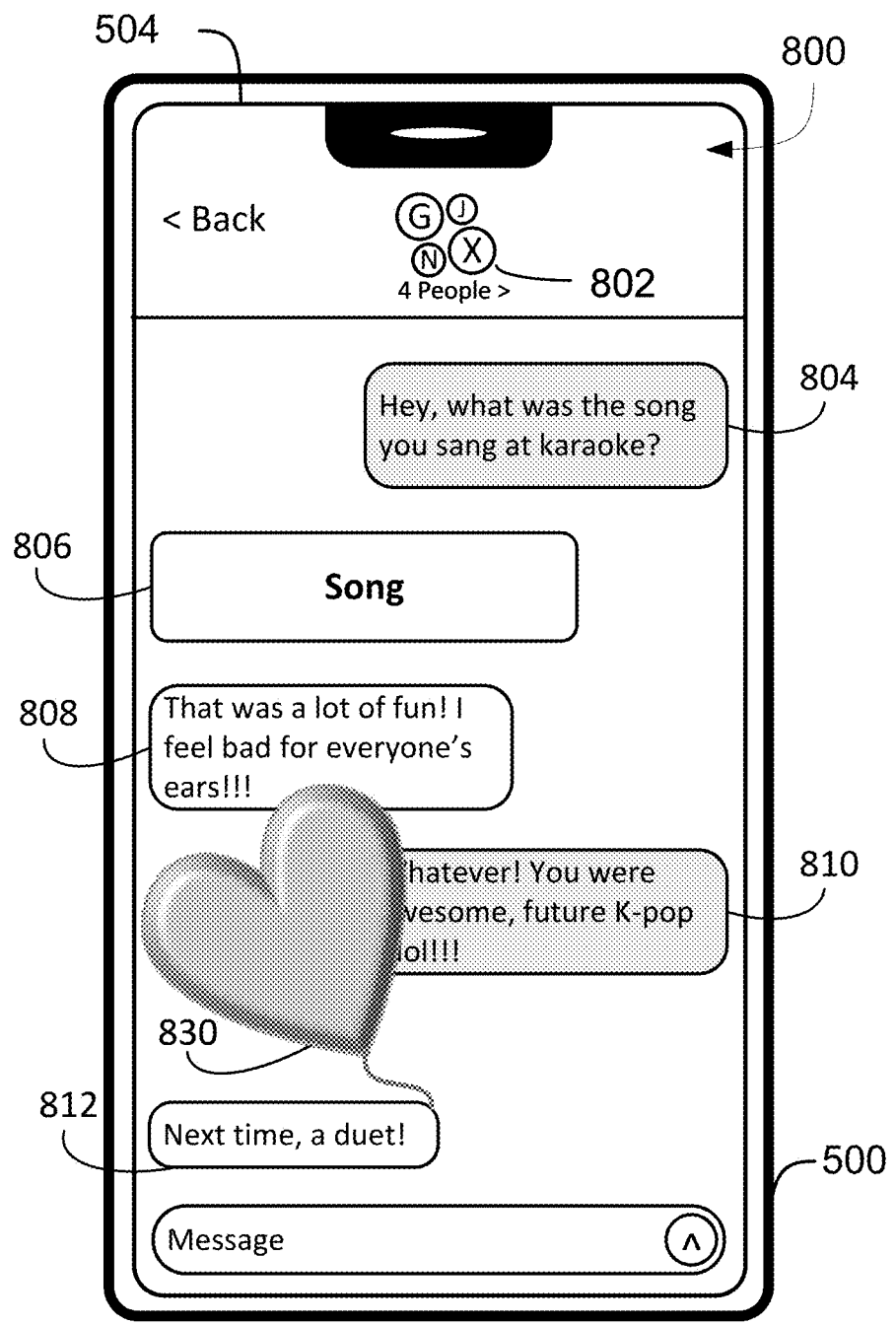
Figure 8O:
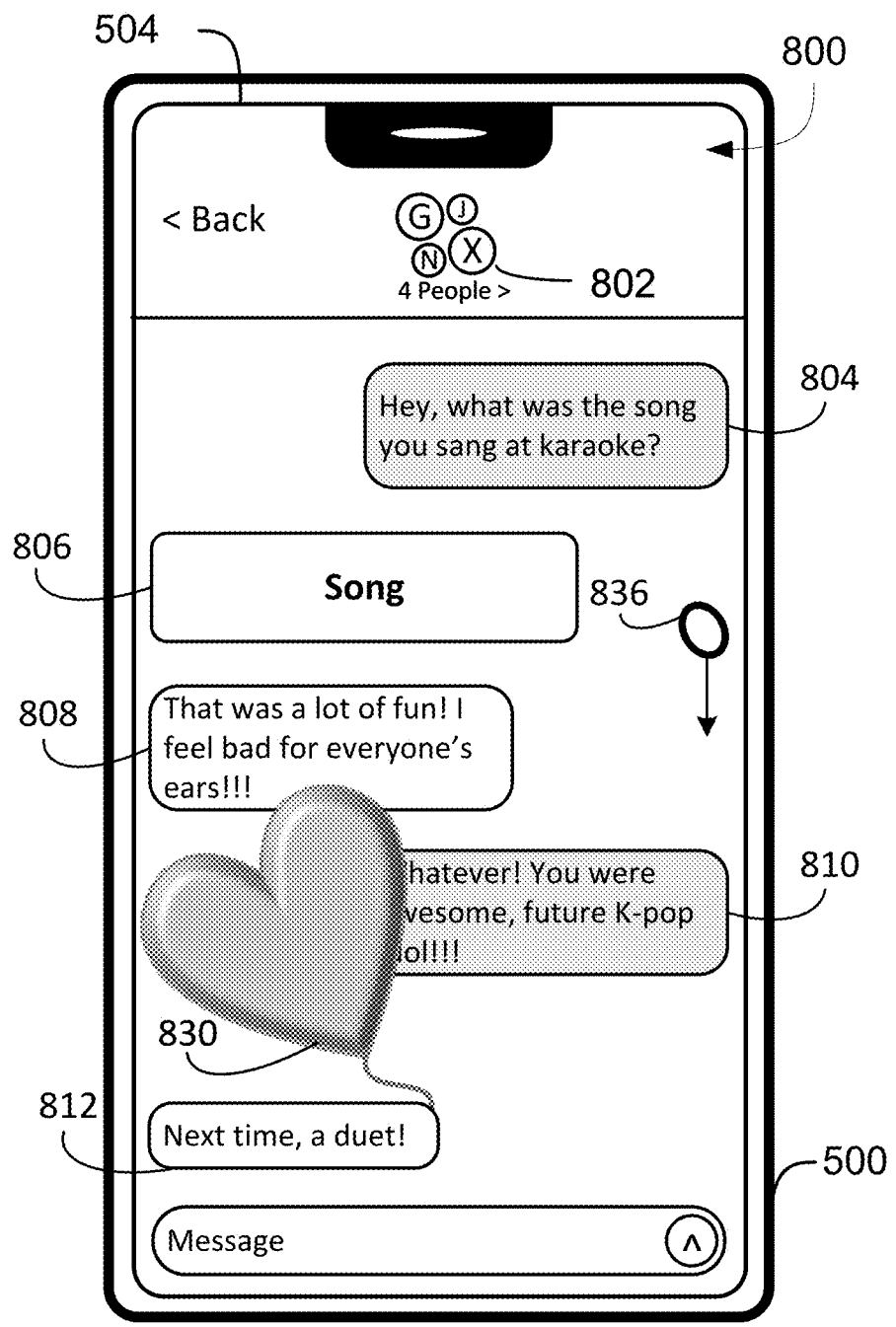
Figure 8P:
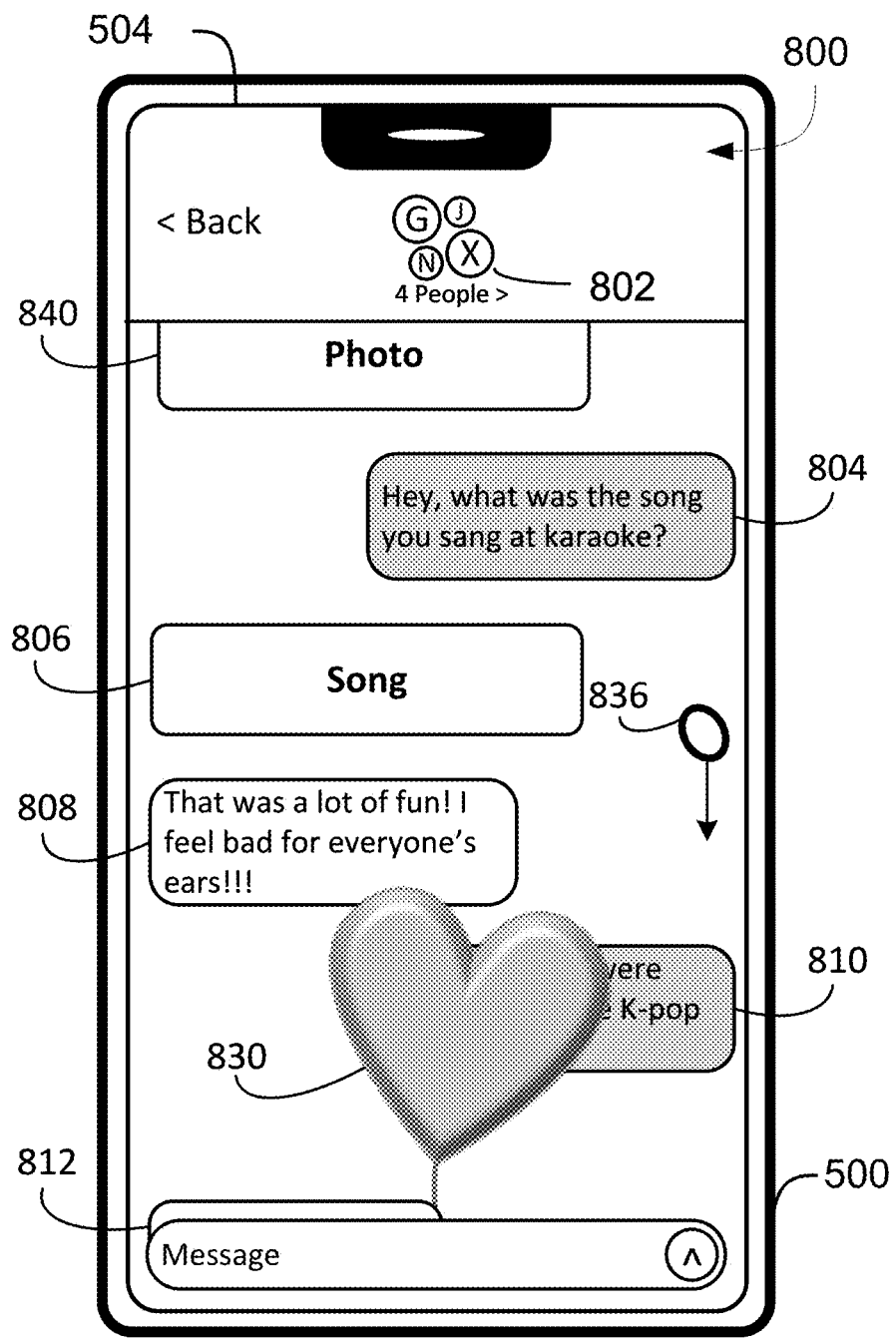
Figure 8Q:
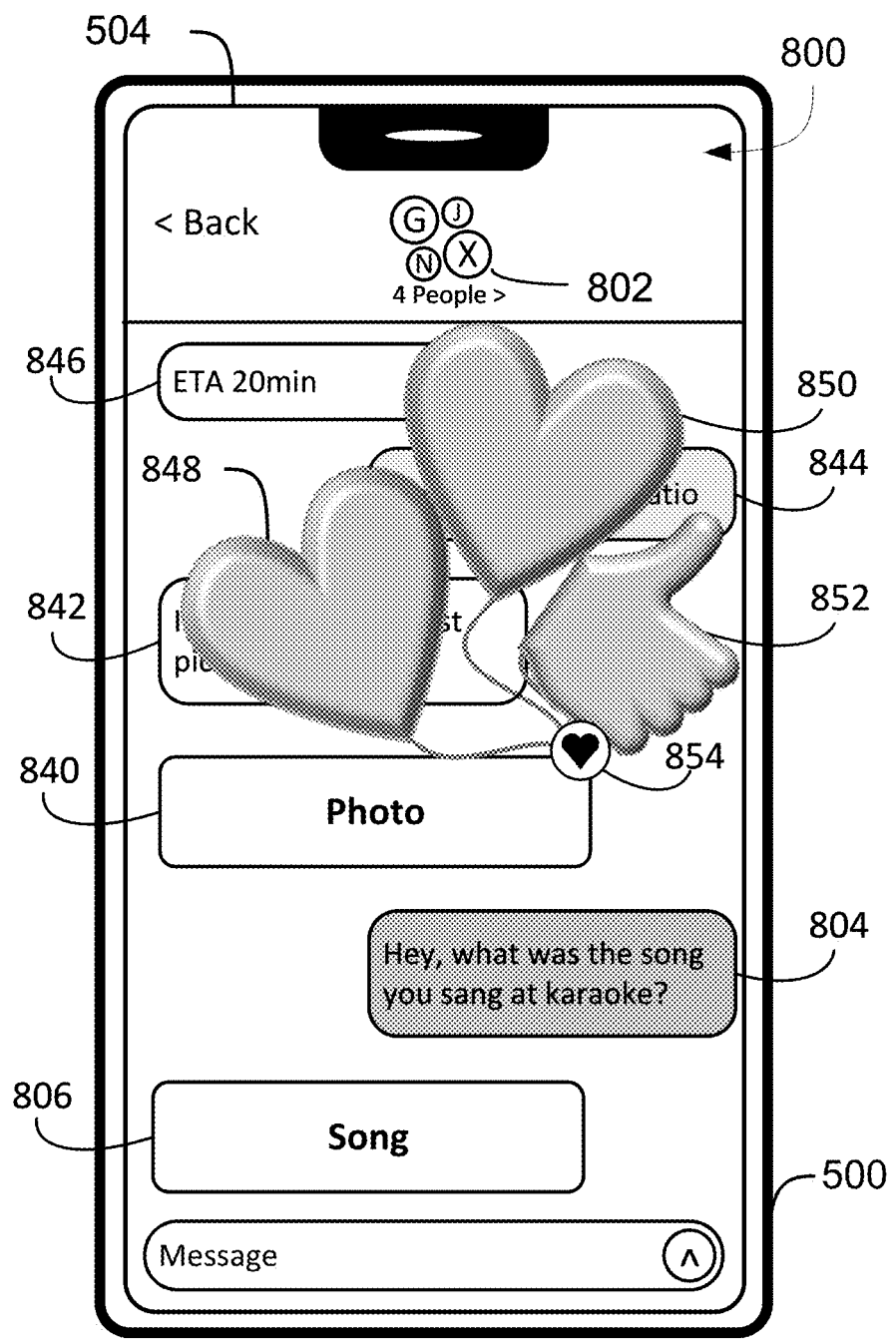
Figure 8R:
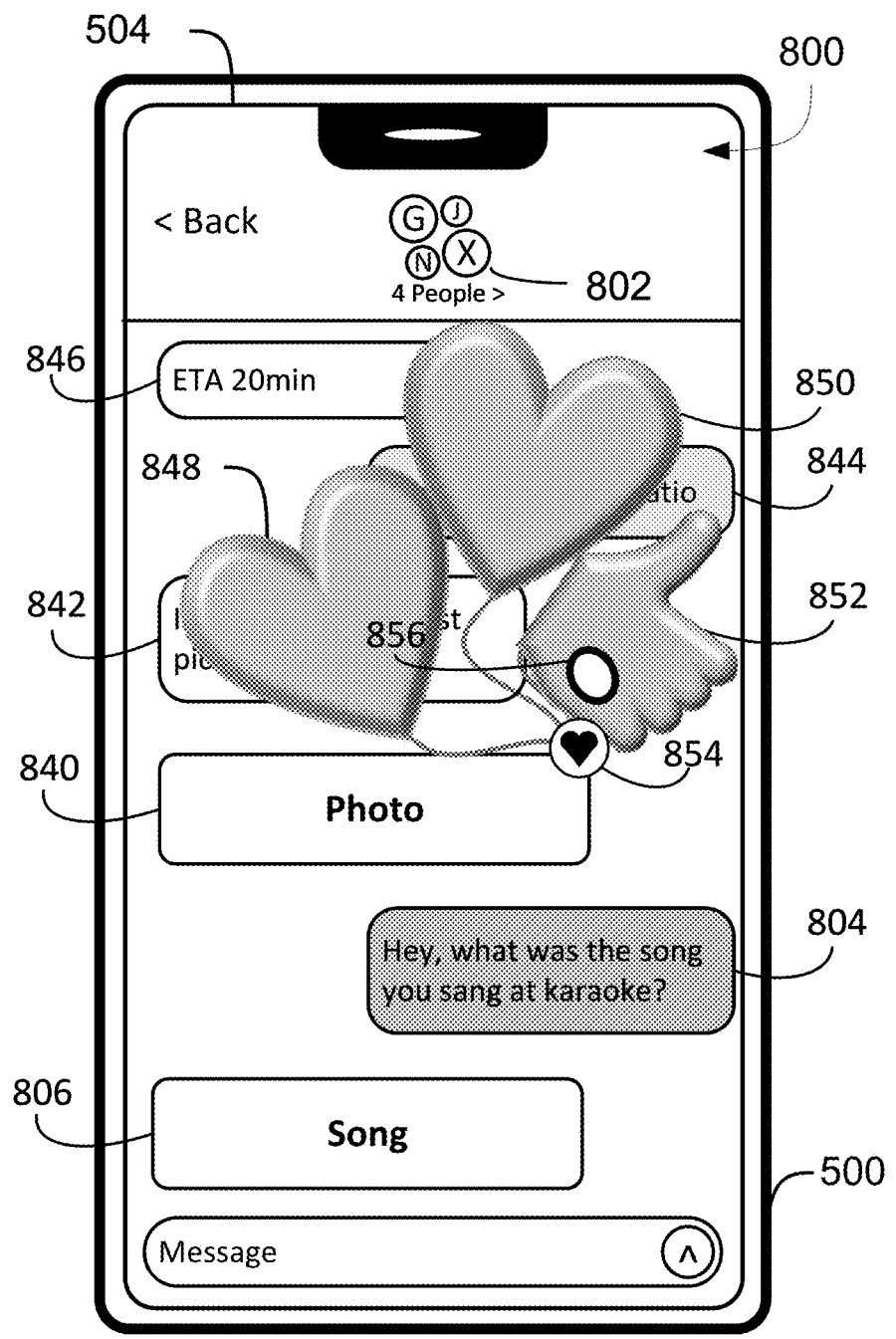
Figure 8S:
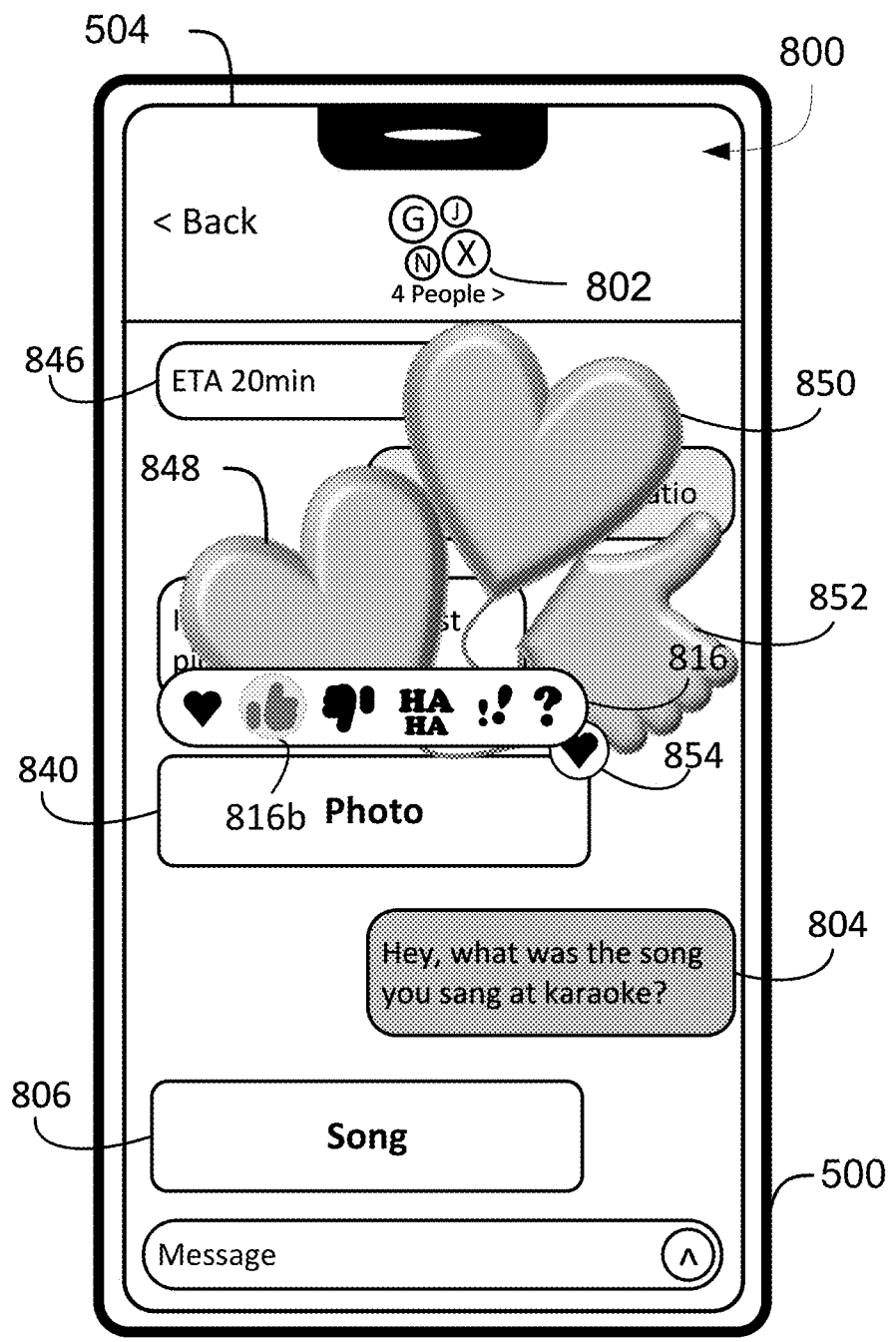
Figure 8T:
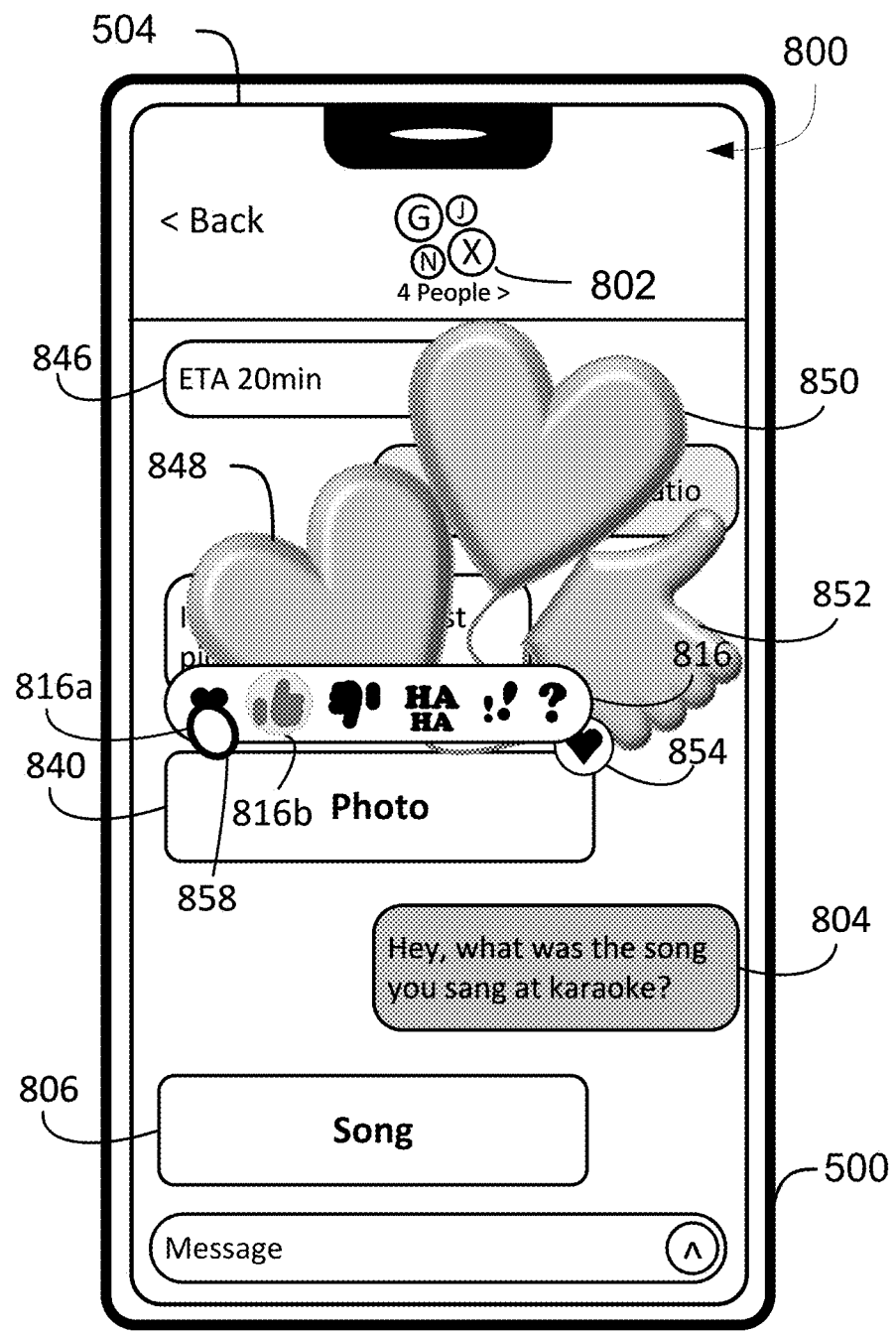
Figure 8U:
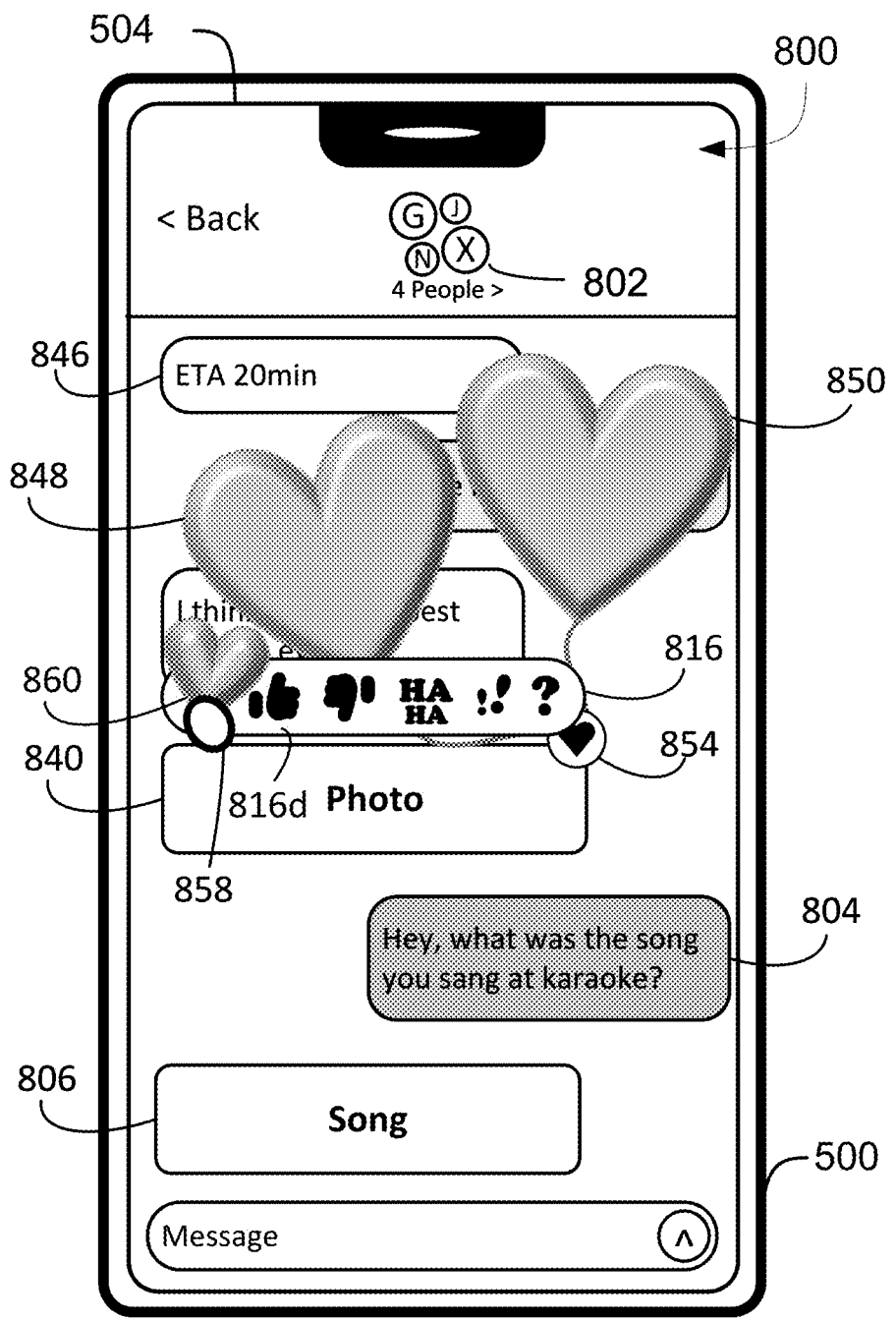
Figure 8U:
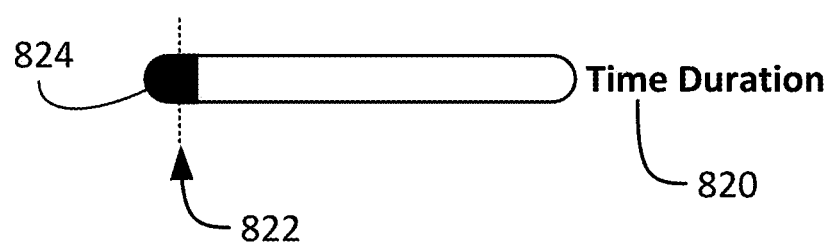
Figure 8V:
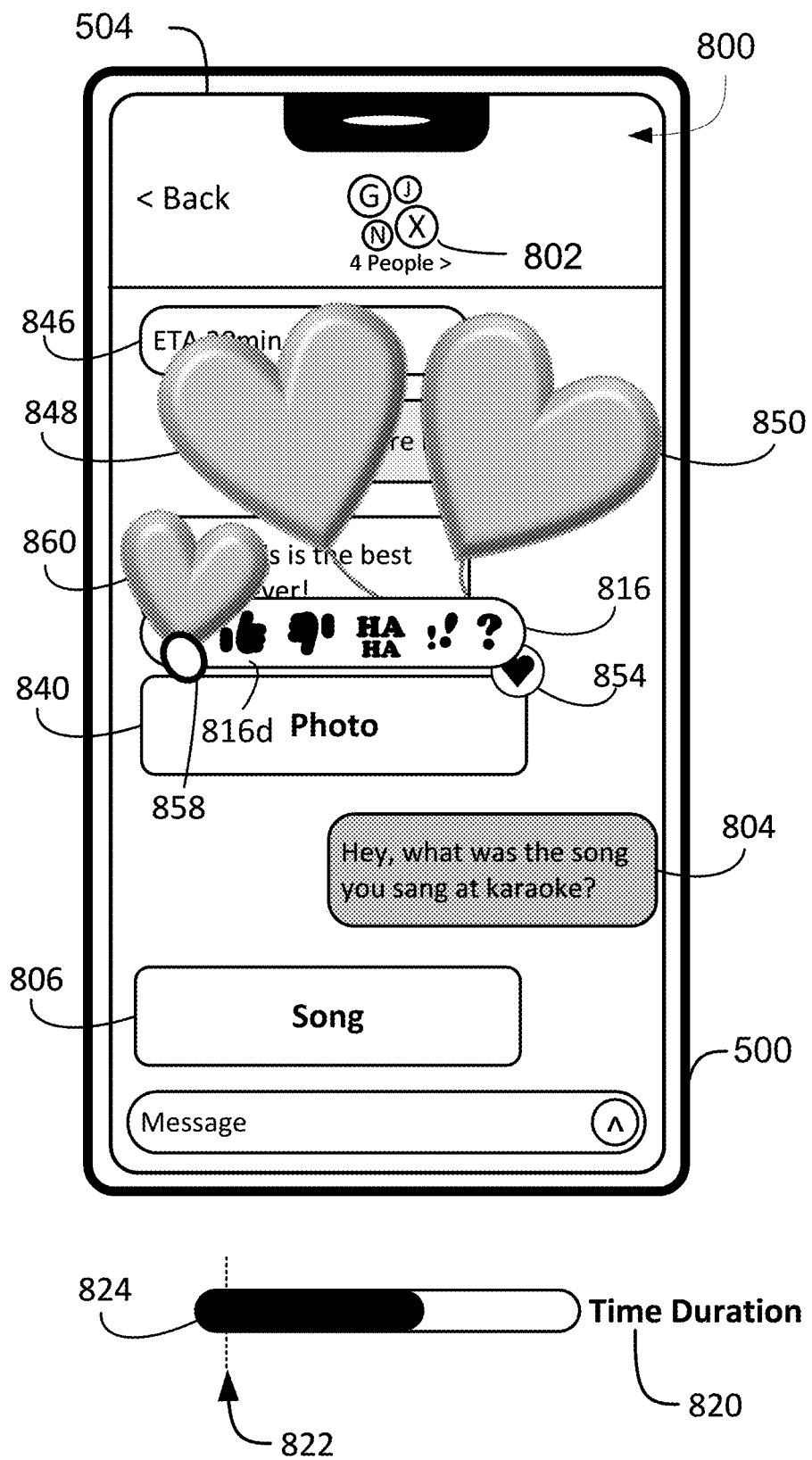
Figure 8W:
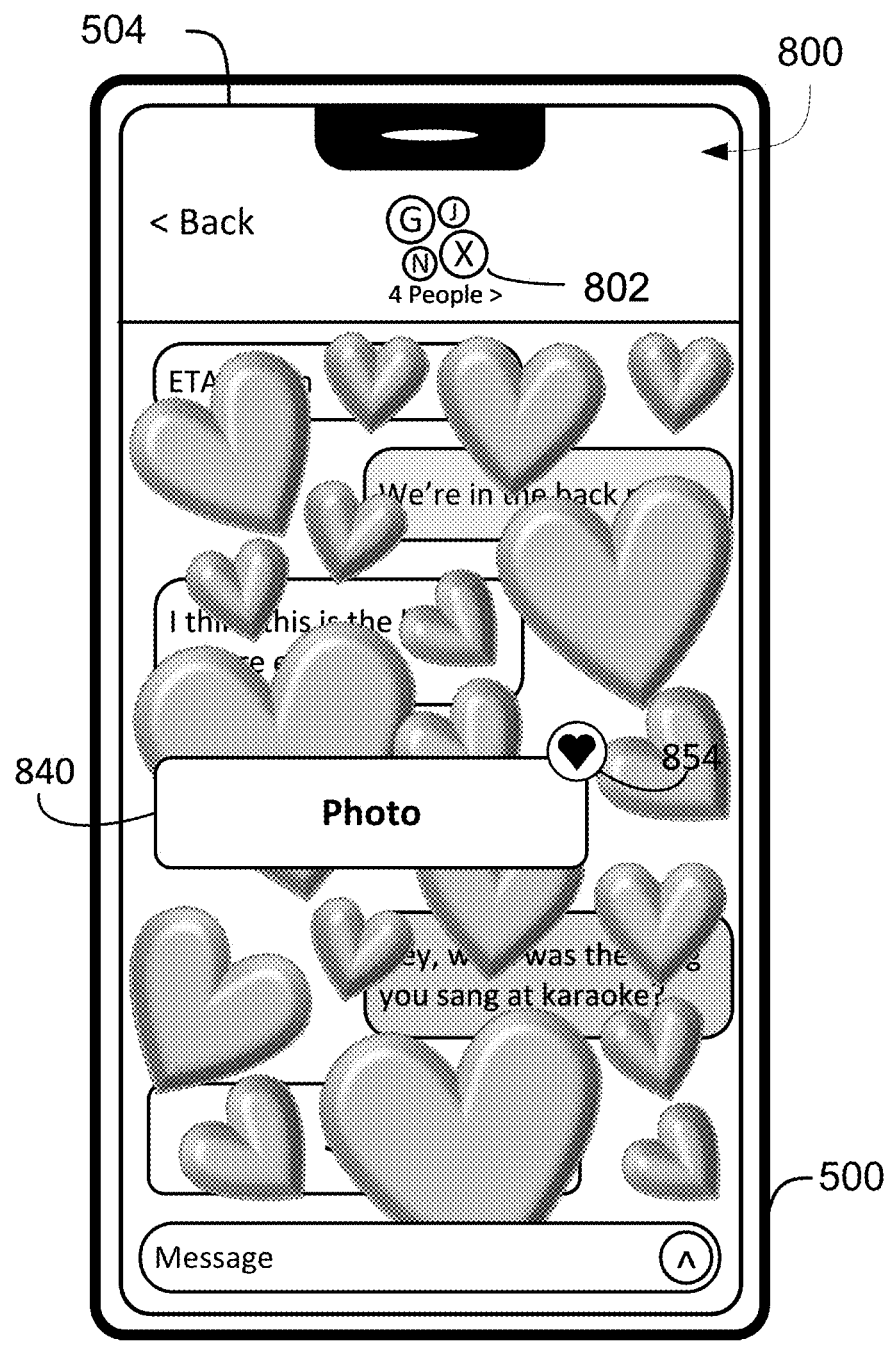
Figure 8X:
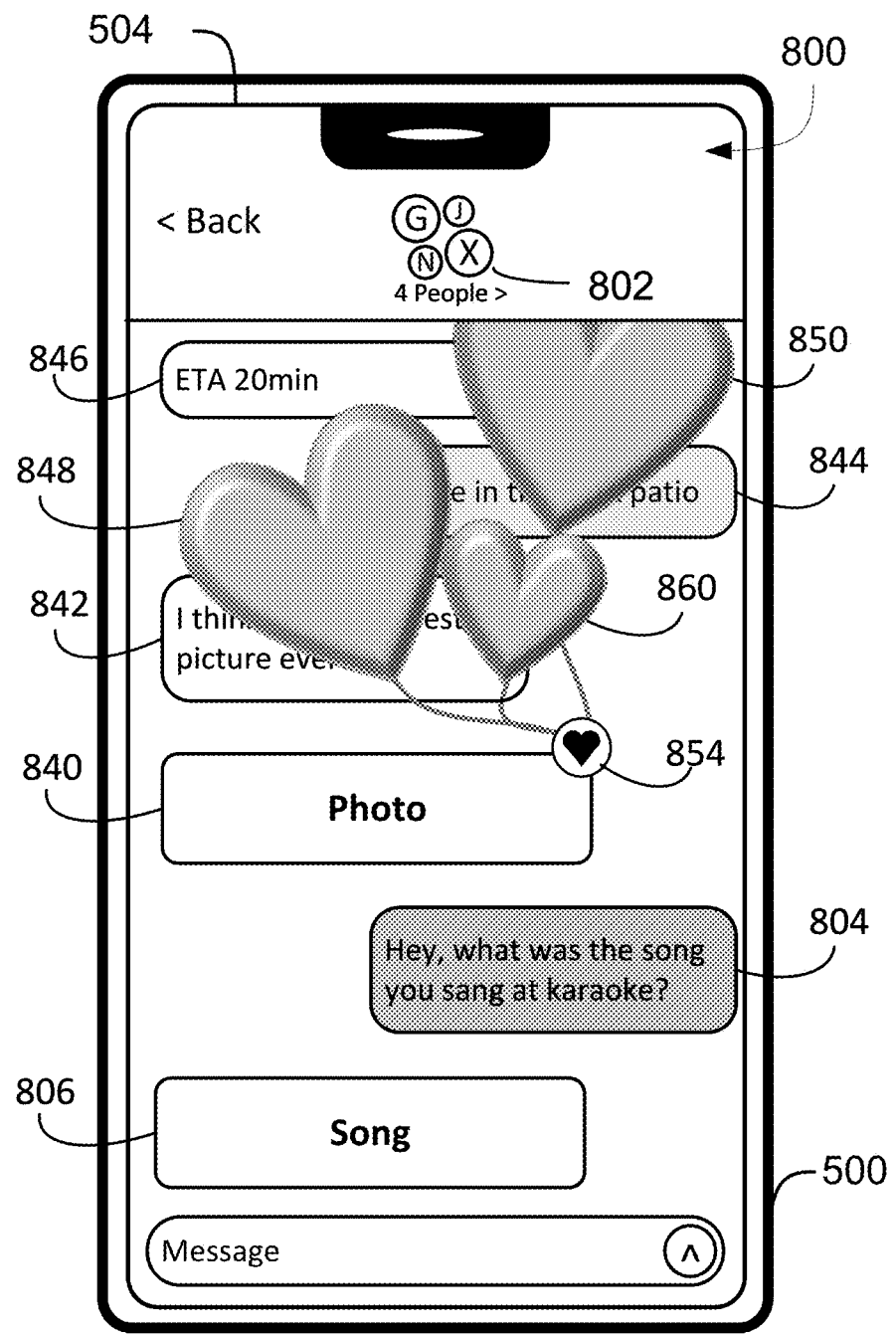

FIGS. 8A-8X illustrate various ways an electronic device displays messaging activity to a messaging conversation in accordance with some embodiments of the disclosure. The embodiments in these figures are used to illustrate the processes described below, including the processes described with reference to FIG. 9.

FIG. 8A illustrates an exemplary device 500 that includes a touchscreen 504. In FIG. 8A, the electronic device 500 is presenting a messaging user interface 800 that includes a messaging conversation between a user Bob (the user associated with device 500), a contact named Jane, a contact named Xavier, a contact named Guillermo, and a contact named Nancy (indicated by the representation 802 of a group chat). The messaging user interface 800 includes a first user interface object 804 (or representation) of a first message that was added to the messaging conversation from a device associated with Bob, a second user interface object 806 (or representation) of a second message that was added to the messaging conversation from a device associated with Xavier, a third user interface object 808 (or representation) of a third message that was also added to the messaging conversation from the device associated with Xavier, a fourth user interface object 810 (or representation) of a fourth message that was also added to the messaging conversation from the device associated with Bob, and a fifth user interface object 812 (or representation) of a fifth message that was added to the messaging conversation from the device associated with Xavier. In some embodiments, the device 500 displays the first user interface object 804, in messaging user interface 800, in response to device 500 receiving an indication that the device associated with Bob has added the first message to the messaging conversation which included the text "Hey, what was the song you sang at karaoke?" In some embodiments, the device 500 displays the second user interface object 806, in messaging user interface 800, in response to device 500 receiving an indication that the device associated with Xavier has added the second message comprising rich content, such as a song to the messaging conversation. In some embodiments, the device 500 displays the third user interface object 808, in messaging user interface 800, in response to device 500 receiving an indication that the device associated with Xavier has added the third message to the messaging conversation which included the text "That was a lot of fun! I feel bad for everyone's ears! ! !" Similarly, in some embodiments, the device 500 displays the fourth user interface object 810, in the messaging user interface 600, in response to device 500 receiving an indication that the device associated with Bob has added the fourth message to the messaging conversation which included the text "Whatever! You were awesome, future K-pop idol!! !" In some embodiments, the device 500 displays the fifth user interface object 812, in messaging user interface 800, in response to device 500 receiving an indication that the device associated with Xavier has added the fifth message to the messaging conversation which included the text "Next time, a duet"

In some embodiments, the device 500 displays responses to messages with variable visual emphasis in response to user input. For example, in FIG. 8B, while device 500 is displaying messaging user interface 800 including user interface objects 804, 806, 808, 810, and 812 displayed in the manner described in FIG. 8A, device 500 receives a request to select user interface object 812 to initiate a process to respond to the user interface object 812 as indicated by touch contact 814 directed to user interface object 812 (e.g., a tap and hold or double tap input directed to user interface object 814). In response to receiving the request to initiate the process to respond to the user interface object 814, in FIG. 8C, device 500 displays a response user interface element 816 in the messaging user interface 800. In some embodiments, the response user interface element 816 includes predefined responses such as adding a "heart" response (indicated by the response element 816a), a "like" response (indicated by the response element 816b), a "dislike" response (indicated by the response element 816c), a "laughing" response (indicated by the response element 816d), an "excitement" response (indicated by the response element 816e), and/or a "curiosity" response (indicated by the response element 816f) to the user interface object 812 in the messaging conversation.

FIG. 8D illustrates while the device 500 displays the response user interface element 816, device 500 receives a request to add response element 816a as indicated by touch input 818 (e.g., a tap and potentially a hold on element 816a). FIG. 8D further illustrates time duration 820 including threshold 822 corresponding to whether or not the device 500 displays the response with a visual emphasis as described in more detail with reference to method 900 and shown in the subsequent figures. In response to the device 500 receiving the request to add response element 816a to user interface object 812, the device 500 detects a duration 824 of the touch input (e.g., the time between touchdown of contact 818 and liftoff of contact 818 from element 816a) and when the duration is below threshold 822, the device displays the response 826 (representation of a "heart" response) added to user interface object 812 with a visual appearance as shown in FIG. 8E. In some embodiments, the visual appearance of response 826 includes a predefined visual appearance with a static (fixed) size and/or degree of emphasis that does not vary based on a duration of the touch input. In some embodiments, the device 500 ceases to display response user interface element 816 once the device 500 displays the response 826 as added to user interface object 812.

FIG. 8F illustrates while the device 500 displays the response 826 added to the user interface object 812, device 500 receives a request to change the response 826 as indicated by touch input 828 (e.g., a tap input on response 826). In response to receiving the request to change the response 826, device 500 displays the response user interface element 816 in the messaging user interface 800, as shown in FIG. 8G. In some embodiments, because the device 500 added response 826 to the user interface object 812, the corresponding response element 816a is displayed with a first visual appearance while the other response elements (e.g., 816d, 816e, and 816o) are displayed with a second visual appearance (e.g., indicating the other response elements have not been added to user interface object 812 in the messaging conversation by the device 500).

In some embodiments and as illustrated in FIG. 8H while the device 500 displays the response user interface element 816, device 500 receives a request to select the "heart" response element as indicated by touch input 832 (e.g., a tap and hold input on element 816). FIG. 8H further indicates time duration 820 including threshold 822. In response to the device 500 receiving the request to select the "heart" response element, the device 500 detects a duration 824 of the touch input and when the duration is above threshold 822, the device displays the response 830 (representation of a "heart" response) with a first visual emphasis corresponding to the duration of the touch input 832 as shown in FIG. 8H and as described with reference to method 900. In some embodiments, the first visual emphasis of the response 830 is different from the visual appearance of the response 826 illustrated in FIG. 8E. For example, compared to FIG. 8E response 830 appears three-dimensional when the duration exceeds (is above) threshold 822, as shown in FIG. 8H. In some embodiments, the visual emphasis increases as the duration 824 increases as illustrated in FIG. 8I. For example, compared to FIG. 8H, the response 830 is larger when duration 824 increases (greater than duration 824 in FIG. 8H), as shown in FIG. 8I. In some embodiments, device 500 increases the visual emphasis of response 830 as time continues to elapse while touch input 832 remains touched down on element 816a.

In FIG. 8J, the device 500 detects continued touch input 832 directed to the "heart" response element as indicated by touch input 832 (e.g., touch input 832 remains touched down on element 816a). In response to the device detecting the continued touch input 832, the device 500 displays response 830 with an even greater visual emphasis (e.g., larger and/or rounder). Compared to FIG. 8H, the visual emphasis of response 830 is greater with the increased duration 824, as shown in FIG. 8J. In some embodiments, once the device 500 detects no touch contact (e.g., liftoff of touch input 832), the device displays the response 830 added to user interface object 812 and/or in association with user interface object 812 with a visual appearance as shown in FIG. 8K. In some embodiments, the device displays the visual appearance of response 830 with a string-like graphic connecting response 830 to user interface object 812 (e.g., to the upper-right corner of user interface object 812), and thus, providing a balloon-like visual appearance being attached to user interface object 812.

In some embodiments, the device 500 displays response 830 attached and floating above user interface object 812. In some embodiments, the location and/or position of the response 830 changes in response to user input. For example, in FIG. 8L, the device 500 receives a request to move response 830 as indicated by touch input 834 (e.g., a downward/leftward swipe input on response 830). In response to the device 500 receiving the request to move response 830, the device 500 displays response 830 moving according to movement of the user input (e.g., moving at the same speed and/or direction), as shown in FIG. 8M. In some embodiments, once the device 500 detects no touch contact (e.g., liftoff of touch input 834), the device displays the response 830 gradually moving back to its position relative user interface object 812 (e.g., with simulated physics) with a visual appearance as shown in FIG. 8N. In some embodiments, the device 500 displays response 830 with a simulated inertia effect in response to the touch input 834 as described with reference to method 900.

In some embodiments, the device displays response 830 with an animated visual appearance in response to user input. For example, in FIG. 8O, the device 500 receives a request to scroll the messaging user interface 800 in a downwards direction as indicated by touch input 836 (e.g., a downward swipe input directed to user interface 800). In response to the request to scroll the messaging user interface, the device 500 scrolls the messaging user interface 800 including the user interface objects. In some embodiments, scrolling user interface object 812 causes response 830 to change visually and/or respond with simulated physics in the way a balloon tied to an object that starts to move would, as described with reference to method 900. For example, and as illustrated in FIG. 8P, in response to the scrolling, the string-like graphic associated with the response 830 appears tauter in response to the scrolling movement and/or the response 830 includes a degree of tilt and movement with simulated physics.

In FIG. 8Q, the device 500 has scrolled through the messaging user interface 800 such that user interface object 840 is displayed in its entirety and includes and/or is associated with responses 854, 853, 850, and 848 (e.g., having one or more of the characteristics of response 830). In some embodiments, responses 854, 848, and 850 each represent the "heart" response while response 854 represents the "like" response. In some embodiments, the device 500 displays an animation in response to the addition of a response to a user interface object as described with reference to method 900 and shown in the subsequent figures. For example, in FIG. 8R, while displaying user interface object 840 including responses 854, 853, 850, and 848, the device 500 receives a request to change the response 852 as indicated by touch input 856 (e.g., a tap input on response 852). In response to receiving the request to change the response 852, device 500 displays the response user interface element 816 in the messaging user interface 800 as illustrated in FIG. 8S. In some embodiments, because the device 500 added response 852 to the user interface object 840, the corresponding response element 816*b* is displayed with a first visual appearance while the other response elements are displayed with a second visual appearance (e.g., indicating the other response elements have not been added to user interface object 840 in the messaging conversation by the device 500). In some implementations, after a predefined time of showing the user interface objects in a balloon-like state, the user interface objects return to a small state (e.g., equivalent to user interface object 854) so that the message transcript can be read without being visually encumbered by the responses (e.g., tapback responses).

In some embodiments and as illustrated in FIG. 8T while the device 500 displays the response user interface element 816, device 500 receives a request to select the response element 816*a* as indicated by touch input 858 (e.g., a tap input on element 816*a*). In response to the device 500 receiving the request to select the response element 816*a*, the device 500 detects a duration 824 of the touch input and when the duration is above threshold 822, the device displays the response 860 (representation of a "heart" response) with a first visual emphasis corresponding to the duration of the touch input 858 as shown in FIG. 8U. In some embodiments, the visual emphasis increases as the duration 824 increases as illustrated in FIG. 8V. For example, compared to FIG. 8U, the response 860 is larger when duration 824 increases as shown in FIG. 8V.

In some embodiments, once the device 500 detects no touch contact (e.g., liftoff of touch input 858), the device 500 determines whether to trigger an animation effect as described with reference to method 900. In some embodiments, the animation is triggered by a number of responses of a particular type exceeding a threshold number of responses of the particular type. In some embodiments, the animation effect includes displaying user interface object 840 at the forefront of a message display region of the messaging user interface 800, detaching the responses from user interface object 840 and/or multiplying the responses such that the responses cover the entirety of the message display region for a particular duration (e.g., 1, 3, 10, 20, 30 or 60 seconds), such as shown in FIG. 8W. In some embodiments, the animation loops a predetermined number of times (e.g., once or twice) and once the animation ends, the changed response (e.g., response 860) is added to user interface object 840 along with the other responses. In some embodiments, the animation only includes the type of response exceeding the threshold number while other responses of different types are hidden (cease from displaying) during the animation. In some embodiments, the multiplied responses have varying sizes and degrees of emphasis. In some embodiments, the animation includes the responses moving within and/or across the user interface 800. In some embodiments, after the animation concludes, the other types of responses not included in the animation are redisplayed on the user interface object and/or in the user interface. In some embodiments, the animation is triggered by adding a response of the particular type (to exceed the threshold number) or changing an existing response to the particular type of response (to contribute to exceeding the threshold number of responses).

FIG. 9 is a flow diagram illustrating a method 900 of displaying messaging activity to a messaging conversation in accordance with some embodiments, such as in FIGS. 8A-8X. The method 900 is optionally performed at an electronic device such as device 100, device 300, or device 500 as described above with reference to FIGS. 1A-1B, 2-3, 4A-4B and 5A-5H. In some embodiments, method 900 is performed at or by an automobile (e.g., at an infotainment system of an automobile having or in communication with one or more display generation components and/or input devices). Some operations in method 900 are, optionally combined and/or order of some operations is, optionally, changed.

In some embodiments, method 900 is performed at an electronic device (e.g., device 500) in communication with a display generation component and one or more input devices. In some embodiments, the electronic device has one or more of the characteristics of the electronic device described with reference to method 700. In some embodiments, the display generation component has one or more of the characteristics of the display generation component described with reference to method 700. In some embodiments, the one or more input devices have one or more of the characteristics of the one or more input devices described with reference to method 700.

In some embodiments, the electronic device displays (902a), via the display generation component, a user interface, such as user interface 800 in FIG. 8C (e.g., messaging user interface, such as the messaging user interface described with reference to method 700) including a first user interface object corresponding to a first message in a messaging conversation (902b), such as user interface object 812 in FIG. 8C. In some embodiments, the messaging conversation includes messages sent from the electronic device and messages sent from electronic devices associated with a plurality of users. The electronic device and the electronic devices associated with the plurality of users optionally have access to the messaging conversation. In some embodiments, messages sent from the electronic device (e.g., from a user account associated with the electronic device) are displayed on a first side of the messaging conversation (e.g., the right side) and messages sent from a different electronic device (e.g., from a user account associated with a different electronic device) are displayed on a second side (e.g., the left side) of the messaging conversation. In some embodiments, the first user interface object is a representation of a message (e.g., the first message), and includes text content corresponding to the first message. For example, a first user interface object corresponding to the message "Hi, how's it going?" optionally includes the text "Hi, how's it going?" displayed within the first user interface object. Text content is optionally not limited to only "text" characters, but optionally include emojis, special characters, non-English characters, and/or graphics. In some embodiments, the first user interface object corresponds to and/or includes rich content (e.g., links, photos, music, videos, electronic books, audiobooks, podcasts, playlists, locations, documents, and/or other rich multimedia) corresponding to the first message (e.g., content other than text content). In some embodiments, rich content is generated as a message by an app installed on the electronic device and is presented as such. For example, the first user interface object corresponding to music is generated as a message and its user interface object optionally includes a representation (e.g., image, audio clip, and/or video) of a particular song generated by a music app. In some embodiments, the first user interface object has one or more of the characteristics of the first user interface objects or the second user interface objects described with reference to method 700.

In some embodiments, the user interface includes a user interface element corresponding to a predefined response to the first message (902c), such as response 816a in FIG. 8C. For example, the user interface includes a user interface element selectable for initiating a process to add a predefined response to the first message in the messaging conversation. In some embodiments, the predefined responses include adding a "like" tag, a "dislike" tag, a "heart" tag, a question mark tag, an emphasis tag, and/or a laugh tag to the first message in the messaging conversation. In some embodiments, when the electronic device detects a selection of a predefined response (e.g., a tag), the electronic device adds to the messaging conversation the predefined response, optionally in association with the first user interface object and/or the first message. In some embodiments, other electronic devices associated with the users in the messaging conversation receive an indication that the electronic device has added the predefined response to the messaging conversation, and subsequently display an indication of the predefined response in the messaging user interface.

In some embodiments, while displaying, via the display generation component, the user interface including the user interface element, the electronic device detects, via the one or more input devices, a first input directed to the user interface element (902d), such as input 818 in FIG. 8D. In some embodiments, the first input corresponds to a touch input to interact with the user interface element, such as a tap input, a touch and hold input, a pinch and release input and/or a pinch and hold input.

In some embodiments, while detecting the first input, the electronic device displays, via the display generation component, a visual indication of the predefined response, such as indication 830 in FIG. 8H. In some embodiments, the visual indication of the predefined response is in association with the first user interface object in the messaging conversation—for example, a representation of the predefined response is displayed with/on/in the first user interface object and/or the messaging conversation. Methods of presenting the visual indication with/on/in the first user interface object and/or the messaging conversation will be described in more detail later with reference to method 700. In some embodiments, displaying the visual indication of the predefined response comprises the electronic device changing a visual emphasis of the visual indication based on a duration of the first input (902e), such as indication 830 changing in FIG. 8I to FIG. 8J based on duration 824 in FIG. 8J. For example, the visual emphasis is displayed corresponding to a duration of the first input (e.g., length of time between a touch down of a contact on a surface (e.g., a touch-sensitive surface) at a location corresponding to the user interface element, and a subsequent liftoff of the contact from the surface after the touchdown of the contact). In some embodiments, the visual indication changes in size, shape, color, and/or height as a function of the duration of the first input. For example, the amount of visual emphasis increases (e.g., bigger size indication, more rounded shape for the indication with fewer sharp edges, a more vibrant color for the indication, and/or a greater height for the indication) as the duration of the touch input increases (e.g., length of time the contact is directed to the user interface element). In some embodiments, the user interface includes a preview of (display of) the visual emphasis of the visual indication, wherein the visual emphasis is based on the selected predefined response and duration of the first input. Responding to a respective message in a messaging conversation based on the duration of an input provides the user with a quick and efficient manner of responding to the respective message with less user input while defining variable emphasis on the response, which additionally reduces power usage and improves battery life of the electronic device by enabling the user to use the electronic device more quickly and efficiently.

In some embodiments, while displaying the visual indication of the predefined response, the electronic device detects an end of the first input, such as input 832 in FIG. 8J (e.g., liftoff of the touch contact directed to the user interface element). In some embodiments, in response to detecting the end of the first input and in accordance with a determination that the first input had a first duration, such as duration 824 in FIG. 8V (e.g., the first input was a touch down of a contact on a surface (e.g., a touch-sensitive surface) at a location corresponding to the user interface element, followed by liftoff of the contact from the surface the first duration after the touchdown of the contact), the electronic device displays the visual indication of the predefined response with a first visual emphasis and in association with the first user interface object corresponding to the first message in the messaging conversation, such as response 860 in FIG. 8X. For example, displaying the visual indication of the predefined response with a first size, first shape, first color, and/or first height.

In some embodiments, in accordance with a determination that the first input had a second duration, longer than the first duration, such as duration 824 in FIG. 8J (e.g., the first input was a touchdown of the contact on the surface at the location corresponding to the user interface element, followed by liftoff of the contact from the surface the second duration after the touchdown of the contact), the electronic device displays the visual indication of the predefined response with a second visual emphasis greater than the first visual emphasis and in association with the first user interface object corresponding to the first message in the messaging conversation, such as response 830 in FIG. 8K. For example, the visual indication of the predefined response with the second visual emphasis is displayed with a bigger size than the first size, a second shape that is more rounded and/or has fewer sharp edges or corners than the first shape, a second color more vibrant than the first color, and/or a second height greater than the first height. In some embodiments, the amount of visual emphasis increases as the duration of the touch input increases (e.g., length of time contact is directed to the user interface element). The above-described manner of responding to a respective message in a messaging conversation provides the user with a quick and efficient manner of responding to the respective message with less user input while defining variable emphasis on the response, which additionally reduces power usage and improves battery life of the electronic device by enabling the user to use the electronic device more quickly and efficiently.

In some embodiments, the visual indication of the predefined response is displayed with a three-dimensional visual appearance, such as response 830 in 8K. In some embodiments, the three-dimensional visual appearance resembles a balloon. In some embodiments, the balloon-like predefined response includes string attaching it to the first message. Displaying a response to a message with a three-dimensional visual appearance communicates a wider range of nonverbal information, which additionally reduces power usage and improves battery life of the electronic device by enabling the user to use the electronic device more quickly and efficiently.

In some embodiments, wherein changing the visual emphasis of the visual indication based on the duration of the first input includes the electronic device displaying an animation of the visual indication increasing in size in accordance with sustained input directed to the user interface element, such as response 830 changing size in FIG. 8H to FIG. 8I to FIG. 8J. In some embodiments, the animation of the visual indication is a "live" preview of the predefined response in that it is visually updated (e.g., growing in size) to reflect the sustained input directed to the user interface element. Displaying an animated response to a message aids in achieving an intended response by providing feedback about the predefined response being generated, which reduces errors in response characteristics, and additionally reduces power usage and improves battery life of the electronic device by enabling the user to use the electronic device more quickly and efficiently.

In some embodiments, the animation depicts the visual indication having a balloon-like visual appearance, such as visual appearance of response 830 in FIG. 8K (e.g., to convey an impression that the predefined response is a balloon being inflated, growing in size as the duration of the input increases). Displaying an animated response to a message aids in achieving an intended response by providing feedback about the predefined response being generated, which reduces errors in response characteristics, and additionally reduces power usage and improves battery life of the electronic device by enabling the user to use the electronic device more quickly and efficiently.

In some embodiments, the balloon-like visual appearance includes displaying the visual indication of the predefined response with a degree of tilt, a degree of movement, and/or a degree of slack with simulated physics, such visual appearance of response 830 in FIG. 8N. In some embodiments, the degree of tilt, the degree of movement, and/or the degree of slack with simulated physics is based on a balloon model for the predefined response to create a more realistic, responsive, and interactive predefined response. Displaying an animated response to a message using more realistic movements aids in visually distinguishing the response from other parts of the messaging conversation. In some embodiments, while displaying the visual indication of the predefined response, the electronic device detects, via the one or more input devices, a scrolling input, such as input 836 in FIG. 8O (e.g., request to scroll the first user interface object or the user interface or another user interface object of the user interface, such as via an upward or downward swipe input on a touch-sensitive surface).

In some embodiments, in response to detecting the scrolling input, the electronic device scrolls the first user interface object towards a boundary (e.g., top boundary, if the input is a request to scroll the user interface upward, and bottom boundary if the input is a request to scroll the user interface downward) of the user interface in accordance with the scrolling input, such as user interface 800 in FIG. 8P. In some embodiments, while displaying, via the display generation component, the scrolling of the first user interface object towards the boundary of the user interface in accordance with the scrolling input, the electronic device displays the visual indication of the predefined response with a degree of tilt, a degree of movement, and/or a degree of slack based on simulated physics, such as response 830 in FIG. 8P. In some embodiments, the degree of tilt, the degree of movement, and/or the degree of slack with simulated physics is based on the scrolling movement to create a more realistic, responsive, and interactive predefined response. In some embodiments, the visual indication of the predefined response includes a simulated inertia effect in response to a speed and direction of the scrolling input. For example, in response to the scrolling input, the electronic device optionally moves and continues to move the visual indication of the predefined response to a stop (e.g., the visual indication of the predefined response continues to move even when the scrolling input ceases). In some embodiments, the degree of tilt, the degree of movement, and/or the degree of slack with simulated physics is based on the speed and direction of the scrolling input. For example, when the scrolling input includes a first degree of swipe in a first direction, the visual indication of the predefined response optionally includes a first simulated inertia effect, the first degree of tilt, the first degree of movement, and/or the first degree of slack with simulated physics in the same first direction of the first degree of the swipe. In another example, when the scrolling input includes a second degree of swipe in the first direction (e.g., faster degree of swipe upwards than the first degree of swipe upwards), the visual indication of the predefined response optionally includes a second simulated inertia effect lasting longer than the first simulated inertia effect (e.g., the visual indication of the predefined response continues to move longer and eventually stops, decelerates slower than the visual indication of the predefined response with the first simulated inertia effect), the second degree of tilt is greater than the first degree of tilt, the second degree of movement is faster than the first degree of movement, and/or the second degree of slack with simulated physics is more taut than the first degree of slack with simulated physics. In another example, when the scrolling input includes a third degree of swipe in the first direction (e.g., shorter degree of swipe upwards than the first degree of swipe upwards), the visual indication of the predefined response optionally includes a third simulated inertia effect lasting shorter than the first simulated inertia effect (e.g., the visual indication of the predefined response continues to move for shorter time and eventually stops, decelerates faster compared to the visual indication of the predefined response with the first simulated inertia effect), the third degree of tilt is less than the first degree of tilt, the second degree of movement is smaller than the first degree of movement, and/or the second degree of slack with simulated physics is more less taut than the first degree of slack with simulated physics. Displaying an animated response to a message using more realistic movements in response to the described scrolling input aids in visually distinguishing the response from other parts of the messaging conversation.

In some embodiments, while displaying the visual indication of the predefined response in association with the first user interface object, the electronic device detects, via the one or more input devices, a second input directed to the visual indication of the predefined response, such as input 834 directed to response 830 in FIG. 8L. In some embodiments, the second input corresponds to a touch input to interact with the visual indication of the predefined response, such as a tap input, a touch and hold input, a pinch and release input and/or a pinch and hold input and/or a swipe input directed to the visual indication of the predefined response.

In some embodiments, while detecting the second input, the electronic device moves the visual indication of the predefined response to a different location in the user interface in accordance with the second input, different from a location of the visual indication of the predefined response when the second input was detected, such as response 830 location in FIG. 8L to FIG. 8M; In some embodiments, the visual indication of the predefined response occupies at least partially a same area of one or more user interface objects of the user interface. In some embodiments, movement of the predefined response to the different location causes the visual indication of the predefined response to not occupy the same area of the one or more user interface objects of the user interface. In some embodiments, the amount of movement and direction of the visual indication of the predefined response is based on an amount of movement and direction of the second input. In some embodiments, while displaying the visual indication of the predefined response at the different location, the electronic device detects an end of the second input, such as input 834 in FIG. 8M (e.g., liftoff of the touch contact directed to the visual indication of the predefined response).

In some embodiments, in response to detecting the end of the second input, the electronic device displays an animation of the visual indication of the predefined response gradually moving to the location of the visual indication of the predefined response when the second input was detected, such as response 830 in FIG. 8N. In some embodiments, after temporarily moving the visual indication of the predefined response to the different location, the electronic device returns the visual indication of the predefined response to its original location in association with the first user interface object. For example, the simulated inertia described with reference to method 900 applies in that the animation of the visual indication continues when the second input ceases and slowly returns to a non-fixed equilibrium position in association with the first user interface object. The above-described manner of moving a response to a respective message in a messaging conversation provides the user with a quick and efficient manner of addressing obstruction of elements and/or user interface objects in the user interface, which reduces errors in usage and/or interaction with the messaging conversation.

In some embodiments, while displaying the visual indication of the predefined response in association with the first user interface object, the electronic device detects, via the one or more input devices, a second input corresponding to a request to display a second visual indication of a second predefined response to the first user interface object corresponding to the first message in the messaging conversation, such as input 858 directed to response 860 (e.g., the second input has one or more characteristics of the first input, but directed to a user interface element corresponding to the second predefined response).

In some embodiments, in response to detecting the second input, the electronic device moves the visual indication of the predefined response to a different location in the user interface, different from the location of the visual indication of the predefined response when the second input was detected, while maintaining display of the visual indication of the predefined response in association with the first user interface object, such as response 848 location moving from FIG. 8U to FIG. 8V. In some embodiments, the electronic device displays the second visual indication of the second predefined response in association with the first user interface object at a location in the user interface, different from the different location of the visual indication of the predefined response, such as response 860 location different from responses 850 and 848 respective locations in FIG. 8X. In some embodiments, when the electronic device detects a selection of the second predefined response, the electronic device adds to the messaging conversation the second predefined response, in association with the first user interface object and/or the first message. In some embodiments, the second visual indication of the second predefined response and the visual indication of the predefined response do not occupy the same space/location such that movement of the second visual indication of the second predefined response proximate to the visual indication of the predefined response causes the visual indication of the predefined response to move away to a different location, different from the location of the second visual indication of the second predefined response (e.g., as if being pushed away by collision(s) between the visual indication of the predefined response and the second visual indication of the second predefined response). In some embodiments, when the electronic device detects additional predefined responses in associated with the first user interface object similar to the predefined response and the second predefined response, the electronic device causes all of the additional predefined response including the predefined response and the second predefined response to contribute to the repositioning/relocating as a result of collisions in a similar manner as described with reference to method 900. The above-described manner of moving a response more realistically in response to the described second input prevents obstruction of one response by another response.

In some embodiments, while displaying the user interface element, the electronic device detects, via the one or more input devices, a second input directed to the user interface element corresponding to a second predefined response to the first message, such as input 818 in FIG. 8D (e.g., the second input has one or more characteristics of the first input, but directed to a user interface element corresponding to the second predefined response). In some embodiments, in response to detecting the second input, in accordance with a determination that the second input has a second duration, such as duration 824 in FIG. 8D, that does not satisfy one or more criteria (e.g., a duration of the second input is less than a predetermined value (e.g., less than 0.05, 0.1, 0.15, 0.2, 0.3, 0.5, 0.7, 1, 3, 5, or 10 seconds)—for example, the second input is a tap input), wherein the first duration of the first input satisfies the one or more criteria, such as duration 824 in FIG. 8H (e.g., a duration of the first input is more than the predetermined value), the electronic device displays the second visual indication of the second predefined response in association with the first user interface object, wherein the second visual indication of the second predefined response has a visual emphasis, different from the visual emphasis of the visual indication of the predefined response, that is independent of the second duration of the second input, such as response 826 in FIG. 8E having a different visual emphasis from response 830 in FIG. 8K. For example, the visual indication of the second predefined response with the second visual emphasis is displayed with a smaller size than the first size, a second shape that is sharper and/or has less rounded edges or corners than the first shape, a second color less vibrant than the first color, and/or a zero second height value less than the first height. In some embodiments, the second visual indication of the second predefined response is two-dimensional, and the amount of visual emphasis of the second visual indication (e.g., size, shape, color, or height) is independent of the duration of the second (touch) input. The above-described manner of responding to a respective message in a messaging conversation provides the user with a quick and efficient manner of responding to the respective message with less user input, which additionally reduces power usage and improves battery life of the electronic device by enabling the user to use the electronic device more quickly and efficiently.

In some embodiments, the second visual indication of the second predefined response is displayed in association with a respective location of the first user interface object, and the visual indication of the predefined response is displayed in association with the respective location of the first user interface object, such as response 830 location in FIG. 8K. In some embodiments, the second predefined response is displayed at a location corresponding to the first user interface object (e.g., top right corner of the first user interface object), and the visual indication of the predefined response is also displayed in association with that same location (e.g., connected with a string to the top right corner of the first user interface object). In some embodiments, a plurality of predefined responses including the second predefined response having a two-dimensional visual appearance are displayed at a same location corresponding to the first user interface object (e.g., top right corner of the first user interface object resembling a fanned stacked of predefined response). In some embodiments, a plurality of predefined responses having the balloon-like visual appearance are displayed as attached to a same location corresponding to the first user interface object (e.g., bundled together, each occupying different locations, and appearing as floating above the first user interface object). Other details on the behavior and visual appearance of the plurality of predefined responses having the balloon-like visual appearance are described with refence to method 900. In some embodiments, the location of one or the plurality of predefined response having the two-dimensional visual appearance does not affect the location of one or the plurality of predefined response having the balloon-like visual appearance (e.g., the one or the plurality of predefined response having the balloon-like visual appearance are not pushed away by collision(s) with the one or more predefined response having a two-dimensional visual appearance). Displaying responses to a respective message in association with the same location of a particular message ensures consistency in presentation of such responses in the user interface, and reduces errors in interaction with the messaging conversation.

In some embodiments, the visual indication of the predefined response is displayed at a location different from a location of the second visual indication of the second predefined response in the user interface, such as response 854 location different from response 850 location in FIG. 8Q. In some embodiments, the predefined response is displayed floating above the second visual indication of the second predefined response, and attached to the first user interface object—optionally attached to the same location of the first user interface object at which the second visual indication of the second predefined response is displayed. Further descriptions of displaying a plurality of predefined response and a plurality of second predefined response are described with reference to method 900. Displaying responses to a respective message at different locations avoids clustering the display and obstruction of responses by other responses, which reduces errors in interaction with the messaging conversation.

In some embodiments, the first user interface object is displayed in association with a first number (e.g., 1, 2, 3, 5, 10 or 20) of visual indications of predefined responses of a first type (e.g., a heart response, where the predefined responses available to respond to messages include the heard response, the rejection response, the laughing response, the excitement response, the curiosity response, or the heartbroken response), including the visual indication of the predefined response, such as three responses of the same type: responses 854, 848, and 850 in FIG. 8R. In some embodiments, while displaying the user interface element and the first user interface object in association with the first number of visual indications of predefined responses, the electronic device detects, via the one or more input devices, a second input directed to the user interface element corresponding to a second predefined response of the first type to the first message, such as response 860 in FIG. 8U (e.g., the second input has one or more characteristics of the first input, but directed to a user interface element corresponding to the second predefined response).

In some embodiments, in response to detecting the second input, such as input 858 in FIG. 8V and in accordance with a determination that the first number of predefined responses of the first type and the second predefined response of the first type is greater than a threshold number of predefined responses of the first type, such as the number of responses of the same type: responses 860, 848, 850, and 854 in FIG. 8V (e.g., 1, 3, 5, 10, 20 or 30), the electronic device displays, in the user interface, an animation corresponding to the first type of predefined response, such as the animation displayed in user interface 800 in FIG. 8W. In some embodiments, the electronic device displays an animation of the predefined responses detached from the first user interface object, multiplying, and occupying all or almost all space of the user interface, or more space of the user interface than was occupied by the first number of predefined responses of the first type and/or the second predefined response of the first type outside of displaying the animation. In some embodiments, predefined response of a second type and/or second predefined responses of the second type are displayed in association with the first user interface object, wherein the second type is different from the first type (e.g., the second type is a laughing response). In accordance with this example embodiment, the animation corresponding to the first type of predefined response (e.g., heart response) does not include the second type or other types of predefined responses associated with the first user interface object.

In some embodiments, the electronic device displays a second visual indication of the second predefined response in association with the first user interface object in the user interface, such as response 860 in FIG. 8X. In some embodiments, after the animation, the second predefined response is displayed floating above and attached to the first user interface object. In some embodiments, if the second predefined response is a two-dimensional predefined response, as described previously, the second predefined response is displayed at a particular location of the first user interface object (e.g., the upper-right of the first user interface object. In accordance with the example embodiment described above where the first user interface object is associated with one or more predefined responses of the second type, after the animation, the electronic device displays the one or more predefined responses of the second type at their corresponding locations of the first user interface object).

In some embodiments, in accordance with a determination that the first number of predefined responses of the first type and the second predefined response of the first type is less than the threshold number of predefined responses of the first type, such as responses 854, 848, 850, and 852 displayed in FIG. 8Q, the electronic device displays the second visual indication of the second predefined response in association with the first user interface object in the user interface without displaying the animation corresponding to the first type of predefined response, such as user interface 800 in FIG. 8Q. In some embodiments, the second predefined response is displayed floating above and attached to the first user interface object without the animation. In some embodiments, if the second predefined response is a two-dimensional predefined response, as described previously, the second predefined response is displayed at a particular location of the first user interface object (e.g., the upper-right of the first user interface object). In some embodiments, the electronic device is configured to display a plurality of different types of predefined responses and/or second predefined response as associated with the first user interface objects at locations as described with reference to method 900. Displaying an animated response to a message aids in visually distinguishing the response from other parts of the messaging conversation.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, responses to messages described above with reference to method 900 optionally have one or more of the characteristics of the visual indicators associated with user interface objects described with reference to method 700.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9 are, optionally, implemented by components depicted in FIGS. 1A-1B. For example, displaying operation 902a and detecting operation 902d are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to search for messages and response to messages. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to search rich content and/or messages and/or identify the location of the user. Accordingly, use of such personal information data enables users to identify, find, and otherwise interact with rich content and/or messages. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide personal data and/or rich content/message location data. In yet another example, users can select to limit the length of time personal data and/or rich content/message location data is maintained or entirely block the development of a baseline location profile. In addition to providing "opt in" and "opt out" options, the present disclosure contemplates providing notifications relating to the access or use of personal information. For instance, a user may be notified upon downloading an application that their personal information data and/or location data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
displaying, via the display generation component, a messaging user interface corresponding to a messaging conversation, the messaging user interface including a first user interface object corresponding to a first message in the messaging conversation, and a second user interface object, different from the first user interface object, corresponding to a second message in the messaging conversation, wherein:
the first user interface object and the second user interface object are displayed in the messaging user interface based on a defined temporal relationship between the first message and the second message in the messaging conversation; and
the first user interface object and the second user interface object are displayed in the messaging user interface in a first layout;
while displaying, via the display generation component, the messaging user interface including the first user interface object and the second user interface object displayed in the first layout, detecting, via the one or more input devices, a first input directed to the messaging user interface; and in response to detecting the first input:
in accordance with a determination that the first input satisfies one or more first criteria, displaying, via the display generation component, a second user interface, different from the messaging user interface, wherein:
the second user interface includes a third user interface object corresponding to the second message and a fourth user interface object corresponding to at least one message received in the messaging conversation prior to the first message,
the second user interface does not include a user interface object corresponding to the first message,
a respective user interface object corresponding to the at least one message was not displayed in the messaging user interface when the first input was detected; and
the third user interface object and the fourth user interface object are displayed in the second user interface in a second layout, different from the first layout.

2. The method of claim 1, wherein the third user interface object corresponding to the second message and the fourth user interface object corresponding to the at least one message are displayed in a chronological order based on a defined temporal relationship between the second message and the at least one message in the messaging conversation.

3. The method of claim 1, wherein the first user interface object corresponds to messaging content of a first type;
wherein the second user interface object corresponds to messaging content of a second type, different from the first type; and
wherein the third user interface object and the fourth user interface object correspond to messaging content of the second type, and the second user interface does not include user interface objects corresponding to messaging content of the first type.

4. The method of claim 1, wherein a second layout includes displaying a plurality of user interface objects including the third user interface object and fourth user interface object grouped according to different ranges of date values.

5. The method of claim 1, wherein the second layout includes displaying a plurality of user interface objects including the third user interface object and fourth user interface object at different positions in two directions in the second user interface chronologically, based on date and/or time associated with corresponding messages; and
wherein the first layout includes displaying the plurality of user interface objects including the first user interface object and the second user interface object at different positions in one direction in the messaging user interface chronologically, based on the date and/or time associated with the corresponding messages.

6. The method of claim 1, wherein the one or more first criteria include a criterion that is satisfied when the first input corresponds to a zoom-out input.

7. The method of claim 6, further comprising:
while displaying, via the display generation component, the second user interface including the third user interface object and the fourth user interface object displayed in the second user interface according to a first set of ranges of date values of corresponding messages, detecting, via the one or more input devices, a second input directed; and in response to detecting the second input:
in accordance with a determination that the second input satisfies one or more second criteria including a criterion that is satisfied when the second input corresponds to a zoom-in input, displaying, via the display generation component, the second user interface including the third user interface object and the fourth user interface object in a third layout, and according to a second set of ranges of date values of the corresponding messages, different from the first set of ranges of date values of the corresponding messages; and
in accordance with a determination that the second input satisfies the one or more first criteria including the criterion that is satisfied when the second input corresponds to the zoom-out input, displaying, via the display generation component, the second user interface including the third user interface object and the fourth user interface object in a fourth layout, different from the third layout and according to a third set of ranges of date values, different from the first set and the second set of ranges of date values, of the corresponding messages.

8. The method of claim 7, wherein:
the second user interface in the fourth layout includes all user interface objects corresponding to messages that are included in the second user interface in the third layout.

9. The method of claim 1, further comprising:
in response to detecting the first input:
in accordance with a determination that the first input satisfies one or more second criteria, different from the one or more first criteria, initiating a process associated with the first user interface object or the second user interface object, without displaying the second user interface.

10. The method of claim 9, wherein the one or more second criteria include a first criterion that is satisfied when the first input corresponds to a scrolling input, and the process associated with the first user interface object or the second user interface object includes:
scrolling the first user interface object and the second user interface object to different locations in the messaging user interface in accordance with the first input, different from their respective locations in the messaging user interface prior to the first input, while maintaining display, via the display generation component, of the first user interface object and the second user interface object on the messaging user interface.

11. The method of claim 9, wherein the one or more second criteria include a second criterion that is satisfied when the first input is a selection input directed to the first user interface object, and the process associated with the first user interface object or the second user interface object includes:
displaying, via the display generation component, the first user interface object with a first visual emphasis, greater than a second visual emphasis of the first user interface object prior to the first input.

12. The method of claim 1, wherein the second user interface includes a first plurality of user interface objects corresponding to a first plurality of messages, a first selectable option that is selectable to filter display of the first plurality of user interface objects according to a first category, and a second selectable option that is selectable to filter display of the first plurality of user interface objects according to a second category, different from the first category.

13. The method of claim 1, wherein the third user interface object corresponds to messaging content of a first type and is displayed with a first visual characteristic having a first value, and the fourth user interface object corresponds to messaging content of a second type, different from the first type, and is displayed with the first visual characteristic having a second value, different from the first value.

14. The method of claim 1, further comprising:
while displaying, via the display generation component, the second user interface, detecting, via the one or more input devices, a search input; and
in response to detecting the search input:
displaying, via the display generation component, one or more user interface objects corresponding to the search input, wherein corresponding messages of the one or more user interface objects are related to the search input.

15. The method of claim 14, wherein the corresponding messages of the one or more user interface objects displayed in response to the search input include metadata determined to be related to the search input.

16. The method of claim 14, wherein the corresponding messages of the one or more user interface objects include metadata derived from the messaging conversation determined to be related to the search input.

17. The method of claim 1, further comprising:
while displaying, via the display generation component, the second user interface, detecting, via the one or more input devices, a selection input directed to the fourth user interface object corresponding to the at least one message received in the messaging conversation prior to the first message; and
in response to detecting the selection input:
displaying, via the display generation component, the messaging user interface scrolled to a position including a fifth user interface object corresponding to the at least one message received in the messaging conversation prior to the first message.

18. The method of claim 1, further comprising:
while displaying, via the display generation component, the second user interface, detecting a second input; and
in response to detecting the second input:
in accordance with a determination that the second input satisfies one or more second criteria including a criterion that is satisfied when the second input corresponds to a zoom-in input, displaying, via the display generation component, the messaging user interface including one or more user interface objects corresponding to one or more messages, wherein the one or more user interface objects are displayed in the first layout.

19. The method of claim 17, wherein displaying the messaging user interface in response to detecting the selection input is independent of a layout being displayed by the second user interface when the selection input is detected.

20. The method of claim 1, wherein the one or more first criteria include a criterion that is satisfied when the first input corresponds to a first function, the method further comprising:
while displaying, via the display generation component, the second user interface, detecting a second input, different from the first input; and
in response to detecting the second input:
in accordance with a determination that the second input satisfies one or more second criteria, different from the one or more first criteria, including a criterion that is satisfied when the second input corresponds to a second function that is an opposite function of the first function, displaying, via the display generation component, the messaging user interface including the first user interface object and the second user interface object displayed in the first layout.

21. The method of claim 1, wherein:
in accordance with a determination that the second message is associated with a first attribute, the third user interface object includes a first visual indication corresponding to the first attribute of the second message; and
in accordance with a determination that the at least one message received in the messaging conversation prior to the first message is associated with a second attribute, the fourth user interface object includes a second visual indication corresponding to the second attribute of the at least one message received in the messaging conversation prior to the first message.

22. The method of claim 1, further comprising:
while displaying, via the display generation component, the second user interface including the third user interface object corresponding to the second message and the fourth user interface object corresponding to the at least one message received in the messaging conversation prior to the first message, detecting, via the one or more input devices, a scrolling input;
in response to detecting the scrolling input, scrolling through the second user interface, including displaying, in the second user interface, a fifth user interface object corresponding to a third message received in the messaging conversation prior to the at least one message, wherein the fifth user interface object was not displayed in the second user interface when the scrolling input was detected;
while displaying the second user interface including the fifth user interface object, detecting a second input; and
in response to detecting the second input:
in accordance with a determination that the second input satisfies one or more second criteria, displaying, via the display generation component, the messaging user interface scrolled to a position including a sixth user interface object corresponding to the third message, wherein:
the sixth user interface object was not displayed in the messaging user interface when the first input was detected.

23. The method of claim 1, wherein the second user interface includes user interface objects corresponding to all messages of a respective type in the messaging conversation.

24. The method of claim 1, wherein the second user interface includes user interface objects corresponding to a subset of all messages of a respective type in the messaging conversation.

25. An electronic device, comprising:
one or more processors;
memory; and
one or more programs, wherein the one or more programs are stored in the memory and configured to be executed by the one or more processors, the one or more programs including instructions for:

displaying, via a display generation component, a messaging user interface corresponding to a messaging conversation, the messaging user interface including a first user interface object corresponding to a first message in the messaging conversation, and a second user interface object, different from the first user interface object, corresponding to a second message in the messaging conversation, wherein:
- the first user interface object and the second user interface object are displayed in the messaging user interface based on a defined temporal relationship between the first message and the second message in the messaging conversation; and
- the first user interface object and the second user interface object are displayed in the messaging user interface in a first layout;

while displaying, via the display generation component, the messaging user interface including the first user interface object and the second user interface object displayed in the first layout, detecting, via one or more input devices, a first input directed to the messaging user interface; and in response to detecting the first input:
- in accordance with a determination that the first input satisfies one or more first criteria, displaying, via the display generation component, a second user interface, different from the messaging user interface, wherein:
  - the second user interface includes a third user interface object corresponding to the second message and a fourth user interface object corresponding to at least one message received in the messaging conversation prior to the first message,
  - the second user interface does not include a user interface object corresponding to the first message,
  - a respective user interface object corresponding to the at least one message was not displayed in the messaging user interface when the first input was detected; and
  - the third user interface object and the fourth user interface object are displayed in the second user interface in a second layout, different from the first layout.

26. The electronic device of claim 25, wherein the one or more first criteria include a criterion that is satisfied when the first input corresponds to a zoom-out input, the one or more programs include further instructions for:
while displaying, via the display generation component, the second user interface including the third user interface object and the fourth user interface object displayed in the second user interface according to a first set of ranges of date values of corresponding messages, detecting, via the one or more input devices, a second input directed; and
in response to detecting the second input:
in accordance with a determination that the second input satisfies one or more second criteria including a criterion that is satisfied when the second input corresponds to a zoom-in input, displaying, via the display generation component, the second user interface including the third user interface object and the fourth user interface object in a third layout, and according to a second set of ranges of date values of the corresponding messages, different from the first set of ranges of date values of the corresponding messages; and
in accordance with a determination that the second input satisfies the one or more first criteria including the criterion that is satisfied when the second input corresponds to the zoom-out input, displaying, via the display generation component, the second user interface including the third user interface object and the fourth user interface object in a fourth layout, different from the third layout and according to a third set of ranges of date values, different from the first set and the second set of ranges of date values, of the corresponding messages.

27. The electronic device of claim 25, wherein the one or more programs include further instructions for:
in response to detecting the first input:
in accordance with a determination that the first input satisfies one or more second criteria, different from the one or more first criteria, initiating a process associated with the first user interface object or the second user interface object, without displaying the second user interface.

28. The electronic device of claim 27, wherein the one or more second criteria include a first criterion that is satisfied when the first input corresponds to a scrolling input, and the process associated with the first user interface object or the second user interface object includes:
scrolling the first user interface object and the second user interface object to different locations in the messaging user interface in accordance with the first input, different from their respective locations in the messaging user interface prior to the first input, while maintaining display, via the display generation component, of the first user interface object and the second user interface object on the messaging user interface.

29. The electronic device of claim 27, wherein the one or more second criteria include a second criterion that is satisfied when the first input is a selection input directed to the first user interface object, and the process associated with the first user interface object or the second user interface object includes:
displaying, via the display generation component, the first user interface object with a first visual emphasis, greater than a second visual emphasis of the first user interface object prior to the first input.

30. The electronic device of claim 25, wherein the one or more programs include further instructions for:
while displaying, via the display generation component, the second user interface, detecting, via the one or more input devices, a selection input directed to the fourth user interface object corresponding to the at least one message received in the messaging conversation prior to the first message; and
in response to detecting the selection input:
displaying, via the display generation component, the messaging user interface scrolled to a position including a fifth user interface object corresponding to the at least one message received in the messaging conversation prior to the first message.

31. The electronic device of claim 25, wherein the one or more programs include further instructions for:
while displaying, via the display generation component, the second user interface, detecting a second input; and
in response to detecting the second input:
in accordance with a determination that the second input satisfies one or more second criteria including a criterion that is satisfied when the second input corresponds to a zoom-in input, displaying, via the display generation component, the messaging user interface including one or more user interface objects corresponding to one or more messages, wherein the one or more user interface objects are displayed in the first layout.

32. The electronic device of claim 25, wherein the one or more first criteria include a criterion that is satisfied when the first input corresponds to a first function, the one or more programs include further instructions for:
    while displaying, via the display generation component, the second user interface, detecting a second input, different from the first input; and
    in response to detecting the second input:
        in accordance with a determination that the second input satisfies one or more second criteria, different from the one or more first criteria, including a criterion that is satisfied when the second input corresponds to a second function that is an opposite function of the first function, displaying, via the display generation component, the messaging user interface including the first user interface object and the second user interface object displayed in the first layout.

33. The electronic device of claim 25, wherein the one or more programs include further instructions for:
    while displaying, via the display generation component, the second user interface including the third user interface object corresponding to the second message and the fourth user interface object corresponding to the at least one message received in the messaging conversation prior to the first message, detecting, via the one or more input devices, a scrolling input;
    in response to detecting the scrolling input, scrolling through the second user interface, including displaying, in the second user interface, a fifth user interface object corresponding to a third message received in the messaging conversation prior to the at least one message, wherein the fifth user interface object was not displayed in the second user interface when the scrolling input was detected;
    while displaying the second user interface including the fifth user interface object, detecting a second input; and
    in response to detecting the second input:
        in accordance with a determination that the second input satisfies one or more second criteria, displaying, via the display generation component, the messaging user interface scrolled to a position including a sixth user interface object corresponding to the third message, wherein:
        the sixth user interface object was not displayed in the messaging user interface when the first input was detected.

34. A non-transitory computer readable storage medium storing one or more programs, the one or more programs comprising instructions, which when executed by one or more processors of an electronic device, cause the electronic device to perform a method comprising:
    displaying, via a display generation component, a messaging user interface corresponding to a messaging conversation, the messaging user interface including a first user interface object corresponding to a first message in the messaging conversation, and a second user interface object, different from the first user interface object, corresponding to a second message in the messaging conversation, wherein:
        the first user interface object and the second user interface object are displayed in the messaging user interface based on a defined temporal relationship between the first message and the second message in the messaging conversation; and
        the first user interface object and the second user interface object are displayed in the messaging user interface in a first layout;
    while displaying, via the display generation component, the messaging user interface including the first user interface object and the second user interface object displayed in the first layout, detecting, via one or more input devices, a first input directed to the messaging user interface; and
    in response to detecting the first input:
        in accordance with a determination that the first input satisfies one or more first criteria, displaying, via the display generation component, a second user interface, different from the messaging user interface, wherein:
            the second user interface including a third user interface object corresponding to the second message and a fourth user interface object corresponding to at least one message received in the messaging conversation prior to the first message,
            the second user interface does not include a user interface object corresponding to the first message,
            a respective user interface object corresponding to the at least one message was not displayed in the messaging user interface when the first input was detected; and
            the third user interface object and the fourth user interface object are displayed in the second user interface in a second layout, different from the first layout.

35. The non-transitory computer readable storage medium of claim 34, wherein the one or more first criteria include a criterion that is satisfied when the first input corresponds to a zoom-out input, the one or more programs comprise further instructions, which when executed by the one or more processors of the electronic device, cause the electronic device to:
    while displaying, via the display generation component, the second user interface including the third user interface object and the fourth user interface object displayed in the second user interface according to a first set of ranges of date values of corresponding messages, detect, via the one or more input devices, a second input directed; and
    in response to detecting the second input:
        in accordance with a determination that the second input satisfies one or more second criteria including a criterion that is satisfied when the second input corresponds to a zoom-in input, display, via the display generation component, the second user interface including the third user interface object and the fourth user interface object in a third layout, and according to a second set of ranges of date values of the corresponding messages, different from the first set of ranges of date values of the corresponding messages; and
        in accordance with a determination that the second input satisfies the one or more first criteria including the criterion that is satisfied when the second input corresponds to the zoom-out input, display, via the display generation component, the second user interface including the third user interface object and the fourth user interface object in a fourth layout, different from the third layout and according to a third set of ranges of date values, different from the first set and the second set of ranges of date values, of the corresponding messages.

36. The non-transitory computer readable storage medium of claim 34, wherein the one or more programs comprise further instructions, which when executed by the one or more processors of the electronic device, cause the electronic device to:
in response to detecting the first input:
in accordance with a determination that the first input satisfies one or more second criteria, different from the one or more first criteria, initiate a process associated with the first user interface object or the second user interface object, without displaying the second user interface.

37. The non-transitory computer readable storage medium of claim 36, wherein the one or more second criteria include a first criterion that is satisfied when the first input corresponds to a scrolling input, and the process associated with the first user interface object or the second user interface object includes:
scrolling the first user interface object and the second user interface object to different locations in the messaging user interface in accordance with the first input, different from their respective locations in the messaging user interface prior to the first input, while maintaining display, via the display generation component, of the first user interface object and the second user interface object on the messaging user interface.

38. The non-transitory computer readable storage medium of claim 36, wherein the one or more second criteria include a second criterion that is satisfied when the first input is a selection input directed to the first user interface object, and the process associated with the first user interface object or the second user interface object includes:
displaying, via the display generation component, the first user interface object with a first visual emphasis, greater than a second visual emphasis of the first user interface object prior to the first input.

39. The non-transitory computer readable storage medium of claim 34, wherein the one or more programs comprise further instructions, which when executed by the one or more processors of the electronic device, cause the electronic device to:
while displaying, via the display generation component, the second user interface, detect, via the one or more input devices, a selection input directed to the fourth user interface object corresponding to the at least one message received in the messaging conversation prior to the first message; and
in response to detecting the selection input:
display, via the display generation component, the messaging user interface scrolled to a position including a fifth user interface object corresponding to the at least one message received in the messaging conversation prior to the first message.

40. The non-transitory computer readable storage medium of claim 34, wherein the one or more programs comprise further instructions, which when executed by the one or more processors of the electronic device, cause the electronic device to:
while displaying, via the display generation component, the second user interface, detecting a second input; and
in response to detecting the second input:
in accordance with a determination that the second input satisfies one or more second criteria including a criterion that is satisfied when the second input corresponds to a zoom-in input, display, via the display generation component, the messaging user interface including one or more user interface objects corresponding to one or more messages, wherein the one or more user interface objects are displayed in the first layout.

41. The non-transitory computer readable storage medium of claim 34, wherein the one or more first criteria include a criterion that is satisfied when the first input corresponds to a first function, the one or more programs comprise further instructions, which when executed by the one or more processors of the electronic device, cause the electronic device to:
while displaying, via the display generation component, the second user interface, detecting a second input, different from the first input; and
in response to detecting the second input:
in accordance with a determination that the second input satisfies one or more second criteria, different from the one or more first criteria, including a criterion that is satisfied when the second input corresponds to a second function that is an opposite function of the first function, display, via the display generation component, the messaging user interface including the first user interface object and the second user interface object displayed in the first layout.

42. The non-transitory computer readable storage medium of claim 34, wherein the one or more programs comprise further instructions, which when executed by the one or more processors of the electronic device, cause the electronic device to:
while displaying, via the display generation component, the second user interface including the third user interface object corresponding to the second message and the fourth user interface object corresponding to the at least one message received in the messaging conversation prior to the first message, detect, via the one or more input devices, a scrolling input;
in response to detecting the scrolling input, scroll through the second user interface, including displaying, in the second user interface, a fifth user interface object corresponding to a third message received in the messaging conversation prior to the at least one message, wherein the fifth user interface object was not displayed in the second user interface when the scrolling input was detected;
while displaying the second user interface including the fifth user interface object, detecting a second input; and
in response to detecting the second input:
in accordance with a determination that the second input satisfies one or more second criteria, display, via the display generation component, the messaging user interface scrolled to a position including a sixth user interface object corresponding to the third message, wherein:
the sixth user interface object was not displayed in the messaging user interface when the first input was detected.

* * * * *